(12) United States Patent
Spilman et al.

(10) Patent No.: US 10,745,585 B2
(45) Date of Patent: Aug. 18, 2020

(54) HIGH PERFORMANCE COATINGS

(71) Applicant: Resinate Materials Group, Inc., Plymouth, MI (US)

(72) Inventors: Gary Spilman, Northville, MI (US); Michael Christy, Howell, MI (US); Eric Vrabel, Ferndale, MI (US); Gage Fryz, Canton, MI (US); Rick Tabor, Plymouth, MI (US); Brian T. Comstock-Reid, Ypsilanti, MI (US)

(73) Assignee: RESINATE MATERIALS GROUP, INC., Plymouth, MI (US)

( * ) Notice: Subject to any disclaimer, the term of this patent is extended or adjusted under 35 U.S.C. 154(b) by 129 days.

(21) Appl. No.: 15/279,557

(22) Filed: Sep. 29, 2016

(65) Prior Publication Data
US 2017/0096581 A1 Apr. 6, 2017

Related U.S. Application Data

(63) Continuation of application No. PCT/US2016/054069, filed on Sep. 28, 2016.
(Continued)

(51) Int. Cl.
*C09D 175/06* (2006.01)
*C08L 67/02* (2006.01)
(Continued)

(52) U.S. Cl.
CPC ......... *C09D 175/06* (2013.01); *C08G 18/227* (2013.01); *C08G 18/246* (2013.01);
(Continued)

(58) Field of Classification Search
None
See application file for complete search history.

(56) References Cited

U.S. PATENT DOCUMENTS 3,542,718 A 11/1970 Davis
3,803,246 A 4/1974 Rosenzweig et al.
(Continued)

FOREIGN PATENT DOCUMENTS

CN 101367714 A 2/2009
CN 103374293 A 10/2013
(Continued)

OTHER PUBLICATIONS

Spilman et al., "Creating Multifunctional Coatings Using Recycled Raw Material Streams", CoatingsTech, Jun. 2015, 40-49.
(Continued)

*Primary Examiner* — Vivian Chen
(74) *Attorney, Agent, or Firm* — Dilworth IP, LLC

(57) ABSTRACT

The present invention relates to coatings, particularly high performance coatings, containing a polyester polyol comprising recurring units derived from a polyacid source, poly(bisphenol-A carbonate) (PBAC), and a glycol. The PBAC is preferably recycled poly(bisphenol-A carbonate) (rPBAC). These coatings provide improved salt spray and stain resistance along with a variety of other coating performance attributes. The polyols can contain a significant recycle and biobased content, making them sustainable alternatives to petroleum based polyols.

20 Claims, 7 Drawing Sheets

Related U.S. Application Data

(60) Provisional application No. 62/236,293, filed on Oct. 2, 2015, provisional application No. 62/256,755, filed on Nov. 18, 2015.

(51) Int. Cl.

| | | |
|---|---|---|
| *C09D 175/04* | (2006.01) | |
| *C09D 169/00* | (2006.01) | |
| *C08G 64/14* | (2006.01) | |
| *C08G 63/64* | (2006.01) | |
| *C09D 167/02* | (2006.01) | |
| *C08L 69/00* | (2006.01) | |
| *C08J 11/24* | (2006.01) | |
| *C08G 18/44* | (2006.01) | |
| *C08G 18/42* | (2006.01) | |
| *C08G 18/66* | (2006.01) | |
| *C08G 18/73* | (2006.01) | |
| *C08G 18/75* | (2006.01) | |
| *C08G 18/24* | (2006.01) | |
| *C08G 18/72* | (2006.01) | |
| *C08G 18/80* | (2006.01) | |
| *C08G 18/22* | (2006.01) | |
| *C09D 5/08* | (2006.01) | |
| *C08K 5/13* | (2006.01) | |
| *C08G 101/00* | (2006.01) | |
| *C09D 7/40* | (2018.01) | |
| *C09D 7/61* | (2018.01) | |
| *C09D 167/03* | (2006.01) | |
| *C09D 161/28* | (2006.01) | |
| *C09D 167/00* | (2006.01) | |
| *C09D 7/65* | (2018.01) | |
| *C08K 5/09* | (2006.01) | |
| *C08K 5/00* | (2006.01) | |
| *C08J 3/24* | (2006.01) | |
| *C08K 3/22* | (2006.01) | |
| *C08K 3/34* | (2006.01) | |
| *C08K 3/32* | (2006.01) | |
| *C08K 3/01* | (2018.01) | |
| *C08K 5/29* | (2006.01) | |
| *C08K 5/3492* | (2006.01) | |
| *C08K 3/38* | (2006.01) | |
| *C08K 3/36* | (2006.01) | |
| *C08L 75/06* | (2006.01) | |
| *C08L 67/03* | (2006.01) | |
| *C08L 61/28* | (2006.01) | |
| *C08L 67/00* | (2006.01) | |
| *B05D 7/00* | (2006.01) | |
| *B32B 15/09* | (2006.01) | |
| *B32B 15/095* | (2006.01) | |
| *B32B 15/04* | (2006.01) | |

(52) U.S. Cl.
CPC ..... *C08G 18/4225* (2013.01); *C08G 18/4288* (2013.01); *C08G 18/44* (2013.01); *C08G 18/6607* (2013.01); *C08G 18/722* (2013.01); *C08G 18/73* (2013.01); *C08G 18/755* (2013.01); *C08G 18/8074* (2013.01); *C08G 63/64* (2013.01); *C08G 64/14* (2013.01); *C08J 11/24* (2013.01); *C08L 67/02* (2013.01); *C08L 69/00* (2013.01); *C09D 5/08* (2013.01); *C09D 167/02* (2013.01); *C09D 169/00* (2013.01); *C09D 169/005* (2013.01); *C09D 175/04* (2013.01); *B05D 7/51* (2013.01); *B05D 7/53* (2013.01); *B32B 15/04* (2013.01); *B32B 15/09* (2013.01); *B32B 15/095* (2013.01); *B32B 2255/06* (2013.01); *B32B 2255/26* (2013.01); *B32B 2255/28* (2013.01); *B32B 2307/752* (2013.01); *B32B 2311/24* (2013.01); *B32B 2311/30* (2013.01); *C08G 2101/0025* (2013.01); *C08G 2105/02* (2013.01); *C08G 2150/20* (2013.01); *C08G 2150/90* (2013.01); *C08J 3/24* (2013.01); *C08J 2367/02* (2013.01); *C08J 2369/00* (2013.01); *C08K 3/01* (2018.01); *C08K 3/22* (2013.01); *C08K 3/34* (2013.01); *C08K 3/36* (2013.01); *C08K 5/0008* (2013.01); *C08K 5/0025* (2013.01); *C08K 5/09* (2013.01); *C08K 5/13* (2013.01); *C08K 5/29* (2013.01); *C08K 5/34922* (2013.01); *C08K 2003/2206* (2013.01); *C08K 2003/2241* (2013.01); *C08K 2003/2296* (2013.01); *C08K 2003/325* (2013.01); *C08K 2003/327* (2013.01); *C08K 2003/328* (2013.01); *C08K 2003/387* (2013.01); *C08K 2201/019* (2013.01); *C08L 61/28* (2013.01); *C08L 67/00* (2013.01); *C08L 67/03* (2013.01); *C08L 69/005* (2013.01); *C08L 75/06* (2013.01); *C08L 2201/10* (2013.01); *C08L 2312/00* (2013.01); *C09D 5/082* (2013.01); *C09D 5/084* (2013.01); *C09D 5/086* (2013.01); *C09D 7/40* (2018.01); *C09D 7/61* (2018.01); *C09D 7/65* (2018.01); *C09D 161/28* (2013.01); *C09D 167/00* (2013.01); *C09D 167/03* (2013.01); *Y10T 428/31551* (2015.04); *Y10T 428/31605* (2015.04); *Y10T 428/31681* (2015.04); *Y10T 428/31794* (2015.04)

(56) References Cited

U.S. PATENT DOCUMENTS

| | | | | |
|---|---|---|---|---|
| 4,072,634 | A * | 2/1978 | Borchert | C08G 18/4615 521/129 |
| 4,164,486 | A | 8/1979 | Kudo et al. | |
| 4,178,325 | A | 12/1979 | Sekmakas | |
| 4,340,519 | A | 7/1982 | Kotera et al. | |
| 4,435,527 | A * | 3/1984 | Cuscurida | C08G 18/12 521/173 |
| 4,465,793 | A * | 8/1984 | Brennan | C08G 18/4213 521/172 |
| 4,760,099 | A * | 7/1988 | Canaday | C08G 18/163 521/110 |
| 4,846,996 | A | 7/1989 | Carroll et al. | |
| 5,070,172 | A * | 12/1991 | Hirai | C08G 18/42 528/370 |
| 5,178,952 | A * | 1/1993 | Yamamoto | C08G 18/4216 428/425.8 |
| 5,326,815 | A * | 7/1994 | Serdiuk | C08G 18/0823 524/539 |
| 5,334,690 | A * | 8/1994 | Schafheutle | C08G 18/0819 528/71 |
| 5,349,041 | A * | 9/1994 | Blum | C08G 18/0823 525/440.02 |
| 5,527,879 | A * | 6/1996 | Nakae | C09D 169/00 525/461 |
| 5,563,223 | A | 10/1996 | Tachika et al. | |
| 7,253,251 | B2 | 8/2007 | Lee et al. | |
| 7,452,525 | B1 * | 11/2008 | Berezkin | A61K 8/87 424/486 |
| 8,653,174 | B2 | 2/2014 | Anderson et al. | |
| 8,716,429 | B2 | 5/2014 | Spilman et al. | |
| 8,758,896 | B2 * | 6/2014 | Imanaka | C08G 18/758 428/411.1 |
| 9,481,760 | B2 * | 11/2016 | Mukerjee | C08G 18/6492 |
| 9,522,976 | B2 * | 12/2016 | Tabor | C08G 63/916 |
| 9,580,546 | B2 * | 2/2017 | Bae | C08L 67/02 |
| 9,751,978 | B2 * | 9/2017 | Mukerjee | C08G 18/6492 |
| 9,840,584 | B2 * | 12/2017 | Mukerjee | C08G 63/916 |
| 9,884,938 | B2 * | 2/2018 | Bae | C08L 67/02 |

(56) References Cited

U.S. PATENT DOCUMENTS

| | | | |
|---|---|---|---|
| 9,896,540 B2* | 2/2018 | Tabor | C08J 11/24 |
| 9,951,171 B2* | 4/2018 | Tabor | C09D 167/02 |
| 9,988,489 B2* | 6/2018 | Mukerjee | C08G 18/6492 |
| 10,040,899 B2* | 8/2018 | Tabor | C08G 63/916 |
| 10,414,859 B2* | 9/2019 | Tabor | C08G 18/348 |
| 2002/0001723 A1* | 1/2002 | Fuchs | B32B 27/40 |
| | | | 428/424.4 |
| 2002/0188070 A1* | 12/2002 | Tsuboniwa | C09D 5/4473 |
| | | | 525/107 |
| 2003/0027969 A1* | 2/2003 | Ludewig | B32B 27/08 |
| | | | 528/48 |
| 2003/0092832 A1* | 5/2003 | Tanaka | C08G 18/12 |
| | | | 524/589 |
| 2004/0152799 A1* | 8/2004 | Miller | C08F 290/067 |
| | | | 522/104 |
| 2004/0249012 A1* | 12/2004 | Tanaka | C08F 283/008 |
| | | | 522/83 |
| 2004/0259967 A1 | 12/2004 | Neill et al. | |
| 2005/0143531 A1 | 6/2005 | Lee et al. | |
| 2005/0277732 A1 | 12/2005 | Yu et al. | |
| 2006/0217497 A1* | 9/2006 | Kitada | C08G 18/0823 |
| | | | 525/453 |
| 2008/0255395 A1* | 10/2008 | Dai | C07C 41/01 |
| | | | 568/640 |
| 2010/0210757 A1* | 8/2010 | Sommer | C09D 175/16 |
| | | | 523/402 |
| 2010/0233146 A1* | 9/2010 | McDaniel | A01N 63/02 |
| | | | 424/94.2 |
| 2010/0233469 A1* | 9/2010 | Sasaki | C08G 18/0823 |
| | | | 428/327 |
| 2011/0124738 A1* | 5/2011 | Schroeder | C09D 5/086 |
| | | | 514/642 |
| 2011/0133122 A1* | 6/2011 | Lista | C08G 18/4252 |
| | | | 252/182.12 |
| 2011/0166245 A1* | 7/2011 | Kunihiro | C08G 18/4072 |
| | | | 521/172 |
| 2011/0229645 A1* | 9/2011 | Shaffer | C08G 18/10 |
| | | | 427/385.5 |
| 2012/0059118 A1* | 3/2012 | Klein | C08G 18/4216 |
| | | | 524/591 |
| 2012/0276296 A1* | 11/2012 | Fieberg | C08G 18/0823 |
| | | | 427/379 |
| 2013/0041072 A1* | 2/2013 | Sommer | C08G 18/0823 |
| | | | 523/415 |
| 2013/0139721 A1 | 6/2013 | Ritz | |
| 2013/0184366 A1* | 7/2013 | Jimenez | C08G 18/4018 |
| | | | 521/88 |
| 2013/0281616 A1* | 10/2013 | Tielemans | C08F 290/067 |
| | | | 524/590 |
| 2013/0310513 A1* | 11/2013 | Salviato | C08F 283/008 |
| | | | 524/590 |
| 2013/0317171 A1* | 11/2013 | Morikami | C08G 18/6659 |
| | | | 524/839 |
| 2014/0088245 A1* | 3/2014 | Singh | C08G 18/10 |
| | | | 524/590 |
| 2014/0107288 A1* | 4/2014 | Singh | C08G 18/44 |
| | | | 524/590 |
| 2014/0116915 A1* | 5/2014 | Kainz | C09D 169/00 |
| | | | 206/524.3 |
| 2014/0256874 A1* | 9/2014 | Chasser | C09D 169/00 |
| | | | 524/612 |
| 2015/0031815 A1* | 1/2015 | Singh | C08G 63/64 |
| | | | 524/361 |
| 2015/0203705 A1* | 7/2015 | Olson | C09D 133/066 |
| | | | 427/385.5 |
| 2016/0053058 A1* | 2/2016 | Tabor | C09D 167/02 |
| | | | 521/161 |
| 2016/0068724 A1 | 3/2016 | Roock et al. | |
| 2016/0362518 A1* | 12/2016 | Muller | C08G 65/2615 |
| 2017/0029561 A1* | 2/2017 | Tabor | C08J 11/24 |
| 2017/0088745 A1* | 3/2017 | Matthieu | C09D 167/00 |
| 2017/0121457 A1* | 5/2017 | Bae | C08G 63/916 |
| 2017/0335057 A1* | 11/2017 | Tabor | C08J 11/24 |
| 2018/0030202 A1* | 2/2018 | Tabor | C08G 63/195 |
| 2020/0002524 A1* | 1/2020 | Brown | C09D 175/14 |

FOREIGN PATENT DOCUMENTS

| | | | |
|---|---|---|---|
| DE | 1966827 A1 | | 6/1974 |
| DE | 4306964 A1 | | 9/1994 |
| EP | 2025730 A | * | 2/2009 |
| GB | 1485310 A | | 9/1977 |
| GB | 2097005 A | | 10/1982 |
| JP | S591521 A | | 1/1984 |
| JP | 64-001729 A | * | 1/1989 |
| JP | S64-1729 A | | 1/1989 |
| JP | 598210 A2 | | 4/1993 |
| JP | 06256712 A | | 9/1994 |
| JP | 0797547 A2 | | 4/1995 |
| JP | 09208897 A | | 8/1997 |
| JP | 09272837 A2 | | 10/1997 |
| JP | 2000281944 A2 | | 10/2000 |
| JP | 2001106970 A2 | | 4/2001 |
| JP | 2001278966 A | | 10/2001 |
| JP | 2004-224825 A | * | 8/2004 |
| JP | 3601717 B2 | | 12/2004 |
| JP | 2007-291157 A | * | 11/2007 |
| JP | 2008-056758 A | * | 3/2008 |
| JP | 4333420 B2 | | 9/2009 |
| JP | 2010-053340 A | * | 3/2010 |
| WO | 99/61532 A1 | | 12/1999 |
| WO | 01/85660 A2 | | 11/2001 |
| WO | 2004/094506 A2 | | 11/2004 |
| WO | 2016/028837 A1 | | 2/2016 |

OTHER PUBLICATIONS

Datta et al., "Progress in non-isocyanate polyurethanes synthesized from cyclic carbonate intermediates and di- or polyamines in the context of structure-properties relationship and from an environmental point of view", Polym. Bull. 2016, 73, 1459-1496.

Rokicki et al., "Non-isocyanate polyurethanes: synthesis, properties, and applications†", Polym. Adv. Technol. 2015, 26, 707-761.

Process Aids and Intermediates for the Chemical Industry Surfactants, Clariant Product Brochure, 2013, Clariant International AG.

Lin et al., "Novel chemical recycling of polycarbonate (PC) waste into bishydroxyalkyl ethers of bisphenol A for use as PU raw materials", Green Chemistry, 2007, 9, 38-43.

Bisphenol A (BPA) Alkoxylates Products Brochure 1BA Series NN, 2016, Kowa American Corp.

Kowa Product List Brochure, Kowa American Corp., http://www.chemical.kowa.com.

Bisphenol A (BPA) Alkoxylates Products Technical Data Sheet, Milliken Chemical.

SYN FAC 8027 Technical Data Sheet, Milliken Chemical.
SYN FAC 8031 Technical Data Sheet, Milliken Chemical.
SYN FAC 8385 Technical Data Sheet, Milliken Chemical.
SYN FAC BPA Polyols Technical Data Sheet, Milliken Chemical.

Tabor et al., "High Performance CASE Polyols From Recycled Poly(Bisphenol A Carbonate) and Recycled PET", Jun. 29, 2015.

PCT International Search Report and Written Opinion dated Jan. 18, 2017 from corresponding Application No. PCT/US2016/051357.

PCT International Search Report and Written Opinion dated Jan. 18, 2017 from corresponding Application No. PCT/US2016/054069.

* cited by examiner

HIGH PERFORMANCE COATINGS

RELATED APPLICATIONS

This application claims priority to U.S. Provisional Patent Application Ser. No. 62/236,293 filed on Oct. 2, 2015, and U.S. Provisional Patent Application Ser. No. 62/256,755 filed on Nov. 18, 2015, the disclosures of each of which are incorporated by reference herein in their entirety.

FIELD OF THE INVENTION

The present invention relates to coatings, particularly high performance coatings, containing a polyester polyol comprising recurring units derived from a polyacid source, poly(bisphenol-A carbonate) (PBAC), and a glycol. The PBAC is preferably recycled poly(bisphenol-A carbonate) (rPBAC). These coatings provide improved salt spray and stain resistance along with a variety of other coating performance attributes. The polyols can contain a significant recycle and biobased content, making them sustainable alternatives to petroleum based polyols.

BACKGROUND OF THE INVENTION

A coating is a covering that is applied to the surface of a substrate. Coatings can be decorative, functional, or both. An example of a decorative coating would be an artist's paint. An example of a functional coating would be an adhesive. An example of a coating with both a decorative and a functional purpose would be a house paint which would both protect the surface of the house and be aesthetically appealing.

Coatings are used in many applications, including paper, packaging, films, printing, construction products, automobiles, aircraft, marine products, and all sorts of other manufactured products. Furthermore, functional coatings can be applied to change the surface properties of the substrate, such as adhesion, wetability, corrosion resistance, or wear resistance. Aside from the decorative aspects, an important function of coatings is to protect the substrate from the environment and wear and tear under usage conditions.

Polyester containing coatings such as polyethylene terephthalate (PET) coatings are particularly useful. These coatings have been used in various forms for protective and barrier coatings, and other types of packaging, as well as for substrates themselves. The performance of polyester coatings has been postulated to be due to the inherent properties of the polyesters, such as high-strength, a partially aromatic backbone, and a variable degree of crystallinity. For example, the components of PET plastic are mainly terephthalic acid and ethylene glycol. These components also happen to serve as prime ingredients for many industrial paint resins for multiple substrates and applications.

Commonly, polyester polyols are made by condensing aromatic diacids, diesters, or anhydrides (e.g., terephthalic acid or dimethyl terephthalate) with glycols such as ethylene glycol, propylene glycol, diethylene glycol, or the like. These starting materials usually derive exclusively from petrochemical sources.

However, it would be highly desirable to design high performance coatings made from a polyester polyol, wherein the polyol is derived from a polyacid source that is a recycled aromatic polyacid source. Furthermore, it would be highly desirable to incorporate polyols that incorporate other polymeric materials, particularly when these other polymeric materials are from recycled sources. However, there are challenges in developing such coatings based on these polyols to achieve robust performance characteristics such as resistance to corrosion and abrasion. As companies increasingly seek to offer products with improved sustainability, the availability of intermediates produced from bio-renewable and/or recycled materials becomes more leveraging. However, there remains a need for these products to deliver equal or better performance than their traditional petroleum-based alternatives at a comparable price point.

Depending on the substrate being protected, and the environment it is being protected from, recycled PET (rPET) can be a starting point from which to design high performance protective coatings with long service lifetimes. Starting from a water bottle on a supermarket shelf, the transition to such a protective coating would be an example of "upcycling", as opposed to a straight recycle category or the more commonly practiced "downcycling". Most plastic recycling is classified as "downcycling", meaning it reduces the quality of a material over time. See McDonough, W., and Branugart, M., *Cradle to Cradle: Remaking the Way We Make Things,* 2002, North Point Press, p. 56-57 (2002), which is incorporated by reference herein in its entirety.

Polyols suitable for use in making high-quality polyurethanes have proven difficult to manufacture from recycled materials, including recycled polyethylene terephthalate (rPET). Many references describe digestion of rPET with glycols (also called "glycolysis"), usually in the presence of a catalyst such as zinc or titanium. Digestion converts the polymer to a mixture of glycols and low-molecular-weight PET oligomers. Although such mixtures have desirably low viscosities, they often have high hydroxyl numbers or high levels of free glycols. Frequently, the target product is a purified bis(hydroxyalkyl) terephthalate (see, e.g., U.S. Pat. Nos. 6,630,601, 6,642,350, and 7,192,988) or terephthalic acid (see, e.g., U.S. Pat. No. 5,502,247), which are incorporated by reference herein in their entirety. Some of the efforts to use glycolysis product mixtures for urethane manufacture are described in a review article by D. Paszun and T. Spychaj (*Ind. Eng. Chem. Res.* 36 (1997) 1373, which is incorporated by reference herein in its entirety.

Frequently, ethylene glycol is used as the glycol reactant for glycolysis, because it minimizes the possible reaction products. Usually, the glycolysis is performed under conditions effective to generate bis(hydroxyethyl) terephthalate ("BHET"), although sometimes the goal is to recover pure terephthalic acid. When ethylene glycol is used as a reactant, the glycolysis product is typically a crystalline or waxy solid at room temperature. Such materials are less than ideal for use as polyol intermediates because they must be processed at elevated temperatures. Polyols are desirably free-flowing liquids at or close to room temperature. The challenges for these polyols and their incorporation into other products become even more severe when additional polymeric components, particularly other recycled polymeric components, are used to prepare the polyols.

It has surprisingly been found in the present invention that polyols containing components derived from bisphenols and bisphenol polymers, such as poly(bisphenol-A carbonate) (PBAC), particularly recycled poly(bisphenol-A carbonate) (rPBAC) can be used to prepare coatings having desirable performance characteristics.

It is apparent from the above there is an ongoing need for sustainable sources of polyester polyols which at the same time can help to both reduce waste streams, and to provide further options for using under-utilized recycled polymer streams and incorporating them into products such as high performance coatings.

SUMMARY OF THE INVENTION

The present invention relates to coatings, particularly high performance coatings, containing a polyester polyol comprising recurring units derived from a polyacid source, poly(bisphenol-A carbonate) (PBAC), and a glycol. The PBAC is preferably recycled poly(bisphenol-A carbonate) (rPBAC). These coatings provide improved salt spray and stain resistance along with a variety of other coating performance attributes. The polyols can contain a significant recycle and biobased content, making them sustainable alternatives to petroleum based polyols.

We surprisingly found that high performance coatings with desired performance attributes can be made from the reaction product of a polyester polyol and a crosslinker, wherein the polyester polyol comprises recurring units derived from a polyacid source, poly(bisphenol-A carbonate) (PBAC), particularly recycled poly(bisphenol-A carbonate) (rPBAC), and a glycol. The polyacid source can be either an aromatic or aliphatic polyacid source.

DETAILED DESCRIPTION OF THE INVENTION

Figure 1:
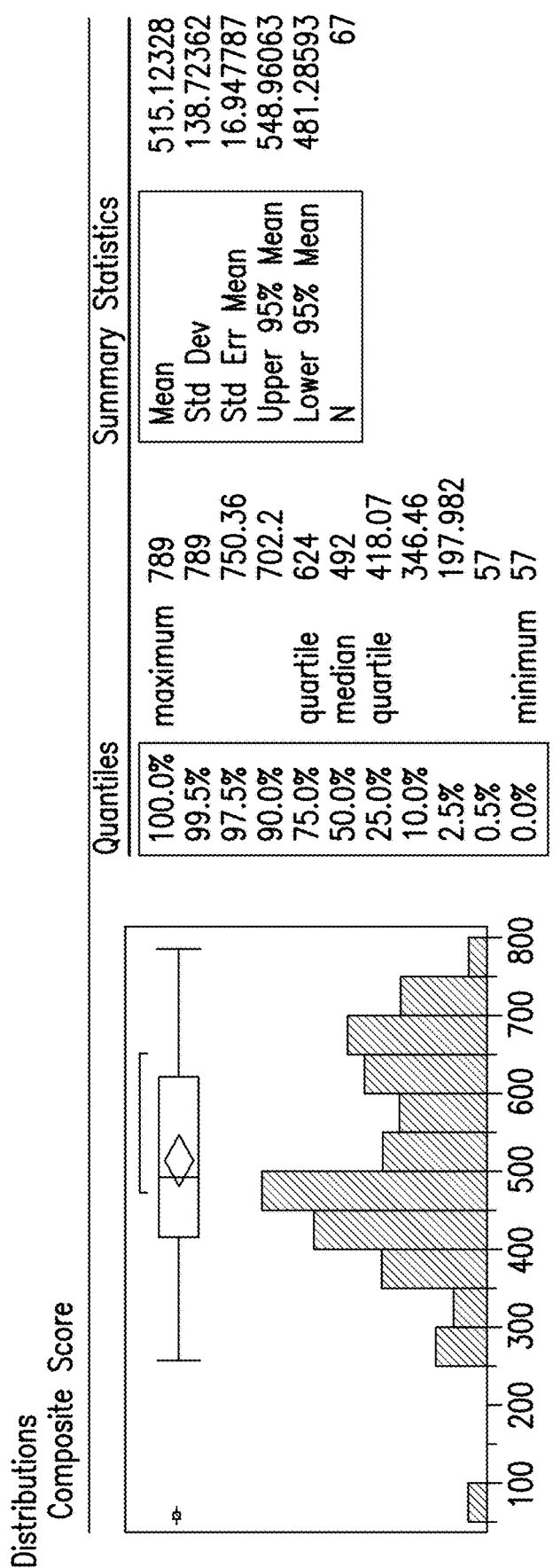
FIG. 1 shows the composite score distribution for internal polyol screening.

The present invention relates to a coating comprising the reaction product of:
(a) a polyester polyol,
(b) poly(bisphenol-A carbonate) (PBA), and
(c) a crosslinker.

In another aspect, the present invention relates to a coating wherein the polyester polyol comprises recurring units derived from:
(i) a polyacid source, and
(ii) a first glycol.

In another aspect the present invention relates to a coating wherein the crosslinker is selected from a melamine crosslinker, a diisocyanate trimer (in other words a trimer of a diisocyanate), a diisocyanate, or a polyisocyanate.

In another aspect the present invention relates to a coating wherein the polyacid source is selected from aromatic polyacid sources, aliphatic polyacid sources, and combinations thereof.

In another aspect the present invention relates to a coating wherein the polyacid source is an aromatic polyacid source.

In another aspect the present invention relates to a coating wherein the aromatic polyacid source is a thermoplastic polyester.

In another aspect the present invention relates to a coating wherein the thermoplastic polyester is a copolymer of an aromatic polyacid and a second glycol, wherein (a) the aromatic polyacid is selected from phthalic acid, terephthalic acid, 2,5-furandicarboxylic acid, isophthalic acid, dihydroferulic acid, salts thereof, C1-C6 monoesters thereof, C1-C6 diesters thereof, and combinations thereof; and (b) the second glycol is selected from ethylene glycol, 1,2-propanediol, 1,3-propanediol, 1,2-butanediol, 1,3-butanediol, 1,4-butanediol, 2,3-butanediol, neopentyl glycol, glycerol, trimethylolpropane, 3-methyl-1,5-pentanediol, 1,3-cyclohexane diol, 1,4-cyclohexane diol, 1,3-cyclohexanedimethanol, 1,4-cyclohexanedimethanol, diethylene glycol, tetraethylene glycol, dipropylene glycol, triethylene glycol, tripropylene glycol, polyethylene glycol, polypropylene glycol, erythritol, pentaerythritol, sorbitol, 2,2,4,4-tetramethyl-1,3-cyclobutane diol, and block or random copolymer glycols of ethylene oxide and propylene oxide, and combinations thereof.

In another aspect the present invention relates to a coating wherein the thermoplastic polyester is selected from polyethylene terephthalate (PET), polybutylene terephthalate (PBT), polytrimethylene terephthalate (PTT), glycol-modified polyethylene terephthalate (PETG), copolymers of terephthalic acid and 1,4-cyclohexanedimethanol, isophthalic acid-modified copolymers of terephthalic acid and 1,4-cyclohexanedimethanol, copolymers of 2,5-furandicarboxylic acid or C1-C6-dialkyl 2,5-furandicarboxylates, copolymers of terephthalic acid and 2,2,4,4-tetramethyl-1,3-cyclobutane diol, and combinations thereof.

In another aspect the present invention relates to a coating wherein the thermoplastic polyester is a copolymer of terephthalic acid and 2,2,4,4-tetramethyl-1,3-cyclobutane diol.

In another aspect the present invention relates to a coating wherein the thermoplastic polyester is selected from PET, PETG, and PBT, or combinations thereof.

In another aspect the present invention relates to a coating wherein the thermoplastic polyester is PET.

In another aspect the present invention relates to a coating wherein the PET is selected from virgin PET and recycled PET, or combinations thereof.

In another aspect the present invention relates to a coating wherein the PET is recycled PET.

In another aspect the present invention relates to a coating wherein the recycled PET is obtained from recycled bottles.

In another aspect the present invention relates to a coating wherein the recycled PET is obtained from recycled textiles.

In another aspect the present invention relates to a coating wherein the recycled PET is obtained from recycled carpeting.

In another aspect the present invention relates to a coating wherein the thermoplastic polyester is PTT.

In another aspect the present invention relates to a coating wherein the PTT is selected from virgin PTT and recycled PTT, or combinations thereof.

In another aspect the present invention relates to a coating wherein the PTT is recycled PTT.

In another aspect the present invention relates to a coating wherein the recycled PTT is obtained from recycled textiles.

In another aspect the present invention relates to a coating wherein the recycled PTT is obtained from recycled carpeting.

In another aspect the present invention relates to a coating wherein the polyacid source is an aliphatic polyacid source.

In another aspect the present invention relates to a coating wherein the aliphatic polyacid source is selected from maleic anhydride, succinic anhydride, succinic acid, maleic acid, lactic acid, fumaric acid, suberic acid, sebacic acid, azelaic acid, adipic acid, malonic acid, glutaric acid, nonandioic acid, nonenedioic acid, sebacic acid, decenedioic acid, dodecanedioic acid, dodecenedioic acid, tetradecanedioic acid, tetradecenedioic acid, hexadecanedioic acid, octadecanedioic acid, octadecenedioic acid, decenedioic acid, or mono- or dialkyl esters thereof, and combinations thereof.

In another aspect the present invention relates to a coating wherein the aliphatic polyacid source is selected from adipic acid, suberic acid, sebacic acid, succinic acid, nonanedioic acid, octadecanedioic acid, octadecenedioic acid, decenedioic acid, hexadecanedioic acid, or its mono- or dialkyl esters thereof, and combinations thereof.

In another aspect the present invention relates to a coating wherein the first glycol is selected from ethylene glycol, propylene glycol, 1,3-propanediol, 1,2-butylene glycol, 1,3-butylene glycol, 1,4-butanediol, 2-methyl-1,3-propanediol, neopentyl glycol, glycerol, trimethylolpropane, 3-methyl-1,5-pentanediol, 1,4-cyclohexanedimethanol, 1,3-cyclohexanedimethanol, diethylene glycol, tetraethylene glycol, dipropylene glycol, triethylene glycol, tripropylene glycol, polyethylene glycol, polypropylene glycol, erythritol, pentaerythritol, sorbitol, 2,2,4,4-tetramethyl-1,3-cyclobutane diol, and block or random copolymer glycols of ethylene oxide and propylene oxide, and combinations thereof.

In another aspect the present invention relates to a coating wherein the first glycol comprises a recycled glycol.

In another aspect the present invention relates to a coating wherein the polyester polyol has a hydroxyl number within the range of about 10 to about 500 mg KOH/g.

In another aspect the present invention relates to a coating wherein the polyester polyol has a hydroxyl number within the range of about 25 to about 400 mg KOH/g.

In another aspect the present invention relates to a coating wherein the polyester polyol has a hydroxyl number within the range of about 50 to about 400 mg KOH/g.

In another aspect the present invention relates to a coating wherein the polyester polyol has a viscosity at 125° C. less than about 5000 cP.

In another aspect the present invention relates to a coating wherein the coating comprises from 1 to 50 weight percent, based on the amount of polyester polyol, of poly(bisphenol-A carbonate).

In another aspect the present invention relates to a coating wherein the coating comprises from 1 to 20 weight percent, based on the amount of polyester polyol, of poly(bisphenol-A carbonate).

In another aspect the present invention relates to a coating wherein the poly(bisphenol-A carbonate) is recycled poly(bisphenol-A carbonate) (rPBAC).

In another aspect the present invention relates to a coating wherein the crosslinker is a diisocyanate trimer (in other words a trimer of a diisocyanate).

In another aspect the present invention relates to a coating wherein the diisocyanate trimer is selected from hexamethylene diisocyanate trimer, 4,4'-methylene diphenyl diisocyanate trimer, isophorone diisocyanate trimer, and combinations thereof.

In another aspect the present invention relates to a coating wherein the diisocyanate trimer is hexamethylene diisocyanate trimer.

In another aspect the present invention relates to a coating wherein the coating is formulated at an NCO/OH ratio from 0.75 to 1.5.

In another aspect the present invention relates to a coating wherein the coating is formulated at an NCO/OH ratio from 1.0 to 1.5.

In another aspect the present invention relates to a coating wherein the coating is formulated at an NCO/OH ratio of about 1.05.

In another aspect the present invention relates to a coating wherein the coating is a polyurethane coating.

In another aspect the present invention relates to a coating wherein the crosslinker is a melamine crosslinker.

In another aspect the present invention relates to a coating wherein the coating comprises from 10 to 30 weight percent of the melamine crosslinker.

In another aspect the present invention relates to a coating wherein the polyester polyol is transparent.

In another aspect the present invention relates to a clear coating.

In another aspect the present invention relates to a high-gloss metal topcoat comprising a coating according to the present invention.

In another aspect the present invention relates to a primer coating.

In another aspect the present invention relates to a primer coating further comprising titanium dioxide.

In another aspect the present invention relates to a coating wherein the coating is a corrosion inhibitor-free coating.

In another aspect the present invention relates to a coating further comprising a corrosion inhibitor.

In another aspect the present invention relates to a coating wherein the corrosion inhibitor is selected from zinc phosphate (including modified zinc phosphate), zinc chromate, barium metaborate, calcium silica gel, amino carboxylate, barium phosphosilicate, aluminum triphosphate, and combinations thereof.

In another aspect the present invention relates to a wherein the corrosion inhibitor is zinc phosphate.

In another aspect the present invention relates to a coated substrate comprising a coating of the present invention.

In another aspect the present invention relates to a coated substrate wherein the substrate is selected from aluminum, cold-rolled steel, phosphate cold-rolled steel, oxidizable metals, galvanized metals, and plated metals.

In another aspect the present invention relates to a coated substrate wherein the galvanized metals are selected from galvanized steel, hot-dipped galvanized steel, and electrogalvanized steel and the plated metals are selected from chromated aluminum.

In another aspect the present invention relates to a coated substrate wherein the coated substrate has an improved 500 hour salt spray resistance as described herein when compared with that of a similar coated substrate prepared from a polyester polyol produced without poly(bisphenol-A carbonate).

In another aspect the present invention relates to a coated substrate wherein the coated substrate has an improved 500 hour salt spray resistance as described herein when compared with that of a similar coated substrate prepared from a polyester polyol produced without recycled poly(bisphenol-A carbonate).

In another aspect the present invention relates to a coated substrate wherein the coated substrate has an improved performance as per at least one testing standard selected from ASTM B117, ASTM D714, ASTM D610, or ASTM D1654, when compared with that of a similar coated substrate prepared from a polyester polyol produced without poly(bisphenol-A carbonate).

In another aspect the present invention relates to a coated substrate wherein the coated substrate has an improved performance as per at least one testing standard selected from ASTM B117, ASTM D714, ASTM D610, or ASTM D1654, when compared with that of a similar coated substrate prepared from a polyester polyol produced without recycled poly(bisphenol-A carbonate).

In another aspect the present invention relates to a coating wherein the improved performance is measured by millimeters of creep from the scribe, the ratings in the field in terms of blister size and number, and corrosion in the field (i.e. not adjacent to the scribe in the panel).

In another aspect the present invention relates to a composition suitable for forming a coating, comprising:
 (a) a polyester polyol, wherein the polyester polyol comprises recurring units derived from:
  (i) a polyacid source, and
  (ii) a first glycol;
 (b) poly(bisphenol-A carbonate) (PBA): and
 (c) a crosslinker selected from a melamine crosslinker, a diisocyanate trimer (in other words a trimer of a diisocyanate), a diisocyanate, or a polyisocyanate In another aspect the present invention relates to a composition wherein the polyacid source is selected from aromatic polyacid sources, aliphatic polyacid sources, and combinations thereof.

In another aspect the present invention relates to a composition wherein the polyacid source is an aromatic polyacid source.

In another aspect the present invention relates to a composition wherein the polyacid source is an aliphatic polyacid source.

In another aspect the present invention relates to a powder coating comprising the reaction product of:
 (a) a polyester polyol, wherein the polyester polyol comprises recurring units derived from:
  (i) a polyacid source, and
  (ii) a first glycol;
 (b) poly(bisphenol-A carbonate) (PBA), and
 (c) a crosslinker selected from a melamine crosslinker, a diisocyanate trimer (in other words a trimer of a diisocyanate), a diisocyanate, or a polyisocyanate In another aspect the present invention relates to a powder coating wherein the coating comprises from 1% to 95% by weight of the polyester polyol.

In another aspect the present invention relates to a powder coating having at least one glass transition temperature, Tg, greater than or equal to 45° C.

In another aspect the present invention relates to a powder coating having at least one melting point greater than or equal to 45° C.

In another aspect the present invention relates to a powder coating further comprising a crosslinking agent, a flow control agent, a degassing agent, and a catalyst.

In another aspect the present invention relates to a powder coating further comprising a pigment.

In another aspect the present invention relates to a coated substrate comprising a powder coating of the present invention.

In another aspect the present invention relates to a coated substrate coated with a powder coating wherein the substrate is selected from aluminum, cold-rolled steel, phosphate cold-rolled steel, oxidizable metals, galvanized metals, and plated metals.

In another aspect the present invention relates to a coating comprising the reaction product of:
 (a) a polyester polyol, wherein the polyester polyol comprises recurring units derived from:
  (i) a polyacid source, and
  (ii) a first glycol;
 (b) a bisphenol, and
 (c) a crosslinker.

In another aspect the present invention relates to a coating wherein the polyester polyol comprises recurring units derived from a poly(bisphenol) carbonate.

In another aspect the present invention relates to a coating comprising a reaction product of:
 (a) a modified polyester polyol, wherein the modified polyester polyol comprises a reaction product of:
  (i) an aliphatic polyester polyol; and
  (ii) a first glycol;
 (b) 1 to 30 wt. %, based on the amount of the aliphatic polyester polyol, of poly(bisphenol-A carbonate); and
 (c) a crosslinker.

In another aspect the present invention relates to a coating wherein the poly(bisphenol-A carbonate) comprises 5 to 25 wt % based on the amount of the aliphatic polyester polyol.

In another aspect the present invention relates to a coating wherein the aliphatic polyester polyol is selected from the group consisting of ethylene glycol adipate, propylene glycol adipate, 1,3-propanediol adipate, 2-methyl-1,3-propanediol adipate, 1,4-butanediol adipate, 1,6-hexanediol adipate, ethylene glycol succinate, propylene glycol succinate, 1,3-propanediol succinate, 2-methyl-1,3-propandiol succinate, 1,4-butanediol succinate, 1,6-hexanediol succinate, and mixtures thereof.

In another aspect the present invention relates to a coating wherein the aliphatic polyester polyol is 1,6-hexanediol adipate.

In another aspect the present invention relates to a coating wherein the poly(bisphenol A carbonate) is a recycled poly (bisphenol A carbonate).

In another aspect the present invention relates to a carbonate polyol comprising a reaction product of poly(bisphenol A carbonate) and a di- or polyhydroxy compound, wherein the carbonate polyol has a hydroxyl number within the range of 22 to 300 mg KOH/g.

In another aspect the present invention relates to a carbonate polyol wherein the di- or polyhydroxy compound is selected from the group consisting of ethylene glycol, propylene glycol, 1,3-propanediol, 1,4-butanediol, 2-methyl-1, 3-propanediol, 1,6-hexanediol, glycerol, trimethylolpropane, pentaerythritol, and mixtures thereof.

In another aspect the present invention relates to a carbonate polyol having a hydroxyl number within the range of 112 to 280 mg KOH/g.

In another aspect the present invention relates to a carbonate polyol wherein the poly(bisphenol A carbonate) is a recycled poly(bisphenol A carbonate).

In another aspect the present invention relates to a blend comprising:
(a) 5 to 50 wt. %, based on the amount of blend, of the carbonate polyol; and
(b) a polyether polyol, a polyester polyol, a polycarbonate polyol, or a natural oil-based polyol.

In another aspect the present invention relates to a blend comprising:
(a) 5 to 50 wt. %, based on the amount of blend, of a glycolysis product of a poly(bisphenol A carbonate); and
(b) a polyether polyol, a polyester polyol, a polycarbonate polyol, or a natural oil-based polyol.

In another aspect the present invention relates to a coating comprising the carbonate polyol or the blend of the present invention.

In another aspect the present invention relates to a coating comprising a reaction product of a crosslinker and the carbonate polyol or the blend of the present invention.

In another aspect the present invention relates to a coating comprising the reaction product of:
(a) a polyester polyol, wherein the polyester polyol comprises recurring units derived from:
    (i) a polyacid source, and
    (ii) a first glycol; and
(b) poly(bisphenol-A carbonate) (PBA),
(c) a phenol scavenger; and
(d) a crosslinker.

In another aspect the present invention relates to a coating wherein the phenol scavenger is selected from carboxylic acids, dicarboxylic acids, alkylene oxides such as ethylene oxide and propylene oxide, glycidyl ethers, diglycidyl ethers, ethylene carbonate, propylene carbonate, and isocyanates, and combinations thereof.

In another aspect the present invention relates to a blend comprising: a polyester polyol and a poly(bisphenol-A carbonate) (PBA).

In another aspect the present invention relates to a blend wherein the polyester polyol comprises recurring units derived from a polyacid source.

In another aspect the present invention relates to a blend having substantially no free bisphenol contaminant.

In another aspect the present invention relates to a blend having substantially no free bisphenol-A contaminant.

In another aspect the present invention relates to a blend having a low VOC (volatile organic compound) emission.

In another aspect the present invention relates to a coating comprising a reaction product of a crosslinker and a blend of the present invention.

These and other aspects of the invention will become apparent from the disclosure herein.

Definitions

As used herein, the following terms have the indicated meanings unless expressly stated to the contrary:

The term "blend" as used herein relates to a physical mixture of two or more substances to a homogeneous state, such that they do not subsequently or appreciably separate.

The term "coated substrate" as used herein means a substrate or base material that is covered by or "coated" by the coating material.

The term "coating" as used herein and described in more detail below refers to a covering or layer of a material, i.e. the coating material that is applied to the surface of a substrate.

The term "first glycol" and "second glycol" are used here to distinguish the more than one glycol that can be used in the compositions of the present invention. The terms are used and intended such that the first and second glycols are selected separately, but the first and second glycols can be the same glycol material or mixture of glycol materials. These glycols are further described herein.

The term "glycolysis" as used herein is from the field of polymer chemistry where it refers to the digestion of a polymer with a glycol via a chemical reaction to yield lower molecular weight fragments, such as for example, oligomers and monomers.

The term "improved performance" as used herein refers to the performance of a coated substrate wherein the coated substrate has an improved performance as per at least one testing standard selected from ASTM B117, ASTM D714, ASTM D610, or ASTM D1654, when compared with that of a similar coated substrate prepared with a coating prepared from a polyester polyol without poly(bisphenol-A carbonate) or without recycled poly(bisphenol-A carbonate).

The term "improved salt spray performance" as used herein refers to the performance of a coated substrate wherein the coated substrate has an improved 500 hour salt spray resistance when compared with that of a similar coated substrate with a coating prepared from a polyester polyol without poly(bisphenol-A carbonate) or without recycled poly(bisphenol-A carbonate). This improved performance as measured by millimeters of creep from the scribe, the ratings in the field in terms of blister size and number, and corrosion in the field (i.e. not adjacent to the scribe in the panel).

Where improved performance can be quantified, in certain embodiments the improved performance can be defined as at least a 1 percent incremental difference, in other embodiments at least a 2 percent incremental difference, in other embodiments at least a 5 percent incremental difference, in other embodiments, at least a 10 percent incremental difference, and in other embodiments at least a 25 percent incremental difference.

The term "NCO/OH ratio" or "NCO/OH index" refers to isocyanate to hydroxyl number ratio.

The term "recycled polymer" as used herein refers to a polymer that has little value after its original lifespan has ended, and is recovered in an economically viable fashion from the original spent application for use in other applications.

The terms "having substantially no free bisphenol contaminant" and "substantially no free bisphenol-A contaminant" means that the levels of bisphenol contaminant or bisphenol-A contaminant, is such that the compositions have little or no residual bisphenol or bisphenol-A. Generally the residual levels should be less than about 5% by weight, or less than about 1% by weight, or less than about 0.1% by weight, or less than about 0.01% by weight, or less than about 0.001% be weight, or less than about 0.0001% by weight.

The term "having a low VOC emission", means that the VOC level is such to mean current US Federal and State standards.

The term "suitable for forming a coating" means a composition of the present invention that provides properties desirable in a coating, particularly coatings for substrates such as metals and the like. These coatings should demonstrate salts spray resistance, rub resistance, solvent resistance, etc. as described herein.

The terms "waste stream" as used herein refers to waste or discarded products from industry, agriculture, or consumer sources that has few ultimate destinations or applications other than for example, landfill, incineration, animal feed, concrete, burning as a source of energy, fertilization, landscaping mulch, or other relatively low value applications.

The term "substrate" as used herein generally refers to a solid material which can be covered by a coating. In general, the substrates herein are preferably metal substrates.

Polyester Polyols

The coatings herein are made from polyester polyols wherein the polyester polyol comprises recurring units derived from: (i) a polyacid source, (ii) poly(bisphenol-A carbonate) (PBA), and (iii) a glycol, wherein this glycol is also referred to as a "first glycol" and thus is distinguishable from other glycols that may be present, i.e. a "second glycol" or yet other further glycols. The polyacid source can be either an aromatic polyacid source or an aliphatic polyacid source.

Aromatic Polyacid Source

The term "aromatic polyacid source" is used to designate that the material or source contains one or more aromatic acid moieties or groups. Chemical Structure 1, below, provides an illustration of an Aromatic Polyacid Source.

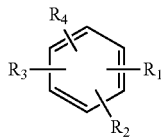

Chemical Structure 1

Where $R_1$ and R2 are carboxylate groups; and R3 and R4 are selected from carboxylate group or hydrogen.

Chemical Structure 2, below provides another illustration of an Aromatic Polyacid Source.

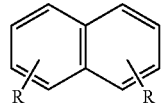

Chemical Structure 2

Where both R groups are carboxylic acid groups or alkyl ester groups.

Chemical Structure 3, below, provides another illustration of an Aromatic Polyacid Source.

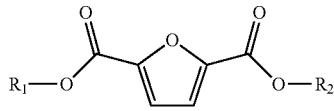

Chemical Structure 3

Where $R_1$ and $R_2$ are selected independently from either an alkyl group or hydrogen.

It should be noted that the aromatic polyacid source materials as described herein in this section are considered separate from and are a distinct component of the present invention, from the "Polybisphenol Polymers" as described, below.

The aromatic polyacid source includes polyesters such as thermoplastic polyesters. These include polyesters polymers prepared by the reaction of one or more difunctional and/or multifunctional aromatic carboxylic acids, i.e. polycarboxylic acids, with one or more difunctional hydroxyl compounds and/or multifunctional hydroxyl compounds, wherein the difunctional hydroxyl compounds, or glycols, are referred to as the "second glycol" such that they are distinguished from the "first glycol" as described herein.

Examples of materials that contain aromatic polyacid groups suitable for the practice of the invention include phthalic acid, phthalic anhydride, dimethyl phthalates, dialkyl phthalates, terephthalic acid, dimethyl terephthalates, dialkyl terephthalate, isophthalic acid, dimethyl isophthalates, dialkyl isophthalates, DMT bottoms (for example, as described in U.S. Pat. No. 5,075,417; U.S. Pat. No. 4,897,429; U.S. Pat. No. 3,647,759; U.S. Pat. No. 4,411,949; U.S. Pat. No. 4,714,717; and U.S. Pat. No. 4,897,429; which are incorporated by reference herein in their entirety), trimellitic acid, trimellitic anhydride, trimethyl trimellitate, naphthalene dicarboxylic acid, pyromellitic anhydride, 2,5-furandicarboxylic acid, dialkyl 2,5-furandicarboxylate, pyromellitic acid, dialkyl naphthalene dicarboxylate, and mixtures thereof.

Also, the term "terephthalic acid" is intended to include terephthalic acid itself and residues thereof as well as any derivative of terephthalic acid, including its associated acid halids, esters, half-esters, salts, half-stats, anhydrides, mixed anhydrides, or mixtures thereof or residues thereof useful in a reaction process with a diol to make a polyester.

Aromatic polyacid sources may also be obtained from thermoplastic polyesters. Thermoplastic polyesters suitable for use are well known in the art. They are condensation polymers produced from the reaction of glycols and aromatic polycarboxylic acids or polycarboxylic acid derivatives, such as dicarboxylic acids or dicarboxylic acid derivatives. Examples include polyethylene terephthalate (PET), polybutylene terephthalate (PBT), polytrimethylene terephthalate (PTT), glycol-modified polyethylene terephthalate (PETG), copolymers of terephthalic acid and 1,4-cyclohexanedimethanol (PCT), copolymers of 2,5-furandicarboxylic acid or dialkyl 2,5-furandicarboxylates and at least one glycol, PCTA (an isophthalic acid-modified PCT), copolymers of naphthalene dicarboxylic acid or dialkyl naphthalene dicarboxylate and the like, and mixtures thereof.

Some examples of therrmoplastic polyesters are copolymers of an aromatic polyacid and a glycol (i.e. a second glycol as defined herein), wherein the aromatic polyacid is selected from phthalic acid, terephthalic acid, 2,5-furandicarboxylic acid, isophthalic acid, dihydroferulic acid, salts thereof, C1-C6 monoesters thereof, C1-C6 diesters thereof, and combinations thereof; and the second glycol is selected from ethylene glycol, 1,2-propanediol, 1,3-propanediol, 1,2-butanediol, 1,3-butanediol, 1,4-butanediol, 2,3-butanediol, neopentyl glycol, glycerol, trimethylolpropane, 3-methyl-1,5-pentanediol, 1,3-cyclohexane diol, 1,4-cyclohexane diol, 1,3-cyclohexanedimethanol, 1,4-cyclohexanedimethanol, diethylene glycol, tetraethylene glycol, dipropylene glycol, triethylene glycol, tripropylene glycol, polyethylene glycol, polypropylene glycol, erythritol, pentaerythritol, sorbitol, 2,2,4,4-tetramethyl-1,3-cyclobutane diol, and block or random copolymer glycols of ethylene oxide and propylene oxide, and combinations thereof.

Suitable thermoplastic polyesters include virgin polyesters, recycled polyesters, or mixtures thereof. Polyethylene terephthalate (PET) is particularly preferred, especially recycled polyethylene terephthalate (rPET), virgin PET, and mixtures thereof. For more examples of suitable thermoplastic polyesters, see U.S. Pat. Appl. Publ. No. 2009/0131625, which is incorporated by reference herein in its entirety.

Recycled polyethylene terephthalate suitable for use in making the inventive polyester polyols can come from a variety of sources. The most common source is the post-consumer waste stream of PET from plastic bottles or other containers. The rPET can be colorless or contain dyes (e.g., green, blue, brown, or other colors) or be mixtures of these. A minor proportion of organic or inorganic foreign matter (e.g., paper, other plastics, glass, metal, etc.) can be present. A desirable source of rPET is "flake" rPET, from which many of the common impurities present in scrap PET bottles have been removed in advance. Another desirable source of rPET is pelletized rPET, which is made by melting and extruding rPET through metal filtration mesh to further remove particulate impurities. Because PET plastic bottles are currently manufactured in much greater quantity than any recycling efforts can match, scrap PET will continue to be available in abundance. Other sources of PET include, PET textiles and PET carpeting, such as recycled PET textiles and recycled PET carpeting. For example, recycled PET polyester carpet including polyolefin backing, calcium carbonate filler, and latex adhesive, assuming an approximate PET composition of 90% of the carpet, is a useful source material to prepare the digested intermediate.

Polytrimethylene terephthalate (PTT) is another useful polyaromatic source, and like PET, can be obtained from PTT textiles and PTT carpeting, such as recycled PTT textiles and recycled PTT carpeting. For example, recycled PTT polyester carpet including polyolefin backing, calcium carbonate filler, and latex adhesive, assuming an approximate PTT composition of 90% of the carpet, is a useful source material to prepare the digested intermediate.

Other useful polyaromatic sources are polyesters made from polyaromatics and rigid diols such as cycloalkane diols, examples of such rigid diols including 2,2,4,4-tetramethyl-1,3-cyclobutanediol, 1,3-cycohexane diol, 1,4-cyclohexane diol, 1,3-cyclohexanedimethanol, and 1,4-cyclohexanedimethanol. Such examples include terephthalate copolyesters of 2,2,4,4-tetramethyl-1,3-cyclobutanediola, and also polyesters which also contain flexible diols, such as C2-C6 linear or branched aliphatic diols. Examples of these polyesters include, for example Eastman Tritan materials from post consumer recycle of water bottles See also U.S. Patent Application Ser. No. US 2013/0072628 A1, to Crawford et al., published Mar. 21, 2013; and D. R. Kelsey et al., *High Impact, Amorphous Terephthalate Copolyesters of Rigid* 2, 2,4,4-*Tetramethyl*-1,3-*cyclobutanediol with Flexible Diols,* Macromolecules, 2000, 33, 5810-5818; which are incorporated by reference herein in their entirety.

Aliphatic Polyacid Source

The polyester polyol can contain recurring units derived from an aliphatic polyacid source. The term "aliphatic polyacid source" is used to designate that the material or source contains one or more aliphatic acid moieties or groups.

Examples of aliphatic polyacid sources include the mono- or dialkyl esters of maleic anhydride or succinic anhydride, the mono-or dialkyl esters of succinic acid, maleic acid, lactic acid, fumaric acid, suberic acid, sebacic acid, azelaic acid, adipic acid, malonic acid, glutaric acid, nonandioic acid, nonenedioic acid, sebacic acid, decenedioic acid, dodecanedioic acid, dodecenedioic acid, tetradecanedioic acid, tetradecenedioic acid, hexadecanedioic acid, octadecanedioic acid, decenedioic or its mono- or dialkyl esters, and mixtures thereof. Preferably, the aliphatic polyacid source is selected from adipic acid, suberic acid, sebacic acid, succinic acid, nonanedioic acid, octadecanedioic acid, decenedioic hexadecanedioic acid or its mono- or dialkyl esters, and mixtures thereof.

Furthermore, when the polyester polyols are aliphatic polyester polyols, they can be derived from aliphatic polyacid sources, where the aliphatic polyacid source is reacted with a glycol stream and preferably also a hydrophobe.

Polybisphenol Polymers

The compositions and processes of the present invention comprise a polyester polyol comprising recurring units of a polybisphenol polymer. These polymers have or contain a carbonate functional group. The polybisphenol polymers are generally digestible polymers, which means that they are capable of being "digested" or broken down or degraded into smaller polymeric, oligomeric, or monomeric components via a chemical reaction such as glycolysis or via an enzymatic reaction.

These polybisphenol polymers can be obtained from recycled polymers and waste streams. In fact, in view of green chemistry and sustainability considerations, it is highly desirable to use polybisphenol polymers from such sources. The polybisphenol polymers may further be obtained from virgin or newly manufactured sources. This latter choice makes sense in cases where the additional performance benefit obtained by digesting the newly manufactured polymer provides a value-added benefit to the resulting polyester polyol product.

Polycarbonates

Polycarbonates such as poly(bisphenol-A carbonate) (PBCA) and particularly recycled polycarbonates such as recycled poly(bisphenol-A carbonate) (rPBCA) are polymers useful herein. Polycarbonates are polymers containing repeating units connected by carbonate functional groups. Many polycarbonates of commercial interest are derived from rigid monomers. A balance of useful features including temperature resistance, impact resistance and optical properties position polycarbonates between commodity plastics and engineering plastics. Polycarbonates can be produced by the reaction of bisphenol-A (BPA) and phosgene. The resulting polymer is known as poly(bisphenol-A carbonate), i.e. PBAC. It is found that recycled poly(bisphenol A carbonate), i.e. rPBAC, can also be used. Although the chemolysis of polycarbonates is known, none of the scientific works studied the use of aromatic polyester polyols as glycolyzing agents for rPBAC. See A. Oku, S. Tanaka, S. Hata, *Polymer* 41 (2000) 6749-6753; D. Kim, B., Kim, Y. Cho, M. Han, B., Kim, *Ind. Eng. Chem. Res.* (2009), 48, 685-691; and C. Lin, H. Lin, W. Liao, S.A. Dai, *Green Chemistry,* (2007), 9, 38-43, which are incorporated by reference herein in their entirety.

Examples of polycarbonates useful here include Lexan®, Calib®, and Makrolon®. Polycarbonate is coded 7 implying that it is difficult to recycle, however, polycarbonate bottles and CDs are being extensively recycled. One method of recycling polycarbonate is by chemical recycling. PC is made to react with phenol in the presence of a catalyst to form BPA and DPC monomers. After purification, both these monomers are used to produce the polymer. The current invention provides an improved method for recycling polycarbonate thermoplastics.

Other Bisphenol or Polyphenol Polymers

Furthermore, the polyols can comprise units of a bis- or poly-phenol having two or more phenylene rings, wherein at least two of the phenylene rings lack a common molecular axis. A "bis- or polyphenol" has at least two phenolic hydroxyl groups, which may be on the same or different phenylene (benzene) rings, but are preferably on different phenylene rings. At least two of the phenylene rings lack a "common molecular axis." Common examples are bisphenols, such as bisphenol A. In such compounds, the linking group between the phenylene rings prevents the rings from sharing a common molecular axis. In contrast, consider 4,4'-dihydroxybiphenyl. Because the phenylene rings are joined directly together, they share a common molecular axis. Additionally, polyphenolic materials such as novolac resins, ethoxylated novolac resins, and the like may be used. In some aspects, the bis- or poly-phenol is selected from bisphenol A, bisphenol F, bisphenol acetophenone, ethoxylated bisphenol A, ethoxylated bisphenol F, 4,4'-sulfonyldiphenol, ethoxylated 4,4'-sufonyldiphenol, and mixtures thereof.

Digestion Medium for the Polybisphenol Polymers

The polybisphenol polymers, such as the polycarbonates, can be digested with a material from the digestion of an aromatic polyacid source. Various polyacid sources are useful for being digested to provide the digestion medium, including a thermoplastic polyester. Examples of such thermoplastic polyesters include polyethylene terephthalate (PET), polybutylene terephthalate, polytrimethylene terephthalate, glycol-modified polyethylene terephthalate, copolymers of terephthalic acid and 1,4-cyclohexanedimethanol, isophthalic acid-modified copolymers of terephthalic acid and 1,4-cyclohexanedimethanol, copolymers of 2,5-furandicarboxylic acid or dialkyl 2,5-furandicarboxylates, or combinations thereof. One or more glycols can also be used with the material described above in this paragraph. These glycols can be the same as those described below in the "Glycols (The First Glycol)" section. Examples of preferred glycols include ethylene glycol, propylene glycol, diethylene glycol, and low molecular weight polyethylene glycols, i.e. with molecular weights less than about 400, and combinations thereof.

Also, as described herein, the polyester polyols can be made in a one pot or one reactor system in which the aromatic polyacid source, the polybisphenol polymer, and the glycol (i.e. the first glycol), are combined such that the aromatic polyacid source and the glycol (i.e. the first glycol) form the digestion material in the presence of the polybisphenol polymer and thus digest the polybisphenol polymer.

Particularly useful herein are digestible polycarbonate polymers such as poly(bisphenol-A carbonate) and recycled poly(bisphenol-A carbonate).

Catalysts

Catalysts suitable for making the digested intermediate are well known (see, e.g., K. Troev et al., *J. Appl. Polym. Sci.* 90 (2003) 1148). In particular, suitable catalysts comprise titanium, zinc, antimony, germanium, zirconium, manganese, or other metals. Specific examples include titanium alkoxides (e.g., tetrabutyl titanate), titanium(IV) phosphate, zirconium alkoxides, zinc acetate, lead acetate, cobalt acetate, manganese(II) acetate, antimony trioxide, germanium oxide, or the like, and mixtures thereof. Catalysts that do not significantly promote isocyanate reaction chemistries are preferred. The amount of catalyst used is typically in the range of 0.005 to 5 wt. %, preferably 0.01 to 1 wt. %, more preferably 0.02 to 0.7 wt. %, based on the total amount of polyol being prepared.

The hydrolysis and chemolysis of the digestible polymer can be catalyzed by the use of enzymes such as proteases; lipases; amylases; maltases; sucrases; lactases; esterases; hydrolases; amidases; glycosidases; glycoside hydrolases; peptidases and the like and mixtures thereof. Subsequent reaction of the resulting hydrolysis or chemolysis products with the digested intermediate may then be facilitated by enzymes such as lipases; amidases and esterases.

The reaction of the digestible polymer with the digested intermediate can also be catalyzed by the use of acids or bases, including carboxylic acids.

Bisphenols

In alternative aspects, the polyester polyols comprise recurring units of a bisphenol. Without being limited by theory, in some aspects the bisphenol can replace in whole or in part the poly(bisphenol-A carbonate). The bisphenol is selected from bisphenols, bisphenol alkoxylates, bisphenol polycarbonates, sulfonyl diphenols, and sulfonyl diphenol alkoxylates. These classes of bisphenols commonly have at least two phenolic groups separated by a linking group, which in some aspects is carbon or sulfur. In bisphenol A, for instance, two phenolic units are separated by a —C$(CH_3)_2$— group.

Suitable bisphenols include, for example, bisphenol A (from acetone and phenol), bisphenol AP (from acetophenone and phenol), bisphenol AF (from hexafluoroacetone and phenol), bisphenol B (from methyl ethyl ketone and phenol), bisphenol BP (from benzophenone and phenol), bisphenol C (from acetone and cresol), bisphenol E (from acetaldehyde and phenol), bisphenol F (from formaldehyde and phenol), bisphenol G (from acetone and 2-isopropylphenol), bisphenol PH (from acetone and 2-phenylphenol), bisphenol Z (from cyclohexanone and phenol), and the like, and alkoxylates or polycarbonates made from these.

Suitable sulfonyl diphenols include, for example, bisphenol S (from sulfur trioxide and phenol, also known as 4,4'-sulfonyldiphenol), 4,4'-sulfonyldicresol (from sulfur trioxide and cresol), and the like, and alkoxylates or polycarbonates made from these.

Thus, in some aspects, the bisphenol may be, for example, bisphenol A, bisphenol F, bisphenol AP, ethoxylated bisphenol A, ethoxylated bisphenol F, 4,4'-sulfonyldiphenol, ethoxylated 4,4'-sufonyldiphenol, or mixtures thereof.

The clarifier is used in an amount within the range of 0.1 to 50 wt. % based on the amount of polyester polyol, with the exact amount being within the skilled person's discretion. In other aspects, 0.5 to 40 wt. %, or 1.0 to 30 wt. %, or 2.0 to 15 wt. % of the clarifier is used. In some aspects, 6 to 30 wt. % or 10 to 25 wt. % of the clarifier may be more desirable. Too little clarifier may have a limited impact on the long-term clarity of the polyol, while too much of the clarifier may generate a product with undesirably high viscosity.

Glycols (The First Glycol)

The glycols described in this section are referred to as a "first glycol" to distinguish them from additional glycols, e.g. the "second glycol" or yet further glycols, which can be the same or different from the first glycol. Glycols suitable for use are well known. By "glycol," we mean a linear or branched, aliphatic or cycloaliphatic compound or mixture of compounds having two or more hydroxyl groups. Other functionalities, particularly ether or ester groups, may be present in the glycol. In preferred glycols, two of the hydroxyl groups are separated by from about 2 to about 20 carbons, preferably from about 2 to about 14 carbon atoms, and more preferably from about 2 to about 8 carbons. Note that ether linkages may be included in the carbon separation between hydroxyl groups, though the oxygen atoms are not included in the carbon count. Suitable glycols include, for example, ethylene glycol, propylene glycol, 1,3-propanediol, 1,2-butylene glycol, 1,3-butylene glycol, 1,4-butanediol, 2-methyl-1,3-propanediol, neopentyl glycol, glycerol, trimethylolpropane, 3-methyl-1,5-pentanediol, 1,4-cyclohexane-dimethanol, diethylene glycol, dipropylene glycol, triethylene glycol, 1,6-hexanediol, tripropylene glycol, tetraethylene glycol, polyethylene glycols (PEGs), polypropylene glycols (PPGs), erythritol, pentaerythritol, sorbitol, and block or random copolymer glycols of ethylene oxide and propylene oxide, and the like, and mixtures thereof. Preferably, the glycol is selected from ethylene glycol, propylene glycol, 2-methyl-1,3-propanediol, diethylene glycol, 3-methyl-1,5-pentanediol, neopentyl glycol, and polyethylene glycols with molecular weights less than about 600 (e.g., PEG 200 and PEG 400), and mixtures thereof. Propylene glycol is particularly preferred. In a preferred aspect, the glycol is a recycled glycol, especially propylene glycol and recycled diethylene glycol. Propylene glycol recovered from used deicing fluids is one example. In another preferred aspect, the glycol is a recycled ethylene glycol, which may be recovered from used engine antifreeze or coolant.

Crosslinkers

The coatings of the present invention are further made from crosslinker units. A crosslinker is a chemical moiety that links the chains of a polymer to one another.

The crosslinkers useful herein are selected from melamine crosslinkers, diisocyanate crosslinkers, diisocyanate trimer crosslinkers (in other words trimers of diisocyanates), and polyisocyanate crosslinkers.

Melamine Crosslinkers

Melamine crosslinkers are also useful herein. Melamine is a trimer of cyanamide, with a 1,3,5-triazine skeleton and corresponds to the following structure.

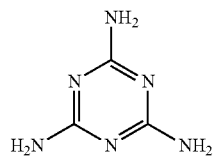

The compound hexakis(methoxymethyl)melamine (HMMM) and hexakis(hydroxymethyl) melamine are also useful crosslinkers.

Diisocyanate and Polyisocyanate Crosslinkers

Diisocyanate and polyisocyanate crosslinkers are useful herein. Diisocyanates are chemical compounds having two reactive isocyanate moieties. In one aspect, diisocyanates such as hexamethylene diisocyanate can be employed herein. Other examples of diisocyanates include methylenebis(phenyl isocyanate) (MDI), polymeric methylene bis (phenyl isocyanate), toluene diisocyanate (TDI), and hexamethylene diisocyanate (HDI), naphthalene diisocyanate (NDI), methylene bis-cyclohexylisocyanate (HMDI), isophorone diisocyanate (IPDI), xylylene diisocyanate, hydrogenated xylylene diisocyanate, 2,2,4-trimethyl hexamethylene diisocyanate, 2,4,4-trimethyl hexamethylene diisocyanate and pentamethylene 1,5-diisocyanate. Derivatives of such diisocyanates may also be used, such as biurets, prepolymers, carbodiimides, and allophanates. Blocked isocyanate derivatives may also be utilized in the practice of the present invention. Examples of such blocked isocyanate derivatives include the reaction product of a di- or polyisocyanate with a thermally-labile blocking agent such as a phenol, caprolactam, benzotriazole, oximes, diisopropyl amine, t-butyl benzyl amine, and certain malonates. In another aspect of the present invention, the diisocyanate may be in the form of a trimer or isocyanurate. Such examples of trimers include hexamethylene diisocyanate trimer, 4,4'-methylene diphenyl diisocyanate trimer, isophorone diisocyanate trimer, and combinations thereof. A particular example of such a trimer is HDI isocyanurate trimer CAS #3779-63-3. Blends of these diisocyanates, derivatives thereof, and trimers thereof may be used. The diisocyanate crosslinked compositions should have an NCO/OH number ratio, or index, from about 0.75 to about 1.5. Another ratio is from 1.0 to 1.5. Another ratio is about 1.05. The NCO/OH number ratio or index refers to the isocyanate to hydroxyl number for the material.

Corrosion Prevention Additives

In certain embodiments the compositions can comprise a corrosion prevention additive. Examples of corrosion prevention additives include zinc phosphate (including modified zinc phosphate such as Heucophos ZPZ modified zinc phosphate), zinc chromate, Butrol 23, barium metaborate, calcium silica gel (such as, e.g., Shieldex Calcium Silica Gel), Cotrol 18-8 Amino Carboxylate, barium phosphosilicate (such as, e.g., HALOX BW-111 barium phosphosilicate), aluminum triphosphate (such as, e.g., K-White 105 aluminum triphosphate), and combinations thereof.

Hydrophobes and Nonionic Surfactants

The polyester polyols of this invention can also comprise hydrophobes, nonionic surfactants, and mixtures thereof. Hydrophobes include triglycerides and modified triglycerides, fatty acids, fatty acid esters, dimer fatty acids, fatty diacids, vegetable oils and modified vegetable oils (for example as described in U.S. Pat. No. 5,922,779, U.S. Pat. No. 6,359,022, U.S. Pat. No. 6,664,363, and WO 2013/154874A1); castor oil (for example, as described in WO 2013/154874A1); modified or derivatized polyterpenes; modified cashew nut shell oil; cardanol; derivatives of cardanol; Diels Alder or ene reaction modified polyols (for example, as described in WO 2013/109834); and tall oil fatty acids (for example, as described in U.S. Pat. No. 5,075,417 and U.S. Pat. No. 4,897,429). The aromatic polyester polyols may further comprise nonionic surfactants or reactants (for example, as described in U.S. Pat. No. 4,529,744, WO 9919377 and WO 2009045926). All of which are cited in this paragraph are incorporated by reference herein in their entirety.

Examples of triglycerides suitable for the practice of this invention include soybean oil, animal tallow, fish oil, canola oil, castor oil, tung oil, linseed oil, corn oil, recycled cooking oil, sunflower oil, palm oil, peanut oil, palm kernel oil, cottonseed oil, coconut oil, and safflower oil.

Examples of fatty acids suitable for the practice of this invention include linoleic, myristic, palmitic, caproic, caprylic, capric, 2-ethyl hexanoic, lauric, stearic, oleic, linolenic, ricinoleic, tall oil, and mixtures thereof. The alkyl esters of these fatty acids and mixtures of these alkyl esters thereof are also suitable examples for the practice of this invention.

Examples of fatty diacids suitable for the practice of this invention include azelaic acid; sebacic acid; dodecanedioic acid; tetradecanedioic acid; hexadecanedioic acid; octadecanedioic acid; nonene dioic acid; decenedioic acid, dodecenedioic acid; tetradecenedioic acid; hexadecenedioic acid; octadecenedioic acid; eicosendioic acid; eicosandioic acid; docosandioic acid; tetracosandioic acid; tetracosendioic acid; and the like and mixtures thereof.

Examples of nonionic surfactants include block copolymers of ethylene oxide with either propylene oxide, butylene oxide, or mixtures of propylene oxide with butylene oxide. See "nonionic Surfactants: Polyoxyalkylene Block Copolymers", (Surfactant Science Series, Book 60, CRC Press), 1996, Vaughn Nace, ed. and "Nonionic Surfactants: Organic Chemistry" (Surfactant Science Series Book 72), 1997 Nico M. van Os., ed., which are incorporated by reference herein in their entirety. It is well known that initiators are used to initiate such block copolymers. Suitable initiators include glycols; monols; fatty alcohols; alkyl phenols; phenol; styrenated phenols; bisphenols; triols; and tetrols. An additional nonionic surfactant suitable for use as a reactant or additive includes ethoxylated or alkoxylated castor oil.

Phenol Scavengers

In further embodiments the compositions of the present invention optionally comprise a phenol scavenger, to help reduce levels of residual bisphenol and related compounds. The phenol scavenger is selected from carboxylic acids, dicarboxylic acids, alkylene oxides such as ethylene oxide and propylene oxide, glycidyl ethers, diglycydyl ethers, ethylene carbonate, propylene carbonate, and isocyanates, and combinations thereof.

Additionally, alkylene oxides such as ethylene oxide and propylene oxide can be used to cap or scavenge residual bisphenol-A. In such embodiments an acid or base catalyst can be employed to facilitate the scavenging.

Coatings

The polyester polyols of the present invention are useful for making coatings. A coating is a covering that is applied to the surface of an object, which usually referred to as the substrate. The coatings typically comprise from about 1% to about 95%, by weight of the polyester polyol, preferably from about 2% to about 90% by weight of the polyester polyol, and more preferably from about 5% to about 80% by weight of the polyester polyol. The optimum weight percentage of the polyester polyol can be determined by one of skill in the art to obtain the desired property of the coating both before and after application to the substrate. Both liquid coatings and powder coatings can be made with the polyols of the present invention. Examples of liquid coatings include polyurethane coatings. These liquid coatings can include additional components such as catalysts, flow and leveling agents, surface modifying additives, wetting agents, dispersing agents, foam-control agents, solvents, crosslinking additives, co-blended resins to modify properties, pigments and colorants, and degassing agents.

Powder coatings provide an important alternative to liquid coatings. These coatings can be prepared from resins, pigments, and additives. The powder is applied to a substrate, usually metal, and fused to form a continuous film by baking the coated metal, or by applying the powder coating to a heated substrate. The powder coatings typically have a glass transition temperature, Tg, greater than or equal to 45° C., preferably greater than or equal to 50° C., and more preferably greater than or equal to 55° C. The powder coatings also typically have a melting point greater than or equal to 45° C., preferably greater than or equal to 50° C., and more preferably greater than or equal to 55° C. The glass transition temperature and the melting point of the powder coating can be adjusted by the selection of the polyester polyol or polyols incorporated, as well as the weight percentage of the polyol or polyols in the coating. It is highly desirable to adjust the glass transition temperature and melting point such that the powder coating remains as a free flowing powder at room temperature and elevated storage conditions, such as for example in a hot warehouse, but also readily melts to form a uniform coating on a substrate that has either been preheated before application of the powder coating or that is subsequently baked after application of the powder coating. While it is important to maintain a high enough glass transition temperature and melt temperature to prevent sintering, it is desirable to simultaneously tune the powder coating such that the optimal melt flow and cross-linking temperature is as low as possible, which results in a lower, narrower process window for films. This lower temperature is advantageous from an energy savings standpoint to the applicator. Additives are an important ingredient in the formulation of powder coatings. For the most part, additives perform the same functions in powder coatings as in liquid coatings. With the exception of wetting, dispersing and foam-control agents, many of the same additives used in liquid coatings are also used in powders. The powder coatings can comprise additional components such as crosslinking agents, flow control agents, degassing agents, catalysts, and pigmenting materials. The powder coatings can be applied to a metal substrate using conventional techniques known in the art such as electrostatic spraying. The metal substrate can either be preheated before application of the powder coating or baked after the application of the powder coating to thermally set the coating.

The liquid coatings of the present invention can be either 1K or 2K coatings. Examples of liquid coatings include polyurethane coatings.

The liquid coatings can include additional components such as catalysts, flow and leveling agents, surface modifying additives, wetting agents, dispersing agents, foam-control agents, solvents, crosslinking additives, co-blended resins to modify properties, pigments and colorants, and degassing agents.

The term 1K coating is used to described a coating that does not require a hardener, catalyst, or activator. The term is also used to describe single component paints that dry in the air, examples of which include latex house paint, traditional lacquer, and aerosol spray can paints.

The term 2K coating is used to describe a coating that is mixed with a hardener, catalyst, or activator. Generally, such coatings are more durable than 1K coatings and less susceptible to damage. With 2K coatings, the activator is kept in a separate compartment or container and is mixed with the coating prior to or during application.

See U.S. Pat. No. 5,637,654, to Panandiker et al, issued Jun. 10, 1997; U.S. Pat. No. 4,197,353, to Tobias et al, issued Apr. 8, 1980; PCT Patent Application No. WO 2011/138432 A1, to DSM IP Assets, B. V., published Nov. 10, 2011; and "Organic Coatings Science and Technology", 3rd Ed., Wiley, 2007, Z. Wicks, Jr., F. Jones, S. P. Pappas, D. A. Wicks, Chapter 28, which are incorporated by reference herein in their entirety.

Processes, Properties and Compositions

The present invention provides a means for recycling both the polyacid source and the polybisphenol polymer to provide a polyester polyol having a high recycle content. The recycle content of the resultant polyester polyol can have a wide range of recycle content, but those having a recycle content of about 50% by weight or more would be particularly attractive.

With respect to recycle streams, when the material is nylon-6, nylon-6,6, or PTT carpet, the fibers typically originate as post-industrial off-grade or defective recycle carpet, greige goods, or fiber products and post-consumer recycle carpet. In the case of post-consumer recycled carpet, the carpet is typically collected by carpet un-installers for use as a recycle stream. This stream has more contaminants such as dirt, pet hair, mold and the like than a post-industrial recycle carpet stream, and may require a washing step in conventional recycling schemes prior to use as a recycled nylon-6, nylon-6,6, or PTT stream. Hence, a process, as in the present invention, that circumvents the need for a wash step would represent an improvement in sustainability.

When the recycle stream is a polycondensation or addition polymer textile or fabric, or fibers, the material typically originates as post-industrial off-grade or scrap, and can contain dyes and other contaminants. Post industrial off-grade might originate from incorrectly dyed fabric or incorrectly woven textiles. Post industrial scrap can originate from leftover fabric that results from cutting fabric during the manufacture of clothing, carpet, furniture, shoes, curtains, and other textile based articles that use polycondensation or addition polymer textiles or fabrics. Post consumer recycling of polycondensation or addition polymer textiles or fabrics can occur by utilizing worn-out clothing from apparel and uniform manufacturers and retailers as well as government agencies, hospitals and clinics, schools, sports clubs, and other entities.

For example, the thermoplastic polyester and glycol are heated, optionally in the presence of a catalyst, to give a digested intermediate. The digested intermediate will commonly be a mixture of glycol reactant, glycol(s) generated from the thermoplastic polyester, terephthalate oligomers, and other glycolysis products. For example, when PET or rPET is the thermoplastic polyester, the digested intermediate will include a mixture of glycol reactant, ethylene glycol (generated from the PET or rPET), bis(2-hydroxyalkyl) terephthalate ("BHAT"), higher PET oligomers, and other glycolysis products. Similar digested mixtures in various forms have been made and characterized previously (see, e.g., D. Paszun et al., *Ind. Eng. Chem. Res.* 36 (1997) 1373 and N. Ikladious, *J. Elast. Plast.* 32 (2000) 140, which are incorporated by reference herein in their entirety). Heating is advantageously performed at temperatures within the range of 80° C. to 260° C., preferably 130° C. to 240° C., more preferably 150° C. to 230° C., and most preferably 160° C. to 220° C.

More specifically, in the context of the present invention, glycolysis refers to the reaction of the hydroxyl group of a digested aromatic polyacid source, e.g., a thermoplastic polyester intermediate with a digestible polymer in a manner to reduce the molecular weight of the digestible polymer thereby providing a polyol that is liquid at temperatures between 20° C. and 120° C.

In one aspect, when the thermoplastic polyester is polyethylene terephthalate, the digested intermediate comprises a glycol or mixture of glycols and a terephthalate component. The glycols and terephthalate components must be digested via a transesterification reaction and this digestion reaction is performed by heating the thermoplastic polyester, glycol(s), and any catalyst at least until the mixture liquefies and particles of the thermoplastic polyester are no longer apparent at the temperature of reaction. Reaction times range from about 30 minutes to about 16 hours, more typically 1 to 10 hours, even more typically 3 to 8 hours, and will depend on the reaction temperature, source of the thermoplastic polyester, the particular glycol reactant used, mixing rate, desired degree of depolymerization, and other factors that are within the skilled person's discretion.

The molar ratio of glycol to aromatic polyacid source is at least 0.8, preferably 2.0 to 6.0, more preferably 2.5 to 4.5. When the glycol/aromatic polyester source molar ratio is below about 2.0, the products are often solids at room temperature or too viscous to be practical for use as conventional polyols for polyurethane applications, however, for the purpose of digesting digestible polymers at elevated temperatures, glycol to thermoplastic polyester ratios between 0.8 and 2.0 are acceptable. On the other hand, when the glycol/aromatic polyester source molar ratio is greater than about 6, the hydroxyl numbers of the resulting digested digestible polymer-based polyols tend to exceed the practical upper limit of about 800 mg KOH/g.

In a second reaction step, the digested intermediate described above is reacted with a digestible polymer to give the inventive polyester polyol.

The reaction between the digested intermediate and the digestible polymer is performed under conditions effective to promote reaction between one or more functional groups of the digestible polymer and hydroxyl groups present in the digested intermediate.

The weight percent of digestible polymer in the resulting polyester product after digestion is from 1% to 75%, preferably from 3% to 60%, most preferably from about 5% to about 45%.

As long as some digestible polymer is used to make the polyol, one or more other digestible polymers can also be included. Mixtures of digestible polymers can be used.

In another aspect, the polyester polyol is made in a single step, or one pot reaction, by reacting the aromatic polyacid source, glycol, and digestible polymer under conditions effective to produce the polyol. As with polyols made using the two-step process, the weight percent of digestible polymer in the resulting polyester product after digestion is from 1% to 75%, preferably from 3% to 60%, most preferably from 5% to 45%, the molar ratio of glycol to aromatic polyester source is at least 0.8, and the resulting polyol has a hydroxyl number within the range of 10 to 800 mg KOH/g. When the single-step process is used, it is preferred to utilize a condensation system that returns glycols to the reaction vessel while allowing removal of water, as removal of too much glycol can result in cloudy or opaque polyols.

The inventive polyester polyols have hydroxyl numbers within the range of 10 to 800 mg KOH/g, preferably 25 to 500 mg KOH/g, more preferably 35 to 400 mg KOH/g, and even more preferably 50 to 400 mg KOH/g. Hydroxyl number can be measured by any accepted method for such a determination, including, e.g., ASTM E-222 ("Standard Test Methods for Hydroxyl Groups Using Acetic Anhydride Acetylation").

The inventive polyols preferably have average hydroxyl functionalities (i.e., the average number of —OH groups per molecule) within the range of 1.5 to 5.0, more preferably 1.8 to 4.5, and most preferably 2.0 to 4.0.

The inventive polyols are flowable liquids at temperatures between 20° C. and 125° C. Preferably, the polyols have viscosities measured at between 25° C. and 125° C. of less than about 20,000 cP. In some embodiments, the polyols have a viscosity at 25° C. less than about 20,000 cP. In other embodiments, the polyols have a viscosity at 25° C. less than about 10,000 cP. In yet other embodiments, the polyols have a viscosity at 125° C. less than about 5000 cP. However, polyols outside these viscosity ranges can also be useful.

Viscosity can be determined by any industry-accepted method. It is convenient to use, for instance, a Brookfield viscometer (such as a Brookfield DV-III Ultra rheometer) fitted with an appropriate spindle, and to measure a sample at several different torque settings to ensure an adequate confidence level in the measurements.

The polyols preferably have low acid numbers. Urethane manufacturers will often require that a polyol have an acid number below a particular specification. Low acid numbers can be ensured by driving the condensation step (with digestible polymer) to the desired level of completion or by adding an acid scavenger (e.g., Cardura™ E10P glycidyl ester manufactured by Momentive) at the conclusion of the condensation step. Preferably, the polyols have an acid number less than 30 mg KOH/g, more preferably less than 10 mg KOH/g, and most preferably less than 5 mg KOH/g. As suggested above, it is acceptable practice to adjust acid numbers if necessary for a particular application with an acid scavenger such as, for example, an epoxide derivative, and this treatment can be performed by the manufacturer, distributor, or end user.

In the case of polyester polyols prepared using PU or PIR digestible polymers, small amounts of toluene diamine (TDA), methylene diphenyl amine (MDA) or polymeric methylene diphenyl amine (PMDA) may be formed. As these substances are hazardous materials, it is desirable to reduce or eliminate their presence in the resulting polyester polyols. It is believed that this may be accomplished by introducing small amounts of an amine scavenger such as, for example, an alkylene oxide, a glycidyl ether, an epoxy-derivative such as epoxidized soybean oil, an isocyanate or polyisocyanate derivative into the resulting polyester polyol concurrent with heating and stirring to achieve reaction between the TDA, PMDA or MDA an the amine scavenger, thereby reducing the content of these hazardous substances in the polyester polyols derived from PU and PIR digestible polymers.

An advantage of the polyester polyols is their reduced reliance on bio- or petrochemical sources for raw material. Preferably, the polyols include greater than 10 wt. %, more preferably greater than 25 wt. %, most preferably greater than 50 wt. % of recycle content. A preferred range for the recycle content is 25 to 99.9 wt. %. By "recycle content," we mean the combined amounts of recycled thermoplastic polyester and any recycled glycol or digestible polymer. Some glycols, such as propylene glycol or ethylene glycol, are available as recovered or recycled materials. For instance, propylene glycol is used in deicing fluids, and after use, it can be recovered, purified, and reused. Additionally, recycled ethylene glycol may be obtained from recovered engine antifreeze or engine coolant. Preferably, the digestible polymer is prepared or obtained from renewable resources or post-consumer or post-industrial recycled sources. Recycle content can be calculated, for instance, by combining the masses of recycled thermoplastic polyester and any recycled glycol or recycled digestible polymer, dividing this sum by the total mass of reactants (glycols, thermoplastic polyester, and digestible polymer), and then multiplying the result by 100.

A desirable polyol attribute is the absence of settling, particularly upon prolonged storage. When settling is substantial, the polyol might have to be filtered, stirred, stirred with heating or otherwise treated to remove or redissolve the solids content; this is preferably avoided. Preferred inventive polyols exhibit no settling or only a slight degree of settling, and more preferred polyols exhibit no evidence of settling.

In a specific aspect, the invention relates to a process which comprises: (a) heating virgin PET, recycled PET, or a mixture thereof with propylene glycol in the presence of a zinc or titanium catalyst to give a digested intermediate; and (b) condensing the intermediate with a digestible polymer to give the polyester polyol; wherein the weight percent of digestible polymer in the resulting polyester product after digestion is from 1% to 75%, preferably from 3% to 60%, most preferably from about 5% to about 45%., the molar ratio of glycol to PET is within the range of 2.5 to 4.5, and the polyol has a hydroxyl number within the range of 25 to 500 mg KOH/g, a viscosity less than 20,000 cP between 25° C. and 90° C., and a recycle content as defined herein greater than 25 wt. %.

EXAMPLES

The following examples further describe and demonstrate embodiments within the scope of the present invention. The Examples are given solely for purpose of illustration and are not to be construed as limitations of the present invention, as many variations thereof are possible without departing from the spirit and scope of the invention.

"Recycle content" as used herein (wt. %) is determined by combining the masses of recycled glycol, recycled aromatic polyacid source, recycled hydrophobe, and recycled digestible polymer, and dividing this sum by the total mass of reactants, and then multiplying the result by 100.

Hydroxyl numbers and acid numbers are determined by standard methods (ASTM E-222 and ASTM D3339, respectively). Viscosities are measured at 25° C. using a Brookfield DV-III Ultra rheometer with spindle #31 at 25%, 50%, and 75% torque, with 50% torque being the usual torque setting. Alternatively, depending on the viscosity of the sample, viscosities can also be measured at other temperatures, including up to about 50° C. or higher. Also, viscosities can be determined on diluted samples. Color, clarity, and degree of settling are evaluated visually.

Coating durability is evaluated by 500 hour salt spray resistance of a coated substrate as described herein. Coating durability is also evaluated as per one or more of the following ASTM testing standards: ASTM B117, ASTM D714, ASTM D610, or ASTM D1654. The coating of the present invention can be evaluated against a control coating prepared without poly(bisphenol-A carbonate) or recycled poly(bisphenol-A carbonate).

Examples I-VII provide procedures for carrying out the indicated digestion process on an aromatic polyacid source to produce a digested intermediate which can be utilized for further digesting the various digestible polymers of the present invention. Examples VIII-XVI provide procedures for carrying out the further digestion of various digestible polymers, such as poly(bisphenol-A carbonate) (PBAC) and recycled poly(bisphenol-A carbonate). Example XVII provides a procedure for making polyurethane coatings from the polyols. Example XVIII provides a procedure for making powder coatings from the polyols. Examples XIX and XX are directed to coatings and performance of these coatings, including salt spray and corrosion resistance studies. Table 1 summarizes physical characteristics data for the digestion product from various polyacid sources. Table 2 summarizes physical characteristics data for the digestion products of various digested polymers, such as PBAC and rPBAC. Table 3 summarizes physical characteristics data on polyurethane coatings made from the polyester polyols of the present invention.

Example I

Preparation of Digested Intermediate from an Aromatic Polyacid Source (Recycled PET)

The following relative amounts of materials were used— (1.0 mole rPET/2.8 mole PG/0.46 mole dimer fatty acid). A 5 liter reactor equipped with an overhead mixer, condenser, heating mantle, thermocouple, and nitrogen inlet was charged with titanium tetrabutoxide (0.1% by wt.), recycled polyethylene terephthalate pellets (960 g, 5 moles), and propylene glycol (1065.2 g, 14 moles). The mixture was heated with stirring to about 130° C. Stirring was then set to 60 rpm, and heating continued until the reactor contents reached 200° C. The mixture was heated until no particles of recycled PET remained (about 4 hr). When the digestion reaction was considered complete, the mixture was cooled to about 100° C. Dimer fatty acid (Croda Pripol™1017, 1311.7 g, 2.3 moles) was added, while the mixing rate was increased to 200 rpm. When the addition was complete, a Dean-Stark trap was introduced between the reactor and condenser, the mixture was then heated to 170° C. The temperature was slowly increased over time to 185° C. depending on how fast water was collected in the Dean Stark trap. Water generated in the condensation reaction was removed until roughly the theoretical amount was removed. When the reaction was complete, the digested intermediate was allowed to cool to 100° C. and then decanted from the reactor. Any residual solids were removed by filtration through cheesecloth. The resulting transparent amber digested intermediate had an OHV (hydroxyl value) of 380 mg KOH/g of sample and a viscosity at 25° C. of 3097 cP (centipoise). See Acid Source Example 1 in Table 1.

Example II

Preparation of Digested Intermediate from an Aromatic Polyacid Source (Recycled PET Carpet)

A 2000 mL resin kettle equipped with an overhead mixer, Vigreux column, short path condenser head with distillation collection flask, heating mantle, thermocouple, and nitrogen inlet was charged with 152.80 g of recycled propylene glycol, 142.80 g of recycled PET polyester carpet including polyolefin backing, calcium carbonate filler, and latex adhesive, assuming an approximate PET composition of 90% of the carpet, and 0.58 g titanium tetrabutoxide (~0.1% by wt.) and heated with a stirring rate of 150 RPM and nitrogen flow at 0.3SCFH to 200° C. for 20 hours. After about 5 hours, the recycled PET polyester textile had completely dissolved and appeared to be completely digested. The mixture was heated overnight to ensure no particles of recycled PET carpet remained. The mixture was then cooled to about 100° C. 190.88 g of Dimer Fatty Acid (Croda Pripol 1017) was added, while the mixing rate was increased to 350 rpm. When the addition was complete the mixture was then heated to 200° C. and nitrogen was increased to 1.0SCFH. Water generated in the condensation reaction was collected in the distillation flask until roughly the theoretical amount was removed. When the reaction was complete, the reactor was allowed to cool to 100° C. and then poured into a jar. Undigested polyolefin backing was removed by forceps and the mixture of polyol with calcium carbonate was run through a glass fritted disc filter size 'F' (<5 μm) at about 80° C. The resulting transparent dark amber polyol had an OHV (hydroxyl value) of 352.0 mg KOH/g of sample and a viscosity at 25° C. of 3000 cP (centipoise). See Acid Source Example 2 in Table 1.

Example III

Preparation of Digested Intermediate from an Aromatic Polyacid Source (Recycled PTT Carpet)

A 2000 mL resin kettle equipped with an overhead mixer, Vigreux column, short path condenser head with distillation collection flask, heating mantle, thermocouple, and nitrogen inlet was charged with 149.47 g of recycled propylene glycol, 150.03 g of recycled PTT polyester carpet including polyolefin backing, calcium carbonate filler, and latex adhesive, assuming an approximate PTT composition of 90% of the carpet, and 0.58 g titanium tetrabutoxide (~0.1% by wt.) and heated with a stirring rate of 150 RPM and nitrogen flow at 0.3SCFH to 200° C. for 20 hours. After about 5 hours, the recycled PTT polyester textile had completely dissolved and appeared to be completely digested. The mixture was heated overnight to ensure no particles of recycled PTT carpet remained. The mixture was then cooled to about 100° C. 186.72 g of Dimer Fatty Acid (Croda Pripol 1017) was added, while the mixing rate was increased to 350 rpm. When the addition was complete the mixture was then heated to 200° C. and nitrogen was increased to 1.0 SCFH. Water generated in the condensation reaction was collected in the distillation flask until roughly the theoretical amount was removed. When the reaction was complete, the reactor was allowed to cool to 100° C. and then poured into a jar. Undigested polyolefin backing was removed by forceps and the mixture of polyol with calcium carbonate was run through a glass fritted disc filter size 'F' (<5 μm) at about 80° C. The resulting transparent dark amber polyol had an OHV (hydroxyl value) of 371.1 mg KOH/g of sample and a viscosity at 25° C. of 2307 cP (centipoise). See Acid Source Example 3 in Table 1.

Example IV

Preparation of Digested Intermediate from an Aromatic Polyacid Source (Recycled PET Textile)

A 500 mL reactor equipped with an overhead mixer, Vigreux column, short path condenser head with distillation collection flask, heating mantle, thermocouple, and nitrogen inlet was charged with 97.91 g of recycled propylene glycol, 48.50 g of recycled PET polyester textile, and 0.30 g titanium tetrabutoxide (~0.1% by wt.) and heated with stirring to 200° C. for 6.0 hr. After about 5 hours, the recycled PET polyester textile had completely dissolved and appeared to be completely digested. The mixture was heated until no particles of recycled PET polyester textile remained (about 6 hr). When the digestion reaction was considered complete, the mixture was cooled to about 100° C. 65.80 g of Soybean Oil and 37.50 g of Phthalic Anhydride were added, while the mixing rate was increased to 200 rpm. When the addition was complete the mixture was then heated to 210° C. Water generated in the condensation reaction was collected in the distillation flask until roughly the theoretical amount was removed. When the reaction was complete, the digested intermediate was allowed to cool to 100° C. and then decanted from the reactor. Any large residual solids were removed by filtration through cheesecloth. The resulting opaque dark purple-red polyol had an OHV (hydroxyl value) of 420.7 mg KOH/g of sample and a viscosity at 25° C. of 576 cP (centipoise). The final product was then further filtered through a Buchner funnel with filter paper to remove any residual solids that were not removed by the cheesecloth. The resulting filtered transparent dark purple-red polyol had an OHV (hydroxyl value) of 430.0 mg KOH/g of sample and a viscosity at 25° C. of 588 cP (centipoise). See Acid Source Example 4 (unfiltered) and Example 5 (filtered) in Table 1.

Example V

Preparation of Digested Intermediate from Tritan Copolyester

A 1000 mL reactor equipped with an overhead mixer, Vigreux column, short path condenser head with distillation collection flask, heating mantle, thermocouple, and nitrogen inlet was charged with bio-based 1,3-Propanediol (40.50% by weight), Tritan Copolyester flake commercially available from Eastman (combination of dimethyl terephthalate, 1,4-cyclohesanedimethanol, and 2,2,4,4-tetramethyl-1,3-cyclobutanediol, see https://pubs.acs.org/cen/coverstory/89/8923cover4.html (20.00% by weight), and titanium tetrabutoxide (~0.1% by weight). The mixture was heated to 205° C. with a stirring rate of 220 rpm and nitrogen flow of ~0.5 SCFH for 6 hours. After about 4 hours, the Tritan Copolyester flake had completely dissolved and appeared to be completely digested. The mixture was heated until no particles of Tritan Copolyester flake remained (about 5 hr). The mixture was cooled to about 100° C. Bio-based succinic acid (39.40% by weight) was added, while the mixing rate was increased to 350 rpm. When the addition was complete, the mixture was then heated to 205° C., and the nitrogen flow rate was increased to ~1.0 SCFH (standard cubic feet per hour). Water generated in the condensation reaction was collected in the distillation flask until roughly the theoretical amount was removed. When the reaction was complete as determined by a low acid value (less than 5 mgKOH/g), the digested intermediate was allowed to cool to 100° C. and then decanted from the reactor. Any large residual solids were removed by filtration through cheesecloth. The resulting opaque grey polyol had an OHV (hydroxyl value) of 239 mg KOH/g of sample and a viscosity at 25° C. of 5,800 cP (centipoise). See Acid Source Example 8 in Table 1.

Example VI

Preparation of Digested Intermediate from Polymer of Cyclohexanedimethanol Terephthalic Acid (PCTA)—1

A 1000 mL reactor equipped with an overhead mixer, Vigreux column, short path condenser head with distillation collection flask, heating mantle, thermocouple, and nitrogen inlet was charged with recycled propylene glycol (9.70% by weight), bio-based glycerol (1.75% by weight), neopentyl glycol (16.39% by weight), recycled PCTA flake commercially available from Eastman (38.80% by weight), and monobutyltin tin hydroxide oxide (~0.15% by weight). The mixture was heated to 200° C. with a stirring rate of 150 rpm and nitrogen flow of ~0.5 SCFH for 4 hours. After about 3 hours, the recycled PCTA flake had completely dissolved and appeared to be completely digested. The mixture was heated until no particles of recycled PCTA flake remained (about 4 hr). The mixture was cooled to about 100° C. Bio-based succinic acid (39.40% by weight) and isopthalic acid (8.68% by weight) were added, while the mixing rate was increased to 350 rpm. When the addition was complete, the mixture was then heated to 200° C., and the nitrogen flow rate was increased to ~1.0 SCFH. Water generated in the condensation reaction was collected in the distillation flask until roughly the theoretical amount was removed. When the reaction was complete as determined by a low acid value (less than 5 mgKOH/g), the digested intermediate was cut with n-Butyl acetate (targeted 80% solids). The intermediate polyol and solvent was mixed for around 1.5 hrs at 120° C. and was allowed to cool to 100° C. and then decanted from the reactor. Any large residual solids were removed by filtration through cheesecloth. The resulting translucent grey polyol had an OHV (hydroxyl value) of 36 mg KOH/g of sample and a viscosity at 50° C. of 24,000 cP (centipoise) at a dilution of 81.57% by weight solids in n-Butyl acetate. See Acid Source Example 9 in Table 1.

Example VII

Preparation of Digested Intermediate from Polymer of Cyclohexanedimethanol Terephthalic Acid (PCTA)—2

A 500 mL reactor equipped with an overhead mixer, Vigreux column, short path condenser head with distillation collection flask, heating mantle, thermocouple, and nitrogen inlet was charged with Cyclohexanedimethanol (50.00% by weight), recycled PCTA flake commercially available from Eastman (30.00% by weight), and titanium tetrabutoxide (~0.1% by weight). The mixture was heated to 200° C. with a stirring rate of 150 rpm and nitrogen flow of ~0.5 SCFH for 3 hours. After about 2 hours, the recycled PCTA flake had completely dissolved and appeared to be completely digested. The mixture was heated until no particles of recycled PCTA flake remained (about 3 hr). The mixture was cooled to about 100° C. Dimer fatty acid Priol 1017 (10.00% by weight) commercially available from Croda and terephthalic acid (10.00% by weight) were added, while the mixing rate was increased to 350 rpm. When the addition was complete, the mixture was then heated to 205° C., and the nitrogen flow rate was increased to ~1.0 SCFH. Water generated in the condensation reaction was collected in the distillation flask until roughly the theoretical amount was removed. When the reaction was complete as determined by a low acid value (less than 5 mgKOH/g), the digested intermediate was allowed to cool to 100° C. and then decanted from the reactor. Any large residual solids were removed by filtration through cheesecloth. The resulting opaque grey polyol had an OHV (hydroxyl value) of 321.7 mg KOH/g of sample. See Acid Source Example 10 in Table 1.

Example VIII

Digestion of Poly(bisphenol-A Carbonate)

A 500 mL reactor equipped with an overhead mixer, condenser, heating mantle, thermocouple, and nitrogen inlet was charged with 28.55 g of poly(bisphenol-A carbonate) and 198.22 g of Stepanpol™ PS-2352 (available from Stepan Company) and heated with stirring to 200° C. for 5.5 hr. After about 3 hours, the poly(bisphenol A carbonate) had completely dissolved and appeared to be completely digested. The resulting pale orange, transparent polyester polyol (Polyol Example 3 in Table 2) yielded an acid value of 7.4 mg KOH/g, an OHV of 220.0, a viscosity of 15207 cps at 25° C. and no settling after several days.

Example IX

Digestion of Recycled Poly(bisphenol-A Carbonate)

A 500 mL reactor equipped with an overhead mixer, Vigreux column, short path condenser head with distillation collection flask, heating mantle, thermocouple, and nitrogen inlet was charged with recycled propylene glycol (17% by weight), recycled polyethylene terephthalate pellets (39% by weight), recycled poly(bisphenol A carbonate) pellets (9% by weight), bio-based BiOH® 5300 polyol (17% by weight) commercially available from Cargill, and titanium tetrabutoxide (~0.1% by weight). The mixture was heated to 200°

C. with a stirring rate of 150 rpm and nitrogen flow of ~0.5 SCFH for 6 hours. After about 5 hours, the recycled polyethylene terephthalate and recycled poly(bisphenol A carbonate) pellets had completely dissolved and appeared to be completely digested. The mixture was heated until no particles of recycled polyethylene terephthalate and recycled poly(bisphenol-A carbonate) pellets remained (about 6 hr). The mixture was cooled to about 100° C. Bio-based succinic acid (17.9% by weight) was added, while the mixing rate was increased to 350 rpm. When the addition was complete, the mixture was then heated to 205° C., and the nitrogen flow rate was increased to ~1.0 SCFH. Water generated in the condensation reaction was collected in the distillation flask until roughly the theoretical amount was removed. When the reaction was complete as determined by a low acid value (less than 5 mgKOH/g), the digested intermediate was allowed to cool to 100° C. and then decanted from the reactor. Any large residual solids were removed by filtration through cheesecloth. The resulting translucent dark amber polyol had an OHV (hydroxyl value) of 134.1 mg KOH/g of sample and a viscosity at 100° C. of 9,000 cP (centipoise). See, Polyol Example 4 in Table 2.

Example X

Digestion of Recycled Poly(bisphenol-A Carbonate)

A 500 mL reactor equipped with an overhead mixer, Vigreux column, short path condenser head with distillation collection flask, heating mantle, thermocouple, and nitrogen inlet was charged with Stepanpol PN 110 (85% by weight) a neopentyl glycol-phthalic anhydride-based polyester polyol commercially available from the Stepan Company, and recycled poly(bisphenol A carbonate) pellets (15% by weight). The mixture was heated to 210° C. with a stirring rate of ~50 rpm and nitrogen flow of ~0.8 SCFH for 1 hour. After about 1 hour, the recycled poly(bisphenol A carbonate) pellets had completely dissolved and appeared to be completely digested. The mixture stirring rate was then increased to ~150 rpm for 3 hours. The mixture was heated until no particles of recycled poly(bisphenol-A carbonate) pellets remained (about 4 hr). Water generated in the condensation reaction was collected in the distillation flask until roughly the theoretical amount was removed. When the reaction was complete as determined by a low acid value (less than 5 mgKOH/g), the digested intermediate was allowed to cool to 100° C. and then decanted from the reactor. Any large residual solids were removed by filtration through cheesecloth. The resulting opaque white polyol had an OHV (hydroxyl value) of 73.6 mg KOH/g of sample and a viscosity at 75° C. of 9,410 cP (centipoise). See, Polyol Example 5 in Table 2.

Example XI

Digestion of Recycled Poly(bisphenol-A Carbonate)

Part A. Preparation of digested intermediate from recycled polyethylene terephthalate pellets: A 500 mL reactor equipped with an overhead mixer, Vigreux column, short path condenser head with distillation collection flask, heating mantle, thermocouple, and nitrogen inlet was charged with recycled propylene glycol (15.48% by weight), recycled polyethylene terephthalate pellets (49.95% by weight), trimethylolpropane (5.49% by weight), and butyltin hydroxide oxide hydrate (~0.1% by weight). The mixture was heated to 200° C. with a stirring rate of 150 rpm and nitrogen flow of ~0.5 SCFH for 7 hours. After about 5 hours, the recycled polyethylene terephthalate pellets had completely dissolved and appeared to be completely digested. The mixture was heated until no particles of recycled polyethylene terephthalate pellets remained. The mixture was cooled to about 100° C. Bio-based succinic acid (17.9% by weight) and dimer fatty acid Priol 1017 (14.24% by weight) commercially available from Croda was added, while the mixing rate was increased to 350 rpm. When the addition was complete, the mixture was then heated to 200° C. with a stirring rate of 150 rpm and the nitrogen flow was increased to ~1.0 SCFH. Water generated in the condensation reaction was collected in the distillation flask until roughly the theoretical amount was removed. When the reaction was complete as determined by a low acid value (less than 5 mgKOH/g), the digested intermediate was allowed to cool to 100° C. and then decanted from the reactor. Any large residual solids were removed by filtration through cheesecloth. The resulting transparent dark amber polyol had an OHV (hydroxyl value) of 103.7 mg KOH/g of sample and a viscosity at 100° C. of 6,035 cP (centipoise).

Part B: Digestion or recycled poly(bisphenol-A carbonate): A 500 mL reactor equipped with an overhead mixer, Vigreux column, short path condenser head with distillation collection flask, heating mantle, thermocouple, and nitrogen inlet was charged with a previously prepared aromatic polyester polyol (see Part A, above) (65% by weight) and recycled poly(bisphenol A carbonate) pellets (8% by weight). The mixture was heated to 210° C. with a stirring rate of ~50 rpm and nitrogen flow of ~0.8 SCFH for 1 hour. After about 1 hour, the recycled poly(bisphenol-A carbonate) pellets had completely dissolved and appeared to be completely digested. The mixture stirring rate was then increased to ~150 rpm for 3 hours. The mixture was heated until no particles of recycled poly(bisphenol A carbonate) pellets remained (about 4 hr). Water generated in the condensation reaction was collected in the distillation flask until roughly the theoretical amount was removed. When the reaction was complete as determined by a low acid value (less than 5 mgKOH/g), the digested intermediate was allowed to cool to 100° C. and then decanted from the reactor. Any large residual solids were removed by filtration through cheesecloth. The resulting translucent green polyol had an OHV (hydroxyl value) of 93.6 mg KOH/g of sample and a viscosity at 25° C. of 31,056 cP (centipoise), note that the polyol was cut with xylene to around 79% solids to achieve this viscosity reading. See, Polyol Example 6 in Table 2.

Example XII

Digestion of Recycled Poly(bisphenol-A Carbonate)

A 500 mL reactor equipped with an overhead mixer, Vigreux column, short path condenser head with distillation collection flask, heating mantle, thermocouple, and nitrogen inlet was charged with an aromatic polyester polyol (65% by weight) and bio-based glycerol (5% by weight). The mixture was heated to 210° C. with a stirring rate of ~150 rpm and nitrogen flow of ~0.8 SCFH for 2 hours. The mixture was then cooled to about 100° C. and bio-based linoleic Acid (30% by weight) was added, while the mixing rate was increased to 350 rpm. When the addition was complete, the mixture was then heated to 210° C., and nitrogen was increased to ~1.0 SCFH. Water generated in the condensation reaction was collected in the distillation flask until roughly the theoretical amount was removed. When the reaction was complete as determined by a low acid value (less than 5 mgKOH/g), the digested intermediate was allowed to cool to 100° C. Recycled poly(bisphenol A carbonate) pellets (3.25% by weight) was then added while the mixing rate was increased to 350 rpm. When the addition was complete the mixture was heated to 210° C. until no particles of recycled poly(bisphenol-A carbonate) pellets remained (about 4 hr). The digested intermediate was allowed to cool to 100° C. and then decanted from the reactor. Any large residual solids were removed by filtration through cheesecloth. The resulting transparent golden polyol had an OHV (hydroxyl value) of 91.2 mg KOH/g of sample and a viscosity at 50° C. of 5,768 cP (centipoise). See, Polyol Example 7 in Table 2.

Example XIII

Digestion of Recycled Poly(bisphenol-A Carbonate)

A 1000 mL reactor equipped with an overhead mixer, Vigreux column, short path condenser head with distillation collection flask, heating mantle, thermocouple, and nitrogen inlet was charged with recycled propylene glycol (7.8% by weight), recycled polyethylene terephthalate pellets (31.2% by weight), recycled poly(bisphenol A carbonate) pellets (19.5% by weight), bio-based glycerol (1.4% by weight), neopentyl glycol (13.2% by weight), and butyltin hydroxide oxide hydrate (~0.1% by weight). The mixture was heated to 200° C. with a stirring rate of 300 rpm and nitrogen flow of ~0.3 SCFH for 6 hours. After about 5 hours, the recycled polyethylene terephthalate and recycled poly(bisphenol-A carbonate) pellets had completely dissolved and appeared to be completely digested. The mixture was heated until no particles of recycled polyethylene terephthalate and recycled poly(bisphenol A carbonate) pellets remained (about 6 hr). When the digestion reaction was considered complete, the mixture was cooled to about 100° C. Bio-based succinic acid (19.8% by weight) and isophthalic acid (7% by weight) were added, while the mixing rate was increased to 300 rpm. When the addition was complete, the mixture was then heated to 205° C., and nitrogen was increased to ~1.0 SCFH. Water generated in the condensation reaction was collected in the distillation flask until roughly the theoretical amount was removed. When the reaction was complete as determined by a low acid value (less than 5 mgKOH/g), the digested intermediate was allowed to cool to 100° C. and then decanted from the reactor. Any large residual solids were removed by filtration through cheesecloth. The resulting translucent green polyol had an OHV (hydroxyl value) of 75.3 mg KOH/g of sample. See, Polyol Example 8 in Table 2.

Example XIV

Digestion of Recycled Poly(bisphenol-A Carbonate)

A 500 mL reactor equipped with an overhead mixer, Vigreux column, short path condenser head with distillation collection flask, heating mantle, thermocouple, and nitrogen inlet was charged with a previously prepared aromatic polyester polyol [Preparation of Digested Intermediate from Tritan Copolyester as described in the above Example V] (90.63% by weight) and recycled Poly(Bisphenol-A carbonate) pellets (9.37% by weight). The mixture was heated to 205° C. with a stirring rate of ~150 rpm and nitrogen flow of ~0.8 SCFH for 4 hours. After about 2 hours, the recycled poly(bisphenol-A carbonate) pellets had completely dissolved and appeared to be completely digested. The mixture was heated until no particles of recycled Poly(Bisphenol a carbonate) pellets remained (about 4 hr). The digested intermediate was allowed to cool to 100° C. and then decanted from the reactor. Any large residual solids were removed by filtration through cheesecloth. The resulting transparent yellow-gold polyol had an OHV (hydroxyl value) of 202.1 mg KOH/g of sample and a viscosity at 25° C. of 17,496 cP (centipoise). See, Polyol Example 9 in Table 2.

Example XV

Digestion of Recycled Poly(bisphenol-A Carbonate)

A 500 mL reactor equipped with an overhead mixer, Vigreux column, short path condenser head with distillation collection flask, heating mantle, thermocouple, and nitrogen inlet was charged with a previously prepared aromatic polyester polyol [Preparation of Digested Intermediate from PCTA as described in the above Example VI] (90.53% by weight) and recycled Poly(Bisphenol a carbonate) pellets (9.47% by weight). The mixture was heated to 205° C. with a stirring rate of ~150 rpm and nitrogen flow of ~0.8 SCFH for 4 hours. After about 2 hours, the recycled poly(bisphenol-A carbonate) pellets had completely dissolved and appeared to be completely digested. The mixture was heated until no particles of recycled Poly(Bisphenol-A carbonate) pellets remained (about 4 hr) and then was cut with n-Butyl acetate (targeted 60% solids). The intermediate polyol and solvent was mixed for around 0.5 hrs at 120° C. and was allowed to cool to 100° C. and then decanted from the reactor. Any large residual solids were removed by filtration through cheesecloth. The resulting opaque green polyol had an OHV (hydroxyl value) of 36.4 KOH/g of sample. See, Polyol Example 10 in Table 2.

Example XVI

Digestion of Recycled Poly(bisphenol-A Carbonate)

A 500 mL reactor equipped with an overhead mixer, Vigreux column, short path condenser head with distillation collection flask, heating mantle, thermocouple, and nitrogen inlet was charged with a previously prepared aromatic polyester polyol [Preparation of Digested Intermediate from PCTA as described in the above Example VII] (90.96% by weight) and recycled Poly(Bisphenol a carbonate) pellets (9.04% by weight). The mixture was heated to 205° C. with a stirring rate of ~150 rpm and nitrogen flow of ~0.8 SCFH for 4 hours. After about 2 hours, the recycled poly(Bisphenol-A carbonate) pellets had completely dissolved and appeared to be completely digested. The mixture was heated until no particles of recycled Poly(Bisphenol a carbonate) pellets remained (about 4 hr). The digested intermediate was allowed to cool to 100° C. and then decanted from the reactor. Any large residual solids were removed by filtration through cheesecloth. The opaque, light grey polyol had an OHV (hydroxyl value) of 255.0 KOH/g of sample. See, Polyol Example 11 in Table 2.

Example XVII

Procedure for Preparing Polyurethane Coatings

The following is a procedure for making a two-component ("2 K") coating. The polyester polyol (14.11 g, 0.098 equiv.), 2-methyl-1,3-propanediol (0.7 g, 0.008 equiv.), and ethylene glycol (1.12 g, 0.037 equiv.) were added to an 250 mL beaker, at room temperature. Hexamethylene diisocyanate (8.97 g, 0.107 equiv.) and isophorone diisocyanate (5.08 g, 0.023 equiv.) were then added to the beaker. The mixture was then diluted to 50% by weight with 2-butanone. Mechanical mixing was initiated using a tri-lobe agitation blade measuring 3 inches in diameter and mixing was gradually increased until 500 RPM was reached and a homogeneous mixture resulted. Dibutyltin dilaurate (0.05% by wt.) was then added to the reaction mixture. After approximately 5 minutes of reaction time and ensuing 10° C. exotherm, a bead of the reacting mixture was applied to one side of each of five aluminum panels measuring 4 in. by 6 in. The beads of solvent-borne polyurethane were then drawn down each panel into a wet film using a #50 R.D. Specialties drawdown bar to a wet film thickness of 4.5 mils. The panels were allowed to flash dry in a hood at ambient temperatures for at least one hour, and then heated to 110° C. for 1.5-2 hours to permit complete conversion to polyurethane.

The final dry film thickness was determined using a PosiTector 6000 (Defelsko Corporation) dry film thickness gage. Konig hardness was measured using ISO 1522 using a TQC Pendulum Hardness Tester (Model SPO500). Pencil scratch hardness was measured using ASTM D3363. Flexibility was measured using ASTM D522. Adhesion was measured using ASTM D3359. Stain testing was measured using ASTM D1308. MEK double rub testing was conducted using ASTM D4752. Table 3 summarizes testing data on these polyurethane coatings.

Example XVIII

Procedure for Preparing Powder Coatings

The following is a procedure for making a powder coating. A 500 mL reactor equipped with an overhead mixer, condenser, heating mantle, thermocouple, and nitrogen inlet is charged with 67.50 g of poly(bisphenol A carbonate), 180 g recycled PET pellet, 67.50 g diethylene glycol, 46.04 g glycerol, and 0.10 g monobutyltin oxide catalyst and heated with stirring to 200° C. for 8 hours, or until the PET pellets are solubilized. The temperature is then reduced to 100° C. and 142.32 g isophthalic acid is added and the temperature is then set to 175° C. After 1.5 hours the temperature is increased to 185° C., where it is held for 30 min. The temperature is then increased to 195° C., where it is held for 2 hours. The temperature is further increased to 205° C. The reaction is continued to run for a total of 25-26 hours, or until the acid value is about 5.5 mg KOH/g. The resultant polyester polyol is poured out and allowed to cool, dried and ground a powder. Next 500 g of the ground polyester polyol powder, 300 g titanium dioxide pigment (R-902+ from DuPont), 438 g caprolactam blocked isocyanurate, 6.1 g BYK 366P flow agent (an acrylic surface active agent), 3.5 g benzoin, and 2 g K-Kat 348 bismuth carboxylate catalyst (King Industries), are blended in a GlenMills Turbula dynaMIX blender, and then extruded through a laboratory scale twin screw extruder with zone temperatures of 35 and 95° C. The extrudate is cooled, ground, and sieved to provide a fine powder coating having a size of less than 105 microns. This powder coating is useful for application to a metal substrate using electrostatic or fluidized bed technology.

Tables 1, 2, and 3 with Respect to Above Examples

The following Tables 1, 2, and 3 are cited in the above Examples I to XVIII.

TABLE 1

Physical Characteristics of the Digestion Product from Aromatic Polyacid Sources

| Acid Source Example No. | Digestible Aromatic Polyacid Source | Wt. % Polyacid Source | Relative Amounts of Materials Used in Digestion Procedure | Catalyst | Acid Value (mg KOH/g) | Hydroxyl Value (mg KOH/g) | Color | Settling | Clarity | Viscosity (cP) at 25° C., unless noted 50% Torque, unless noted |
|---|---|---|---|---|---|---|---|---|---|---|
| 1 | PET Pellets | 28.74% | 1 mole rPET/2.80 mole PG/ 0.46 mole Dimer Fatty Acid | 0.10% Ti(BuO)$_4$ | 0.9 | 380.0 | Amber | None | Transparent | 3097 |
| 2 | PET Carpet | 29.32% | 1 mole rPET/2.01 mole PG/ 0.34 mole Dimer Fatty Acid | 0.12% Ti(BuO)$_4$ | 0.8 | 352.0 | Dark Amber | None | Transparent | 3000 |
| 3 | PTT Carpet | 30.82% | 1 mole rPTT/1.96 mole PG/ 0.33 mole Dimer Fatty Acid | 0.11% Ti(BuO)$_4$ | 1.0 | 371.1 | Dark Amber | None | Slightly Transparent | 2307 |
| 4 | PET Textile (Unbacked) | 19.4% | 1 mole rPET/1.29 mole PG/0.25 mole Phthalic Anhydride/ 0.08 mole Soy bean oil | 0.10% Ti(BuO)$_4$ | 1.1 | 420.7 | Dark Purple-Red | Slight, Before Filtration | Opaque | 576 |
| 5 | PET Textile (Unbacked)— Filtered material of example 4 | 19.4% | 1 mole rPET/1.29 mole PG/0.25 mole Phthalic Anhydride/ 0.08 mole Soy bean oil | 0.10% Ti(BuO)$_4$ | 1.3 | 430.0 | Dark Purple-Red | None | Transparent | 588 |
| 6 | PET Textile (Backed) | 15% | 1 mole rPET/1.03 mole DEG/ 0.25 mole Phthalic Anhydride/ 0.08 mole Soy bean oil | 0.10% Ti(BuO)$_4$ | 1.2 | 338.0 | Dark Purple-Red | None | Transparent | 408 |

TABLE 1-continued

Physical Characteristics of the Digestion Product from Aromatic Polyacid Sources

| Acid Source Example No. | Digestible Aromatic Polyacid Source | Wt. % Polyacid Source | Relative Amounts of Materials Used in Digestion Procedure | Catalyst | Acid Value (mg KOH/g) | Hydroxyl Value (mg KOH/g) | Color | Settling | Clarity | Viscosity (cP) at 25° C., unless noted 50% Torque, unless noted |
|---|---|---|---|---|---|---|---|---|---|---|
| 7 | Polyester Fiber Fill + rPET Pellets | 34.91% | 1.32 mole rPET/2.8 mole PG/ 0.46 mole Dimer Fatty Acid | 0.10% Ti(BuO)$_4$ | 0.7 | 352.0 | Yellow | Slight | Opaque | 5577 |
| 8 | Tritan Copolyester Flakes | 20.0% | 0.781 mole Tritan Copolyester/ 3.992 mole 1,3-Propanediol/ 2.502 mole Succinic Acid | 0.10% Ti(BuO)$_4$ | 0.5 | 239.0 | Grey | Filtered | Opaque | 5800 |
| 9 | PCTA Flake | 38.8% | 0.85 mole PTCA/0.944 mole NPG/ 0.765 mole PG/0.114 mole Glycerol/ 0.313 mole Isopthalic Acid/ 1.247 mole Succinic Acid | 0.15% MTBO | 1.2 | 36.0 | Grey | Filtered | Transparent | 24,000 (81.57% in n-butyal acetate) |
| 10 | PCTA Flake | 30.0% | 0.328 mole PCTA/1.04 mole CHDM/ 0.181 mole Terephthalic Acid/ 0.053 mole Dimer Fatty Acid | 0.10% Ti(BuO)$_4$ | 0.9 | 321.7 | Grey | Filtered | Opaque | Not flowable at 125° C. |

TABLE 2

Physical Characteristics of the Digestion Product from Digestible Polymers

| Polyol Example No. | Digestible Polymer | Wt. % Digestible Polymer | Digested Intermediate | Catalyst | Acid Value mg KOH/g | OHV (mg KOH/g) | Color | Settling | Clarity | Viscosity (cP) at 25° C. and 50% Torque Unless Noted |
|---|---|---|---|---|---|---|---|---|---|---|
| 1 | Poly(bisphenol-A carbonate) | 8.80% | 1 mole rPET/2.8 mole PG/ 0.46 mole Dimer Fatty Acid | 0.1% Ti(BuO)4 present in digested intermediate | 2.5 | 356.8 | Amber | None | Transparent | 5745 |
| 2 | Poly(bisphenol-A carbonate) | 25.10% | 1 mole rPET/2.8 mole PG/ 0.46 mole Dimer Fatty Acid | 0.1% Ti(BuO)4 present in digested intermediate | 3.1 | 283.6 | Amber/ Golden | None | Transparent | 12090 |
| 3 | Poly(bisphenol-A carbonate) | 12.59% | 87.41% Stepanol 2352 (Contains Phthalic Anhydride and Diethylene Glycol) | Unknown | 7.4 | 220.0 | Orange | None | Transparent | 15207 |
| 4 | Recycled Poly (bisphenol-A carbonate) | 9.0% | 1 mole rPET/1.10 mole PG/ 0.06 mole Cargill BiOH 5300 (Vegetable Oil based)/ 0.75 mole Succinic Acid | 0.1% Ti(BuO)4 | 4.1 | 134.1 | Dark Amber | None | Transparent | 9000 (100° C.) |
| 5 | Recycled Poly (bisphenol-A carbonate) | 15.0% | 85 wt % Stepanpol PN 110 (neopentyl glycol-phthalic anhydride-based polyester polyol) | NA | 1.9 | 73.6 | White | None | Opaque | 9410 (100° C.) |
| 6 | Recycled Poly (bisphenol-A carbonate) | 8.0% | 1 mole rPET/0.78 mole PG/ 0.16 mole Trimethylolpropane/ 0.48 mole Succinic Acid/ 0.10 mole Dimer Fatty Acid | 0.1% MTBO (Butyltin hydroxide oxide hydrate) | 1.8 | 93.6 | Green | None | Translucent | 31056 (Cut with Xylene) |
| 7 | Recycled Poly (bisphenol-A carbonate) | 9.0% | 65 wt % Polyol Example 42/30 wt % Linoleic Acid/ 5 wt % Glycerol | 0.1% Ti(BuO)4 present in digested intermediate | 4.2 | 91.2 | Golden | None | Transparent | 5768 (50° C.) |
| 8 | Recycled Poly (bisphenol-A carbonate) | 19.5% | 1 mole rPET/0.78 mole Neopentyl Glycol/0.63 mole PG/0.1 mole Glycerol/0.26 mole Isophthalic Acid/ 1.03 mole Succinic Acid | 0.1% MTBO (Butyltin hydroxide oxide hydrate) | 5 | 75.3 | Green | None | Translucent | — |
| 9 | Recycled Poly (bisphenol-A carbonate) | 9.37% | 0.781 mole Tritan Copolyester/ 3.992 mole 1,3-Propanediol/ 2.502 mole Succinic Acid | 0.1% Ti(BuO)4 present in digested intermediate | 4.6 | 202.1 | Yellow-gold | None | Transparent | 17,496 |
| 10 | Recycled Poly (bisphenol-A carbonate) | 9.47% | 0.85 mole PCTA/0.944 mole Neopentyl Glycol/0.765 mole PG/0.114 mole Glycerol/ | 0.1% MTBO (Butyltin hydroxide oxide | 3.7 | 36.4 | Green | None | Opaque | — |

TABLE 2-continued

Physical Characteristics of the Digestion Product from Digestible Polymers

| Polyol Example No. | Digestible Polymer | Wt. % Digestible Polymer | Digested Intermediate | Catalyst | Acid Value mg KOH/g | OHV (mg KOH/g) | Color | Settling | Clarity | Viscosity (cP) at 25° C. and 50% Torque Unless Noted |
|---|---|---|---|---|---|---|---|---|---|---|
| 11 | Recycled Poly (bisphenol-A carbonate) | 9.04% | 0.313 mole Isopthalic Acid/ 1.247 mole Succinic Acid 0.469 mole PCTA/1.04 mole CDHM/0.181 mole Terephthalic Acid/ 0.053 mole Dimer Fatty Acid | hydrate) 0.1% Ti(BuO)4 present in digested intermediate | 3.3 | 255.0 | Light Grey | None | Opaque | — |

TABLE 3

Physical Characteristics of Coatings Made from Polyols

| Polyol Example No. | Digestible Polymer | Coating Thickness, mil. | Konig Pendulum Hardness, Avg. Oscillations | Konig Pendulum Hardness, Avg. Sec. | Pencil Hardness, Avg. | Adhesion, Avg. | 1 hr. Mustard Resistance | 1 hr. Sunscreen Resistance | 1 hr. Windex Resistance | 1 hr. 100 proof Vodka Resistance | 24 hr. DI Water Resistance | MEK Double Rubs | 1/8" Mandrel Test |
|---|---|---|---|---|---|---|---|---|---|---|---|---|---|
| 1 | Poly(Bisphenol A Carbonate) | 2.11 | 84 | 118.5 | H | 5B | 5 | 5 | 5 | 5 | 4 | 31 | P |
| 2 | Poly(Bisphenol A Carbonate) | 1.89 | 109 | 152.7 | H | 5B | 5 | 5 | 5 | 4 | 5 | 5 | F |
| 3 | Poly(Bisphenol A Carbonate) | 1.31 | 9 | 12.1 | H | 0B | 3 | 4 | 5 | 1 | 3 | 9 | P |
| 4 | Recycled Poly (Bisphenol A Carbonate) (Example XV) | 0.99 | 133 | 186.9 | HB | 5B | — | 5 | 5 | 5 | 5 | 26 | P |
| 5 | Recycled Poly (Bisphenol A Carbonate) (Example XVI) | 1.04 | 126 | 176 | HB | 5B | — | 5 | 5 | 5 | 5 | 33 | F |
| 6 | Recycled Poly (Bbisphenol A Carbonate) (Example XVII) | 0.85 | 115 | 161.5 | B | 5B | — | 5 | 5 | 5 | 5 | 25.5 | P |
| 8 | Recycled Poly (Bisphenol A Carbonate) (Example XIX) | 0.87 | 159 | 223 | HB | 5B | — | 5 | 5 | 5 | 5 | 16 | P |

Example XIX

Coatings and Performance

The Tables and Figures cited in this Example XIX are numbered with respect to this Example XIX.

We designed and made three different polyester polyol batches (see Table XIX-A) intended for industrial direct-to-metal (DTM) application, which were cured using a 1K high temperature bake over a metal substrate.

TABLE XIX-A

| Polyester Polyol Batches | XIMP1000-6.5 | XIMP1000-6.6 | XIMP1000-7.8 |
|---|---|---|---|
| rPET | 38.8 | 33.87 | 31.23 |
| neopentyl glycol | 16.39 | 14.31 | 13.19 |
| propylene glycol | 9.7 | 8.47 | 7.81 |
| glycerol | 1.75 | 1.52 | 1.41 |
| PBAC | 0 | 12.7 | 19.52 |
| isophthalic acid | 8.68 | 7.58 | 6.99 |
| succinic acid | 24.54 | 21.42 | 19.75 |
| Monobutuyl oxide catalyst | 0.14 | 0.13 | 0.1 |
| Total | 100 | 100 | 100 |
| Green content = recycle content + renewable content | 73.04 | 76.46 | 78.31 |

Values in weight percent

The resulting cured films were evaluated for several performance attributes, including Koënig and pencil hardness, adhesion, chemical resistance, flexibility, and impact resistance. In order to maximize the overall performance and evaluate this large group of materials, we used a simple algorithm to score each performance category at a similar weighted maximum (Table XIX-1).

From this group, all were rated with the above system, and we chose the top one-third of the performers. These were then screened for a short time (165 h) in a salt spray environmental chamber. They were tested as the original 1K clearcoats from the screening evaluation, over cold-rolled steel substrate at 1 mil dry film thickness.

FIG. 1 summarizes an algorithm for evaluating the properties of the performance of the coatings. The data is based on 67 samples and provides information on the distribution for the performance.

We had a variety of compositions to evaluate, and we chose the top one-third performing polyols for further screening under salt spray conditions as clearcoat films over steel. Surprisingly good performance in the initial property screening along with outstanding performance under salt spray environment was observed for films based on mixed/hybrid recycle systems. The use of rPET with recycled poly(bisphenol A polycarbonate) (rBPA-PC) in the design of a single polyol for DTM application performed well from our screening evaluation. These materials were further evaluated in coatings.

High-Bake 1K High Gloss White Metal Topcoat

There were two materials evaluated as gloss white metal topcoat formulations over aluminum, cold-rolled steel (CRS), and iron-phosphated CRS. The crosslinker was hexamethoxymethyl melamine (HMMM), used at 15% and 25% on solids, catalyzed with 0.5% blocked pTSA catalyst. The sole pigment was Rutile $TiO_2$ at 22% PVC and a pigment/binder ratio of 0.95. The bake was targeting a peak metal temperature of 232° C., and the final film had a DFT of 0.9-1.2 mils. Alongside the experimental paints a commercial white coil paint was evaluated with an identical bake schedule. The data and results are shown in Table XIX-2.

As the data indicate, the experimental polyols can be formulated into a gloss white metal topcoat and perform as well or better than a commercial paint control.

Low-Bake 2K White Metal Primer

There were three materials evaluated as white metal primer formulations over aluminum, CRS, and iron-phosphated CRS. The crosslinker was Desmodur N3300A, used at 1.1:1.0 NCO:OH, catalyzed with 0.15% DABCO T-12 (tin) catalyst on isocyanate/resin total solids. The pigment was R900 $TiO_2$ at a pigment/binder ratio of 1.0 and adjusted to 36% PVC with Atomite (CaCO3) extender. The bake was 30 min at 130° C., and the final film had a DFT of 1.8-2.2 mils. Alongside the experimental paints, a commercial polyester polyol was obtained and formulated in the same way, then tested with an identical bake schedule. The commercial polyol chosen contained ~3% zinc phosphate corrosion inhibitor. No such additive was used with the experimental polyol formulations. The cured film properties are shown in Table XIX-3.

The data indicated a similar trend as seen earlier with a different paint formulation. Other than slightly lower pencil hardness (gouge), the experimental polyols once again either match or outperform the commercial control. For this set of data, the performance was measured in a 2K urethane coating system rather than the previous work done in 1K melamine systems. We went ahead and put the panels into test for salt spray exposure over both CRS and phosphated-CRS substrates.

The salt spray performance data was collected after 514 hours of exposure, and is shown in Table XIX-4. The corrosion at the scribe was very similar across all the panels, with very little differentiation. A slightly better scribe creep rating was given to the commercial polyol control formulation, although the commercial polyol contained a known anti-corrosion modification, which was not part of the experimental polyols. The field blistering was significantly better for the experimental polyols than for the commercial control, regardless of the modification advantage.

Figure 2:
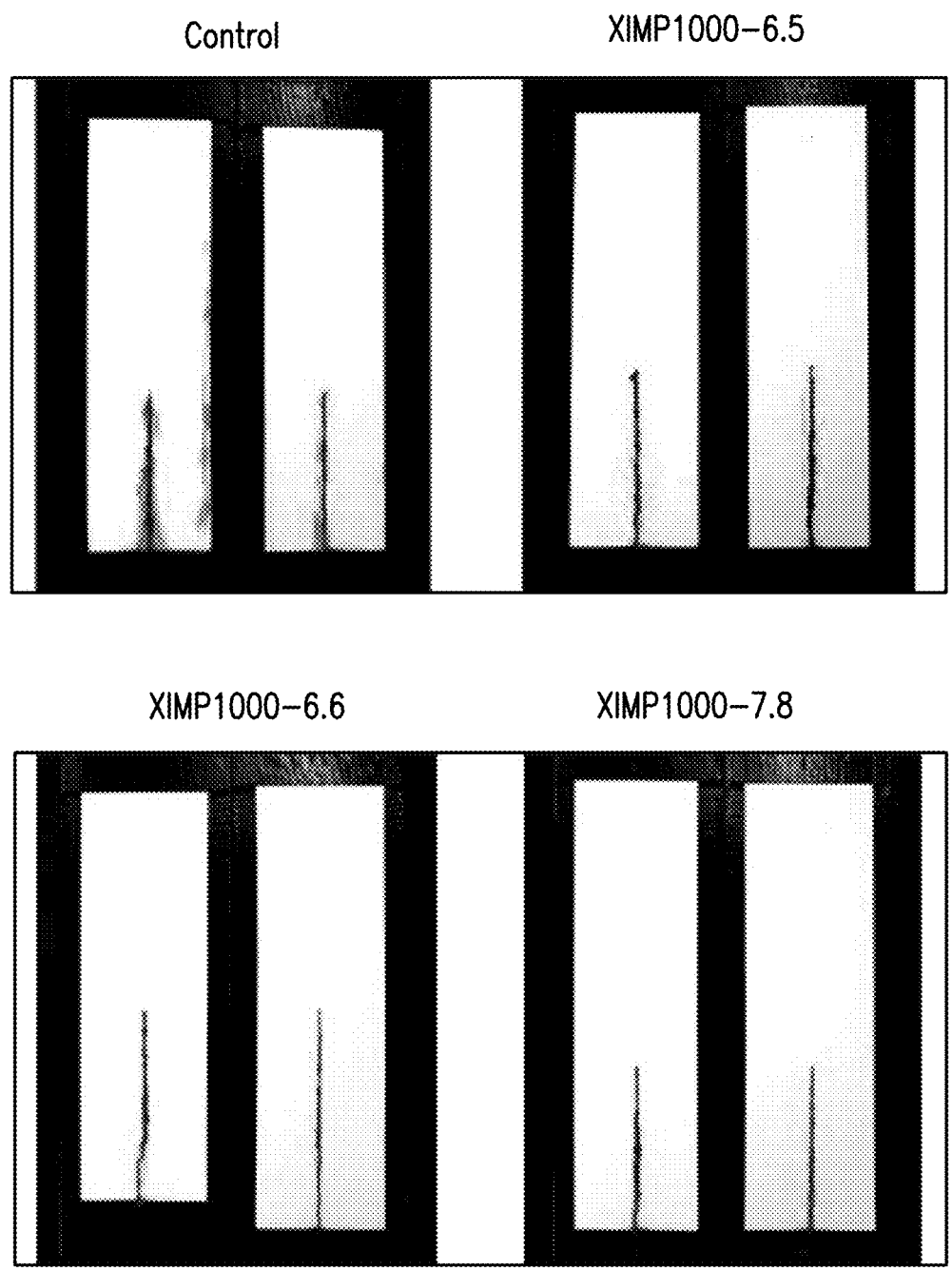
FIG. 2 shows photographs from salt spray testing after 514 hours exposure. Control (Upper Left Pair of Panels), X1MP1000-6.5 (Upper Right Pair of Panels), X1MP1000-6.6 (Lower Left Pair of Panels), and X1MP1000-8.8 (Lower Right Pair of Panels).

FIG. 2 shows photographs from salt spray testing after 514 hours exposure. Control (Upper Left Pair of Panels), X1MP1000-6.5 (Upper Right Pair of Panels), X1MP1000-6.6 (Lower Left Pair of Panels), and X1MP1000-8.8 (Lower Right Pair of Panels).

After rating and measuring the test panels in duplicate, the panels were placed back into the salt spray cabinet. At 530 hours, the panels were again removed and this time the scribe area was scraped while wet, and the panels were again rated. The scraping process magnified the differentiation in performance significantly, and the resulting observations and measurements are shown in Table XIX-5. Of the entire set of panels, after scribe scraping, the control polyol seemingly had the worst performance for both field blistering, scribe coating removal and scribe corrosion. The first conclusion was that the experimental polyols all outperformed the commercial control for salt spray exposure. Within the experimental samples, there was one polyol, which seemed to have slightly worse performance than the other two experimental materials. The component that was missing in the lower performing polyol was the incorporation of rBPA-PC. The other two experimental polyols contained rBPA-PC. Thus, the sample XIMP1000-7.8 that excelled in the coating property evaluation was also the best performer in the salt spray exposure testing.

A look at the cold rolled steel (CRS) panels shows the differences visually which are described in the data table. Significant performance improvement was made over the commercial control polyol with the experimental polyols in the 2K paint formulation.

Figure 3:
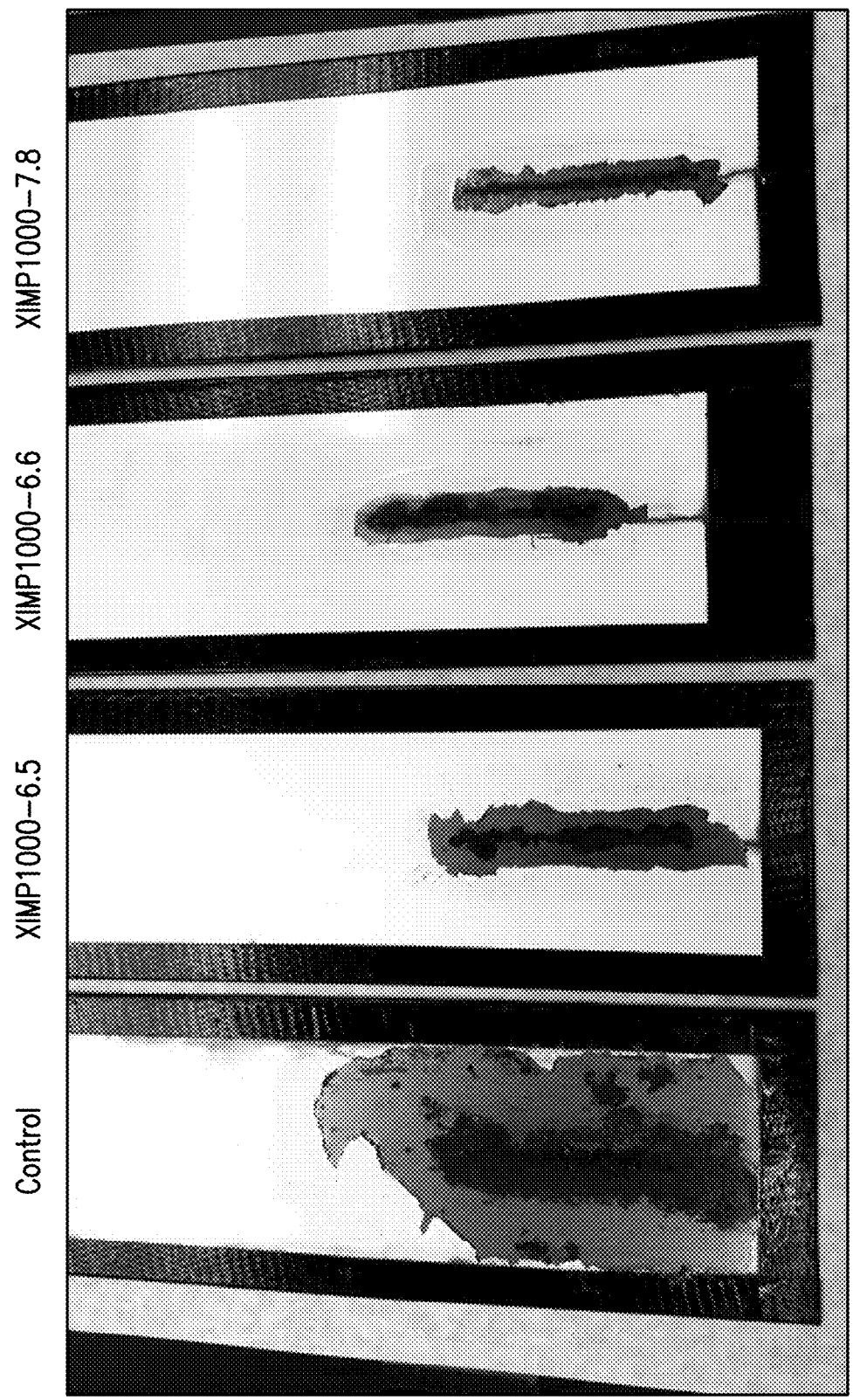
FIG. 3 shows photographs from salt spray testing after 530 hours exposure after scraping of the panels. (Left to Right) Control Panel, X1MP1000-6.5, X1MP1000-6.6 and X1MP1000-7.8.

FIG. 3 shows photographs from salt spray testing after 530 hours exposure after scraping of the panels. (Left to Right) Control Panel, X1MP1000-6.5, X1MP1000-6.6 and X1MP1000-7.8.

High-Bake 1K Low Gloss White Metal Topcoat

The performance of the 1K melamine system was evaluated for a coil coating application. This time both paint film properties and salt spray exposure were investigated. There were three polyols evaluated as low gloss white metal one-coat formulations over chrome-treated aluminum, hot-dipped galvanized, and zinc-phosphated CRS. The crosslinker was HMMM, used at 18% on solids, catalyzed with 0.2% blocked pTSA catalyst. The sole pigment was $TiO_2$ at 22% PVC and a pigment/binder ratio of 1.0. Formulations used Gasil HP270 silica gel matting agent to a 30 Gloss reading at 60°. The bake was targeting a peak metal temperature of 435-450° F. with a high airflow Blue M oven set at 550° F., and the final film had a DFT of 0.65-0.70 mils. Alongside the experimental paints a different commercial polyester polyol was obtained and formulated in the same way, and tested with an identical bake schedule. The commercial polyol chosen was a known coil coating polyester currently being sold and used in the market. The data and results are shown in Table XIX-6.

On the chrome-treated aluminum panels, at 1000 hours exposure, there was no evidence of corrosion, all panels rated a 10 for field blistering and field corrosion, as well as a 10 rating for the scribe. Therefore, all visuals were a 1 rating. This was good data to have for expanding into other substrates, and the fact that there was no differentiation and no setback in performance over the aluminum was good additional information.

The salt spray performance data for CRS substrate at 500 hours is presented in Table XIX-7. The visual rating of "1" was given to the experimental sample, having the best performance at the scribe and in the field. We observed this in the prior study using the 2K paints, and this is consistent with that performance. In both cases we outperformed a different industry benchmark polyol formulated into the same paint system. In this case, the paint was designed specifically for incorporation of the chosen commercial control polyol, and the experimental polyols were simply "dropped into" the formulation. The paint formulation with the commercial polyol was intended specifically for coil application, and the experimental polyols clearly outperformed it in this screening.

Field Blistering; Scribe Creep & Scribe Ratings are in accordance with ASTM D—1654. Field Corrosion Ratings are in accordance with ASTM D—610.

We see a similar result over the HDG substrate shown in Table XIX-8. Although all the paints performed better over this substrate, there was differentiation enough to assign the "1" visual rating to the experimental polyol once again, for having the lowest level of field blistering and the best scribe rating, along with no undercut seen at the scribe. The trend has held consistent throughout the separate independent studies.

The QCT 120° F. condensing humidity test, ASTM D4585, was also run to verify that the polyester-based films would not hydrolyze and/or blister after 1000 hours of exposure. The data from this exposure is shown in Table XIX-9, where the experimental polyol again outperformed the same control paint with a visual rating of "1". There was one experimental polyol that displayed some yellowing (XIMP1000-17.9), but the other panels did not appear to be affected much by either blisters or discoloration.

To assess the vulnerability of the aromatic content in the experimental polyols toward exposure to outdoor elements, we next looked at QUV-A340 exposure using ASTM D-4587 Cycle B testing protocol. This uses both a wet and dry cycle along with the UV exposure. The change in gloss was measured after 500 hours on CRS panels, as well as the color values and changes. The resulting data is shown in Table XIX-10 below. It is clear that the experimental materials based on high aromatic content have greater susceptibility to UV damage and gloss loss based on the results. The experimental polyols do not have any additive fortification through HALS or UV-absorbers, so are essentially unprotected. A topcoat over the experimental films could treat them more as a primer, and might be a better choice for outdoor use. A full study on potential stabilizer packages to implement in the paint formulation for use in exterior applications has not been investigated yet.

The coated panels were also exposed to a carbon-black/oil mixture spot test to evaluate their susceptibility to permanent staining, based on the change in the lightness/darkness reading from a spectrophotometer ($\Delta L$). The experimental material performed well in this test, again outperforming the commercial control. A reduced tendency for staining has been associated with better performance on panels coated for semi-trailers, which have high exposure to similar soot-based materials that cause staining of the finish. Any mention of Table 11 (now Table XIX-11?)

Figure 4:
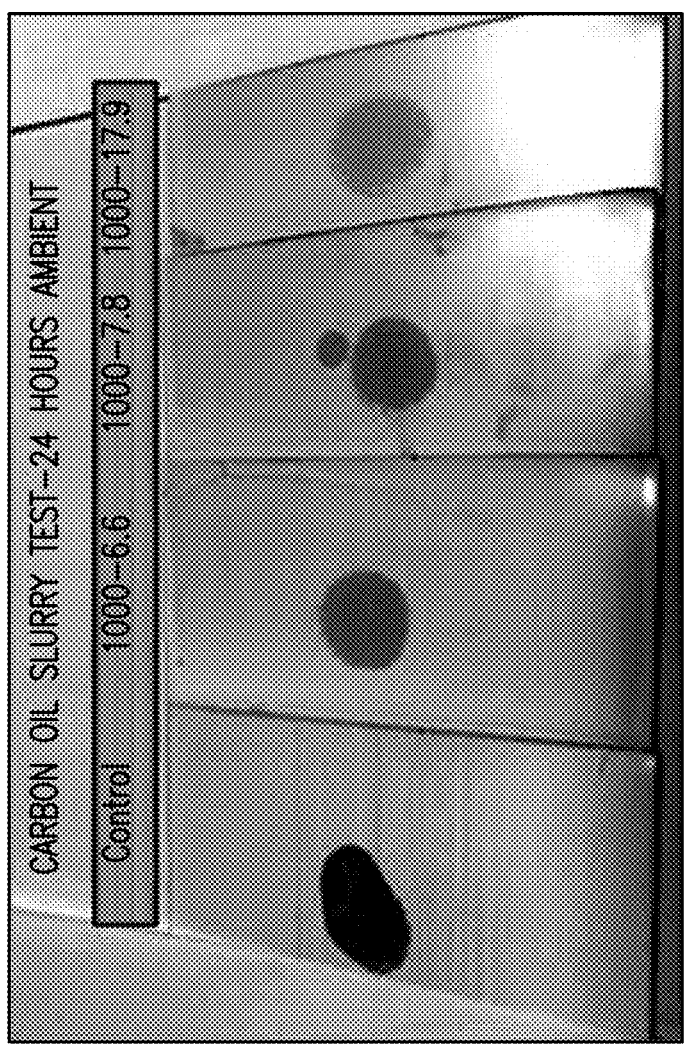
FIG. 4 shows photographs of panels after exposure to carbon oil slurry. (Left to Right) Commercial Material—Polynt Polymac 220-1935, X1MP1000-6.6, X1MP1000-7.8, and X1MP1000-17.9.
Figure 5:
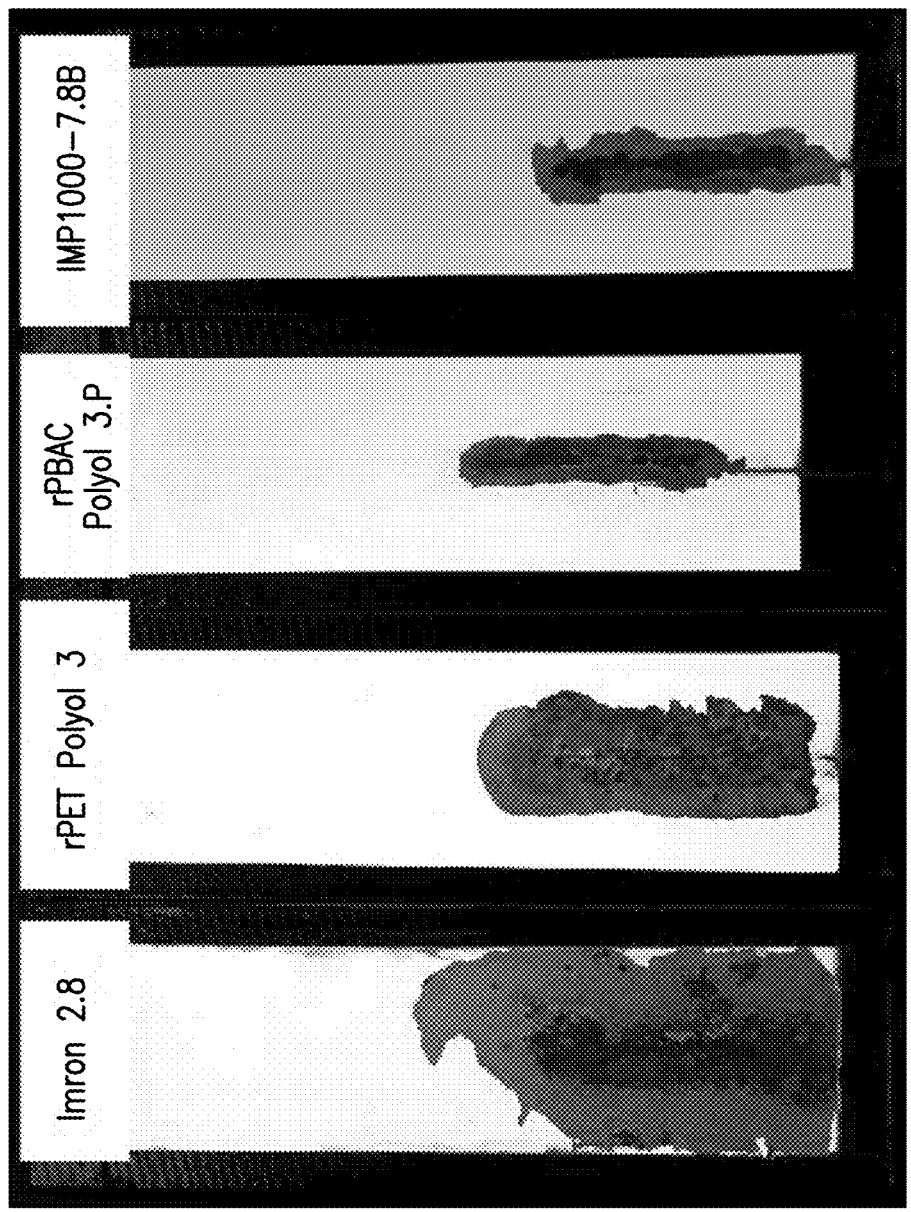
FIG. 5 shows photographs of scraped salt spray results after 530 hours on cold rolled (CRS) steel for primers based on polyester/carbonate polyols versus commercially available polyurethane primer. (Left to Right) Imron 2.8, recycled-PET Polyol 3, recycled-poly(bisphenol A carbonate) Polyol 3.P, and IMP1000-7.8B.
Figure 6:
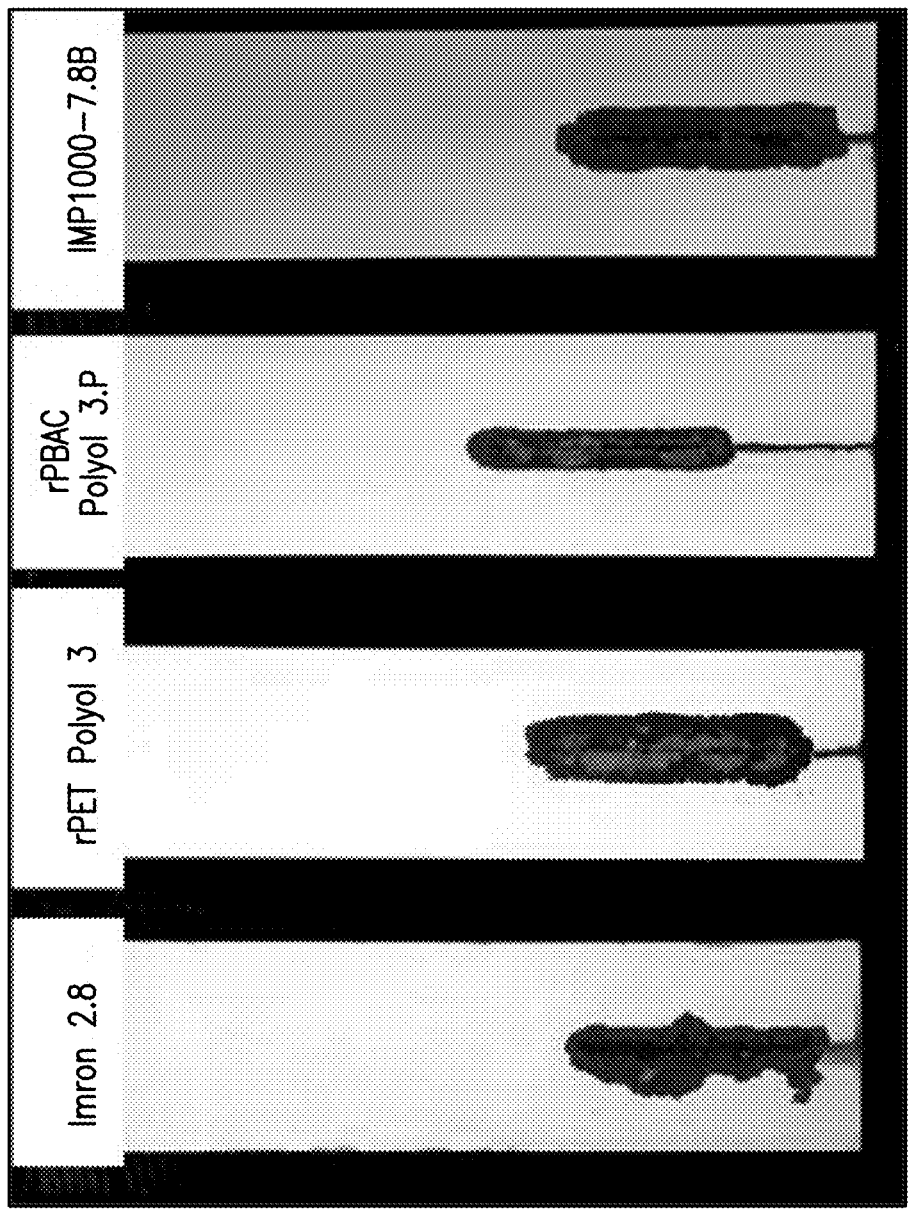
FIG. 6 shows photographs of scraped salt spray results after 530 hours on phosphate cold folled steel for primers based on polyester/carbonate polyols versus commercially available polyurethane primer. (Left to Right) Imron 2.8, recycled-PET Polyol 3, recycled-poly(bisphenol A carbonate) Polyol 3.P, IMP1000-7.8B.
Figure 7:
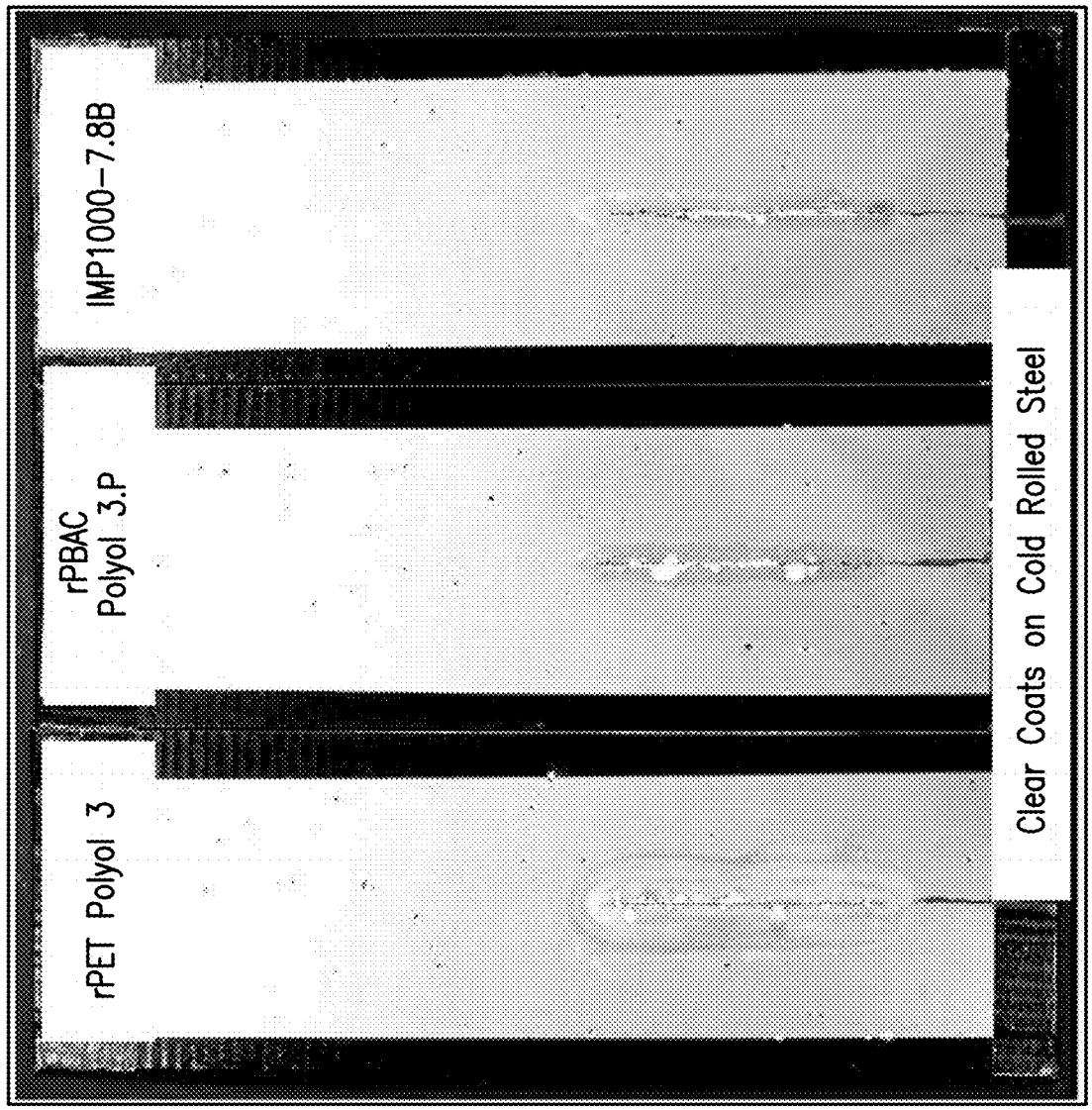
FIG. 7 shows photographs of scraped salt spray results after 303 hours on cold frolled steel for clear coats based on polyester/carbonate polyols. (Left to Right) recycled-PET Polyol 3, recycled-poly(bisphenol A carbonate) Polyol 3.P, and IMP 1000-7.8B.

FIG. 4 shows photographs of panels after exposure to carbon oil slurry. (Left to Right) Commercial Material—Polynt Polymac 220-1935, X1MP1000-6.6, X1MP1000-7.8, and X1MP1000-17.9.

In this study, paints were successfully formulated for the coil application using three experimental polyols along with a commercial benchmark polyol. The paints had similar viscosity and solids, similar application properties, and three of the four had similar color. The film properties were equivalent for pencil hardness, adhesion, reverse impact, MEK resistance, QCT humidity, salt spray over pretreated aluminum, and T-bend flexibility over HDG and Al substrates. The experimental polyol was found to outperform the commercial control for carbon oil stain resistance, salt spray over CRS and phosphated steel. The control polyol offers better gloss and color retention upon exposure to QUV-A 340.

The chosen control polyol has been a widely used resin for several years in both coil primers and coil topcoats as it offers an excellent balance of performance properties. The RMG resin platform has proven viable as a one coat over multiple metals with the strongest performance in corrosion and stain resistance and the weakest performance in accelerated weathering. Accordingly, to capitalize on the strong attributes of the RMG rPET resin platform, two potential applications include coil primer and interior topcoats (with primer as well as one coat direct to metal). Coil primers are used in multiple applications including interior and exterior applications (e.g. building side walls and roofs, metal purlin, metal furniture, hot water heaters and furnace wrappers, appliances, file cabinets, T bars for drop ceilings, metal doors, automotive underhood parts and oil filters). In the proper formulation it may be possible to capitalize on improved corrosion resistance by replacing a two-coat system with a one-coat product, as well as formulating a chrome free primer to replace a chrome containing primer for use on steel surfaces such as Cold Rolled Steel (CRS), Hot Rolled Steel, Galvalume, Hot Dipped Galvanized Steel, Electrogalvanized steel and Aluminum. As some of these applications will require white colors, the formulation of a chrome free primer using a XIMP1000 type resin should take precedence.

The work presented here shown advantages associated with the experimental products over several different commercial materials. This work has established a place for polyester polyols with high recycle content combined with high performance for specialty coating applications, where protection of metal surfaces is of prime importance. The properties associated with the above materials tested are very appropriate for today's protective coating demands over valuable substrates.

TABLE XIX-1

Melamine bake screening algorithm.

| | Koëning, sec. | Pencil | Al Adhesion, Crosshatch | MEK, Break-through | Reverse Impact, in-lbs | Flex T-bend | Total |
|---|---|---|---|---|---|---|---|
| Measured Value | 220+ | 2H = 10, 4H = 12 | 5 max | 200 max | 160 max | 0-4T | |
| Multiple | 1X | 20X | 40X | 1X | 1X | −50X | |
| Possible Score | 200+ | 240+ | 200 | 200 | 160 | −200 | 1000+ |

TABLE XIX-2

Coating properties of 1K gloss white films with 15% and 25% melamine.

| Polyol | Gloss 60 | Pencil Hardness | Impact dir/rev | T-bend | Adhesion | MEK DR |
|---|---|---|---|---|---|---|
| XIMP1000-1.5 (15%) | 99.0 | 5H | 160/160 | 0T, 1T | 5B | 400 |
| XIMP1000-1.5 (25%) | 99.3 | 5H | 160/160 | 0T, 0T | 5B | 200 |
| XIMP1000-5.0 (15.0%) | 104.2 | 4H | 160/160 | 1T, 1T | 5B | 400 |
| XIMP1000-5.0 (25%) | 86.3 | 4H | 160/160 | 4T, 5T | 5B | 450 |
| Commercial Coil Topcoat | 94.7 | H | 160/160 | 1T, 1T | 5B | 150 |

TABLE XIX-3

Coating properties of 2K white primer films.

| Polyol | Gloss 60 | Pencil Hardness | T-bend | Adhesion (3 substrates) | MEK DR |
|---|---|---|---|---|---|
| XIMP1000-6.5 | 88.4 | B | 0T | 5B | 74 |
| XIMP1000-6.6 | 91.2 | F | 0T | 5B | 85 |
| XIMP1000-7.8 | 84.8 | 2H | 0T | 5B | >100 |
| Commercial Polyol | 7.8 | 6H | 3T | 5B | >100 |

TABLE XIX-4

Salt spray results at 514 hours for 2K urethane primers.

| Polyol | Substrate | Field Blistering | Field Corrosion | Scribe creep (mm) | Scribe creep rating |
|---|---|---|---|---|---|
| XIMP1000-6.5 | CRS | 10 | 9G-10 | 0.5-1.0 | 8 |
| | Phos-CRS | 10 | 9G-10 | 0.5-1.0 | 8 |
| XIMP1000-6.6 | CRS | 10 | 9Sp-10 | 1.0-1.5 | 7.5 |
| | Phos-CRS | 10 | 9G-10 | 0.5-1.0 | 8 |
| XIMP1000-7.8 | CRS | 10 | 9G-10 | 0.5-1.5 | 7.5 |
| | Phos-CRS | 10 | 9G-10 | 0.5-1.0 | 8 |
| Commercial Polyol | CRS | 4F/2MD | 9G-10 | 0.5-1.0 | 8 |
| | Phos-CRS | 6F/6M | 9Sp-10 | 0.5 | 9 |

TABLE XIX-5

Panels taken from salt spray exposure at 530 hours and scraped along scribe.

| Polyol | Substrate | Field Blistering | Field Corrosion | Scribe Scrape Coating Removed (mm) | Scribe Creep Corrosion (mm) |
|---|---|---|---|---|---|
| XIMP1000-6.5 | CRS | None | <0.03% | 15-20 | 3-15 |
| | Phos-CRS | None | <0.03% | 11 | 5-6 |
| XIMP1000-6.6 | CRS | None | <0.03% | 7-9 | 2-3 |
| | Phos-CRS | None | <0.03% | 5-8 | 1-7 |
| XIMP1000-7.8 | CRS | None | <0.03% | 10 | 2-5 |
| | Phos-CRS | None | <0.03% | 5-8 | 2-6 |
| Commercial Polyol | CRS | Moderate | <0.03% | 35+ | 10-15 |
| | Phos-CRS | Moderate | <0.03% | 7-16 | 2-4 |

TABLE XIX-6

Coating properties of 1K gloss white films with 18% melamine.

| Polyol | Gloss 60 | Reverse Impact | Pencil Hardness | T-bend | Adhesion (3 Substrates) | MEK DR |
|---|---|---|---|---|---|---|
| XIMP1000-6.6 | 22 | 160 | 4H | 3T | 5B | 200+ |
| XIMP1000-7.8 | 24 | 150 | 4H | 4T | 5B | 200+ |
| XIMP1000-17.9 | 23 | 160 | 4H | 4T | 5B | 200+ |
| Commercial Polyol | 28 | 160 | 4H | 2T | 5B | 200+ |

TABLE XIX-7

Salt spray results for CRS at 500 hours for 1K melamine one-coat coil.

| Polyol | Visual Rating | Field Blistering | Field Corrosion | Scribe Creep (cm) | Scribe Rating |
|---|---|---|---|---|---|
| XIMP1000-6.6 | 2 | 4 1-2 mm D | 5-P | 0.3 | 5 4 mm UC |
| XIMP1000-7.8 | 1 | 7 1-2 mm MD | 6-G | NR | 7 3 mm UC |
| XIMP1000-17.9 | 2 | 3 2-4 mm D | 3-P | 0.4 | 4 8 mm UC |
| Commercial Polyol | 2 | 5 2-4 mm D | 5-G | 0.4 | 6 7 mm UC |

TABLE XIX-8

Salt spray results for HDG steel at 1000 hours for 1K melamine one-coat coil.

| Polyol | Visual Rating | Field Blistering | Field Corrosion | Scribe Rating |
|---|---|---|---|---|
| XIMP1000-6.6 | 2 | 7 1-2 mm MD | 10 | 7 No UC |
| XIMP1000-7.8 | 1 | 8 0.5-1 mm M | 10 | 8 No UC |
| XIMP1000-17.9 | 2 | 3 2-4 mm MD | 10 | 5 No UC |
| Commercial Polyol | 2 | 3 2-4 mm D | 10 | 6 7 mm UC |

TABLE XIX-9

Condensing humidity results over CRS.

| Polyol | Visual Rating | Field Blistering |
|---|---|---|
| XIMP1000-6.6 | 2 | No blister. No discoloration. |
| XIMP1000-7.8 | 1 | No blister. No discoloration. |
| XIMP1000-17.9 | 3 | No blister. Yellowing very evident. |
| Commercial Polyol | 2 | No blister. No discoloration. |

TABLE XIX-10

QUV exposure data after 500 hours.

| Polyol | ASTM D-523 Initial Gloss | ASTM D-523 Gloss after 500 hours | ΔL | Δa | Δb | ΔE |
|---|---|---|---|---|---|---|
| XIIVIP1000-6.6 | 21.6 | 14.4 | −0.6 | −0.2 | −1.1 | 1.27 |
| XIIVIP1000-7.8 | 23.5 | 8.1 | −0.7 | −0.1 | −1.5 | 1.66 |
| XIIVIP1000-17.9 | 23.2 | 4.6 | −0.9 | 0.0 | −1.6 | 1.84 |
| Commercial Polyol | 28.2 | 24.7 | −0.2 | 0.0 | −0.1 | 0.20 |

TABLE XIX-11

Color spectrophotometer readings of carbon oil stain exposure.

| Polyol | X-Rite L Before | X-Rite A Before | X-Rite B Before | X-Rite L After | X-Rite A After | X-Rite B After | ΔL After Stain Test |
|---|---|---|---|---|---|---|---|
| XIMP1000-6.6 | 89.9 | −1.6 | −2.4 | 80.8 | −0.7 | 2 | 9.1 |
| XIMP1000-7.8 | 89.3 | −1.6 | −1.8 | 79.2 | −0.7 | 2.6 | 10.1 |
| XIMP1000-17.9 | 91.9 | −1.9 | 2 | 86.1 | −1 | 5.2 | 5.8 |
| Commercial Polyol | 90.6 | −1.4 | −3.3 | 67.4 | 0.2 | 3.5 | 23.2 |

Example XX

Coatings and Performance

The Figures cited in this Example XX are numbered with respect to this Example XX.

Three experimental proprietary polyols targeted for industrial metal coatings are included (PEP1000-17.9D, IMP1000P-6.6B, and IMP1000P-7.8B) for comparative purposes in Table XX-1. These polyols contains rPBAC at a level greater than 5%, and the 2K coating properties for these polyols, including solvent-resistance, Konig hardness, water resistance and adhesion are all excellent.

In the case of the low molecular weight polyol examples, it was observed that the incorporation of either BPA or rPBAC yielded a notable improvement in transparency of the final product and a greatly reduced tendency to crystallize and separate.

Coating Results

Table XX-2 provides a table of 2-component urethane coating results for the polyols based on PEP1020-1.0C. At 8% content of both BPA and rPBAC losses in MEK double rubs were observed, and in the case of 8% BPA, pencil hardness suffered slightly. As the BPA content increased versus the control, the Konig hardness improved along with the MEK double rub performance with both surpassing the original control results. In all cases the other properties remained unaffected. The results indicate that recycled poly(bisphenol A carbonate) can be successfully incorporated into recycled PET polyols to provide excellent coating performance.

Coating Performance Results

Table XX-3 provides coating results for a set of polyols in which a commercially available, phthalic anhydride-based polyol was modified with 15% BPA and rPBAC. In both cases the MEK double rub performance improved, but in the case of the rPBAC modified polyol, the ⅛" mandrel bend failed, indicating a more brittle coating. In both cases, the coatings lost a unit of pencil hardness versus the control. The results are an indication that recycled poly(bisphenol A carbonate) can be successfully incorporated into aromatic polyester polyols to provide excellent coating performance.

Coating Performance Results

Table XX-4 provides results for a proprietary industrial metal coating polyol (IMP1000-6.5B) modified with greater than 5% rPBAC (IMP1000-6.6B). In this case, the MEK double rub performance improved, as well as the Konig hardness. In this case, the coating gained a unit of pencil hardness versus the control. The results are another indication that recycled poly(bisphenol A carbonate) can be successfully incorporated into aromatic polyester polyols to provide excellent coating performance.

Finally, in Table XX-4, two other proprietary coating polyols (PEP1000-17.9C and IMP1000-7.8B) containing greater than 5% rPBAC were tested to determine their suitability for coating applications, and again, rPBAC was found to contribute to improved Konig hardness and MEK double rub performance, without negatively affecting the other excellent properties of the coatings.

Coating Performance Results—Salt Spray Results

Table XX-5 provides a summary of salt spray results at 514 hours obtained for two-component polyurethane coatings prepared using three of the polyols described in FIG. 8. One of the experimental polyols contained no rPBAC (rPET Polyol 3) and was based primarily on rPET content. A second experimental polyol contained >5% rPBAC (proprietary) but utilized rPET Polyol 3 as the base polyol along with a second biobased ingredient. The third experimental polyol is an experimental industrial metal coating polyol developed by Resinate Materials Group, Inc. All three experimental coatings (preparation details provided above) were compared to a commercial polyurethane primer as the control. It is relevant to note that the three experimental polyols did not contain any corrosion inhibitors such as zinc phosphate, which the commercial polyurethane primer product did contain at 3 wt. %.

Overall, the salt spray performance of the experimental products was very good, either identical to or exceeding the commercial polyurethane primer performance. The experimental polyols yielded no blistering in the field areas where the Imron sample did. None of the primers showed significant field corrosion after 500+ hours of exposure. They showed better wet-adhesion to the metals, especially to cold rolled steel (CRS), as evidenced by less coating removed upon scraping the scribe areas. The scribe creep corrosion was equivalent to or better than the benchmark over both substrates.

Prior to scraping of the scribes, significant blistering was observed near the scribe for the experimental coatings without zinc phosphate, while they were absent in the commercial polyurethane primer product. These blisters disappeared from the coatings soon after removal from the salt spray apparatus. We believe that the addition of zinc phosphate will eliminate these blisters, while perhaps improving the already excellent ASTM salt spray results of the new polyols.

After making the observations and measurements for the 514-hour panels above, the panels were reintroduced into the salt spray apparatus and allowed to equilibrate overnight. Immediately upon removal from the salt spray test at 530 hours, the scribe areas were scraped to remove loose coating material. The photos in FIGS. 17 and 18 display the improved wet adhesion in the scribe areas for the primers containing the experimental polyols as compared to the commercially available control. For the case of cold rolled steel, the presence of rPBAC in the polyol has clearly enhanced the wet adhesion performance versus both the commercially available primer as well as versus the rPET polyol containing no rPBAC.

Table XX-6 provides a summary of salt spray results for direct-to-metal clear coatings on cold rolled steel based on rPET polyol alone (rPET Polyol 3.P), rPET+rPBAC (rPBAC Polyol 3.P) and an experimental industrial metal polyol containing both rPET and rPBAC. Again, it is apparent that the presence of rPBAC in the polyol has yielded a beneficial effect on salt spray performance. Immediately after removal from the salt spray chamber and after measurements were taken, the scribe areas were again scraped, yielding the panels shown in FIG. 20. Again, in both of the experimental polyols containing rPBAC, the wet adhesion was improved versus the rPET polyol without rPBAC.

These results demonstrate that a new class of green chemistry polyols containing rPBAC content has been created by glycolyzing rPBAC using recycled PET polyols and other aromatic polyester polyols. Additional biobased and recycled ingredients can bring the total green content of the new class of polyols up to 99.9%. The new polyols demonstrate excellent coating properties, including solvent and water resistance, adhesion to metal, impact resistance, mandrel bend, enhanced hardness, and salt spray and MEK double rub resistance. The viscosity of the new polyols may be controlled by the incorporation of hydrophobes such as vegetable oils or unsaturated fatty acids, providing dual-cure capability. Some of the polyol characteristics and performance attributes may also be achieved by the use of BPA instead of rPBAC at the expense of reduced green content due to the petroleum origins of the BPA.

The excellent salt spray resistance of primers prepared using the green chemistry based polyester/carbonate polyols versus a commercially available polyurethane metal primer containing zinc phosphate was surprising, considering that no corrosion resistance additives were present in the experimental polyester/carbonate polyol based coatings. Additionally, the incorporation of rPBAC in rPET polyols provided improved salt spray performance versus rPET polyols without rPBAC in direct-to-metal clear coatings on cold rolled steel.

It was observed that in high rPET content polyols, the long-term tendency of these polyols to crystallize was eliminated in the presence of both rPBAC and bisphenol derivatives. This suggests the use of the technology as an alternative to halogenated flame retardants in rigid polyurethane foams and rigid polyisocyanurate foams by using higher terephthalate content polyols.

Table XX-7 summarizes data for the performance of the incorporation of a poly(bisphenol-A carbonate) into a coating.

Modified Aliphatic Polyester Polyols from PBAC

We surprisingly found that the corrosion resistance of 2K polyurethanes made from commercial aliphatic polyester polyols can be improved by digesting the commercial polyol with 1 to 30 wt. % (or 5 to 25 wt. %) of poly(bisphenol A carbonate) (PBAC). We also found that 2K polyurethanes made from polyester polyols formulated with PBAC have improved corrosion resistance when compared with similar polyurethanes made from polyester polyols that do not incorporate PBAC. Carbonate polyols suitable for use in making coatings, including 2K polyurethane coatings, can be prepared by digesting recycled poly(bisphenol A carbonate) with 5 to 30 wt. % of a diol. These are illustrated by the following examples.

Modifying a Commercial Aliphatic Polyester Polyol

A reactor equipped with an overhead mixer, heating mantle, Liebig condenser, thermocouple, and nitrogen inlet is charged with butyltin hydroxide oxide hydrate (0.10 wt. %), STEPANPOL® PC-105P-110 polyol (an adipic acid/1,6-hexandiol polyester polyol having a hydroxyl number of 104-116 mg KOH/g, product of Stepan Company, 78.7 wt. %), and recycled poly(bisphenol A carbonate) (21.2 wt. %). The mixture is heated and stirred until the reactor contents reach 200° C. under a flow of nitrogen. The mixture is heated until no particles of poly(bisphenol A carbonate) remain (about 4 h).

Carbonate Polyol from Poly(bisphenol A Carbonate) and PG (Polyol 23.4C)

The reactor described above is charged with titanium(IV) hydroxide (0.10 wt. %), recycled poly(bisphenol A carbonate) (92.3 wt. %), and propylene glycol (7.61 wt. %). The mixture is heated and stirred until the reactor contents reach 200° C. under a flow of nitrogen. The mixture is heated until no particles of poly(bisphenol A carbonate) remain (about 4 h). Upon cooling, the mixture is diluted to 60 wt. % solids with a 1:1 (vol/vol) mixture of propylene carbonate and methyl ethyl ketone (MEK). GPC analysis (refractive index detector) shows $M_n=1087$, $M_w/M_n=1.84$. The GPC trace indicates a minor proportion of bisphenol A and a major proportion of higher molecular weight components. When blended with another polyester polyol, the carbonate polyol imparts improved corrosion resistance to the 2K polyurethane coating (see Table XX-11).

Carbonate Polyol from Poly(Bisphenol A Carbonate) and PG (Polyol 23.5A)

The procedure is repeated with titanium(IV) hydroxide (0.10 wt. %), recycled poly(bisphenol A carbonate) (80.9 wt. %), and propylene glycol (19.1 wt. %). Upon cooling, the mixture is diluted to 90 wt. % solids with propylene glycol monomethyl ether acetate (PMAc). GPC analysis (refractive index detector) shows $M_n=398$, $M_w/M_n=1.21$. The GPC trace indicates a substantial proportion of bisphenol A and a significant proportion of a limited number of higher molecular weight components. When used alone or when blended with a polyester polyol, the carbonate polyol provides 2K coatings with excellent corrosion resistance (see Table XX-11).

A 2K polyurethane coating prepared as described below from this carbonate polyol exhibits good hardness (Koenig hardness: 220 s; pencil hardness: H), good flexibility (passes a ⅛" mandrel bend test), and maximum impact resistance (160 in-lb. in direct and reverse impact testing). The coating also demonstrates good chemical resistance (rating of "5" for Windex® ammonia cleaner, ethanol, and vinegar; MEK double rubs: >200). Adhesion is relatively poor (rating of "1") but could be improved by blending or further optimization of the formulation. The results suggest that the carbonate polyol has value for use alone or in combination with other coating polyols.

Two-Component Polyurethane Coatings from the Aliphatic Polyester Polyols

Polyol samples are diluted in a beaker with 1:1 (vol/vol) PMAc/MEK mixture to bring the final solids percentage, after isocyanate addition, to 50 wt. %. Once dissolved, enough VESTANAT® HT 2500/100 HDI-T (product of Evonik) is added to bring the NCO:OH ratio to 1.05. After stirring until homogeneous, the mixture is poured through a 125-micron paint strainer. Dibutyltin dilaurate (0.05 wt %) is then added and mixed well. After about 30 seconds, a bead of the reacting mixture is applied to one side of each of two cold-rolled steel panels (4"×12"). The beads of solvent-borne polyurethane are drawn down into wet films using a #50 R.D. Specialties drawdown bar to a thickness of 1-1.5 mils. The panels are allowed to flash dry in a hood at ambient temperature for 0.5 h, then heated to 120° C. for 0.5 h to complete the cure.

Salt Spray Testing

Panels clear-coated with the aliphatic polyester polyol-derived 2K polyurethanes as described above are tested for corrosion resistance. Two coated panels of each sample are taped, scribed, and exposed to salt spray corrosion testing according to ASTM B 117 for 161 hours and 326 hours. Some of the panels are returned to salt spray exposure for a total of 404 hours, after which the scribed portions are immediately scraped and rated for corrosion. The results are presented in Tables XX-8. XX-9, and XX-10, below.

All of the panels show excellent resistance to blistering (a rating of 10 on a scale of 0 to 10, with 10 indicating that no blistering is evident) even after 404 hours of exposure to salt spray. ASTM D714-02 is used to evaluate blistering.

Field corrosion is identified as "general" (G), "spots" (S), or "pinpoint" (P) on a rust grade scale of 0 to 10, with 10 being the best. On this scale, a rating of 1 indicates that 33-50% of the surface is rusted; a rating of 5 indicates that 1-3% of the surface is rusted; a rating of 7 indicates that 0.1 to 0.3% of the surface is rusted; and a rating of 10 indicates that up to 0.01% of the surface is rusted. The scale used is further described in ASTM D610-08.

Scribe creep (in mm) is a measure of how wide the corrosion is at the scribed marking. A scribe rating (from 0 to 10, with 10 being the best) is assigned based on the amount of scribe creep. A rating of 0 corresponds to 16 mm or more of scribe creep; a rating of 5 corresponds to 3-5 mm of scribe creep; a rating of 8 corresponds to 0.5 to 1.0 mm of creep; and a rating of 10 corresponds to no measurable scribe creep. The scale used is further described in ASTM D1654-08.

As shown in Table XX-8, a 2K polyurethane coating made from a commercial aliphatic polyester polyol (STEPANPOL® PC-105P-110) exhibits fair corrosion resistance after 161 hours of salt spray. However, the formulation is improved by modification of the polyol with 12% bisphenol A (polyol 23.2A) and is vastly improved when the commercial polyol is modified with 21.2 wt. % of recycled poly(bisphenol A carbonate) (polyol 23.3A).

Polyol 1.5D, which is made from recycled PET (36.7 wt. %), neopentyl glycol, propylene glycol, glycerol, isophthalic acid, and adipic acid, exhibits poor corrosion resistance after 161 hours of salt spray exposure. In contrast, when the formulation is modified by including 12.1 wt. % of recycled poly(bisphenol A carbonate) (Polyol 5.0A), the 161-hour corrosion resistance is far better. Excellent results are also seen when the adipic acid in this formulation is replaced with an equivalent molar amount of succinic acid (Polyol 7.8E). As shown with (Polyol 9.3A), the PBAC can be introduced into the polyol synthesis after the other materials have been reacted together with essentially similar results in the corrosion testing. For some coating applications, it may be desirable to ensure that any bisphenol A generated in the polyol synthesis be scavenged. Polyol 10.0B illustrates that a BPA scavenger (in this case, 14.6 wt. % of CARDURA™ E-10 (neodecanoic acid glycidyl ether, product of Hexion)) can be added, and the positive salt spray results are retained.

Table XX-9 summarizes the salt spray results from testing the 2K polyurethane clear-coated panels after 326 hours of exposure. Extensive corrosion is evident in coatings made with STEPANPOL® PC-105P-110 and Polyol 1.5D. Again, the bisphenol A-modified product (Polyol 23.2A) improves on the unmodified commercial polyol, but far better results are seen when the commercial polyol is modified with poly(bisphenol A carbonate) (Polyol 23.3A). The 2K polyurethane coatings from the PBAC modified polyester polyols (Polyols 5.0A, 9.3A, and 10.0B) fare much better in the salt spray testing after 326 hours of exposure than a coating from the rPET-based polyester polyol made without PBAC (Polyol 1.5D).

Table XX-10 shows the results after 404 hours of salt spray followed by immediate scraping of the panel to remove loosened coating. In each case, the clearcoat is removed easily upon scraping. In general, the panels that achieved the highest level of corrosion protection are based on polyols having at least some PBAC into their structure (Polyols 23.3A, 5.0A, and 9.3A).

Coatings from Carbonate Polyols and Polyol Blends

Table XX-11 shows 97-hour salt spray results (generated as previously described) of testing 2K polyurethane clearcoats made using various polyols, including a carbonate polyol and blends of carbonate polyols with polyester polyols. Polyol 6.5E is an rPET polyester polyol made without any PBAC for comparison. The 2K polyurethane coating from Polyol 6.5E shows significant general corrosion after 97 hours of salt spray exposure. Polyol 23.5A is a carbonate polyol ($M_n$ about 400 g/mol) made from PBAC and propylene glycol. This polyol, when used alone or in combination with Polyol 6.5E provides 2K polyurethane coatings with good corrosion resistance in the abbreviated test. Coatings made from blends of Polyol 6.5E with carbonate polyols 23.5A and 23.4C (a 1000 g/mol polyol made from PBAC and PG) demonstrate improved corrosion resistance compared with coatings made from only Polyol 6.5E.

TABLE XX-1

High molecular weight PET Polyols Containing recycled PBAC and BPA.

| Name | Base Polyol Used | Compositional Information | Bisphenol Source | Wt. % Bisphenol Source | Recycle Content | Total Green Content | Func. | AV | OHV | Visc. (cps) at 25° C. |
|---|---|---|---|---|---|---|---|---|---|---|
| rPET Polyol 3 | NA | — | None | 0.0% | — | 74.7% | 2.06 | 6.7 | 58 | NM |
| rPBAC Polyol 3.P | rPET Polyol 3 | 33.86% rPET/ 14.32% NPG/ 8.46% PG/1.53% Glycerol/12.70% PBAC/7.58% Isopthalic Acid/ 21.42% Succinic Acid/0.13% MTBO | rPBAC | 12.7% | 55.0% | 78.0% | 2.06 | 6.7 | 58 | NM |
| XPEP1000P-17.9 | Proprietary | 39% rPET/17% PG/17% BiOH/ 17.9% Succinic Acid/9% PBAC | rPBAC | 9.0% | 65% | 99.9% | 2.15 | 4.1 | 134 | 9,000 (100 C.) |
| IMP1000P-7.8B | Proprietary | 31.21% rPET/ 13.19% NPG/ 7.81% PG/1.42% Glycerol /19.51% PBAC/6.98% Isopthalic Acid/ 19.77% Succinic Acid/0.12% MTBO | rPBAC | 19.51% | 58.52% | 79.7% | 2.06 | 5 | 75 | NM |

TABLE XX-2

Recycle-Content Aromatic Polyester Polyol Containing BPA and recycled PBAC-Coating Performance Results.

| Polyol | PEP1020-1.0C Control | PEP1020-1.0C + 8% BPA | PEP1020-1.0C + 8% rPBAC | PEP1020-1.0C + 15% BPA | PEP1020-1.0C + 25% BPA |
|---|---|---|---|---|---|
| OHV (mg KOH/g) | 104 | 109 | 94 | 138 | 169 |
| Film Appearance | Clear | Clear | Clear | Clear | Clear |
| Konig Hardness (sec.) | 192 | 192 | 199 | 209 | 218 |
| Pencil Hardness | HB | 2B | HB | F | HB |
| Adhesion | 5 | 5 | 5 | 5 | 5 |
| Mandrel Bend | 1/8" | 1/8" | 1/8" | 1/8" | 1/8" |
| Windex 1 h Spot | 5 | 5 | 5 | 5 | 5 |
| Windex 1 h Spot, 1 h recovery | 5 | 5 | 5 | 5 | 5 |
| 50% Ethanol 1 h Spot | 5 | 5 | 5 | 5 | 5 |
| 50% Ethanol 1 h Spot, 1 h recovery | 5 | 5 | 5 | 5 | 5 |
| Vinegar 1 h Spot | 5 | 5 | 5 | 5 | 5 |
| Vinegar 1 h Spot, 1 h recovery | 5 | 5 | 5 | 5 | 5 |
| Water 24 h Spot | 5 | 5 | 5 | 5 | 5 |
| Water 24 h Spot, 1 h recovery | 5 | 5 | 5 | 5 | 5 |
| MED Double Rubs | 129 | 117 | 107 | 147 | 153 |
| Direct Impact | >160 | >160 | >160 | >160 | >160 |
| Indirect Impact | >160 | >160 | >160 | >160 | >160 |

TABLE XX-3

Commercially Available, Phthalic Anhydride-Based Polyol Containing BPA and recycled PBAC-Coating Performance Results.

| Polyol | PA Based CASE Polyol Control | PA Based CASE Polyol, 15% BPA | PA Based CASE Polyol, 15% rPBAC |
|---|---|---|---|
| OHV (mg KOH/g) | 110 | 151 | 74 |
| Film Appearance | Clear | Clear, Some Bubbles | Clear |
| Konig Hardness (sec.) | 234 | 231 | 224 |
| Pencil Hardness | F | HB | HB |
| Adhesion | 5 | 5 | 5 |
| Mandrel Bend | 1/8" | 1/8" | Fail |
| Windex 1 h Spot | 5 | 5 | 5 |
| Windex 1 h Spot, 1 h recovery | 5 | 5 | 5 |
| 50% Ethanol 1 h Spot | 5 | 5 | 5 |
| 50% Ethanol 1 h Spot, 1 h recovery | 5 | 5 | 5 |
| Vinegar 1 h Spot | 5 | 5 | 5 |
| Vinegar 1 h Spot, 1 h recovery | 5 | 5 | 5 |
| Water 24 h Spot | 5 | 5 | 5 |
| Water 24 h Spot, 1 h recovery | 5 | 5 | 5 |

TABLE XX-3-continued

Commercially Available, Phthalic Anhydride-Based Polyol Containing BPA and recycled PBAC-Coating Performance Results.

| Polyol | PA Based CASE Polyol Control | PA Based CASE Polyol, 15% BPA | PA Based CASE Polyol, 15% rPBAC |
|---|---|---|---|
| MED Double Rubs | 82 | 102 | 122 |
| Direct Impact | >160 | >160 | >160 |
| Indirect Impact | >160 | >160 | >160 |

TABLE XX-4

Recycle-Content recycle PET Polyols Containing BPA and rPBAC-Coating Performance Results.

| Polyol | rPET Polyol 3 Control | rPET Polyol 3 + >5% rPBAC | PEP1000P-17.9D (>5% rPBAC) | IMP1000P-7.8B (>5% rPBAC) |
|---|---|---|---|---|
| OHV (mg KOH/g) | 36 | 58 | 119 | 75 |
| Film Appearance | Clear | Clear | Clear | Clear |
| Konig Hardness (sec.) | 156 | 211 | 215 | 225 |
| Pencil Hardness | HB | F | F | F |
| Adhesion | 5 | 5 | 5 | 5 |
| Mandrel Bend | ⅛" | ⅛" | ⅛" | ⅛" |
| Windex 1 h Spot | 5 | 5 | 5 | 5 |
| Windex 1 h Spot, 1 h recovery | 5 | 5 | 5 | 5 |
| 50% Ethanol 1 h Spot | 5 | 5 | 5 | 5 |
| 50% Ethanol 1 h Spot, 1 h recovery | 5 | 5 | 5 | 5 |
| Vinegar 1 h Spot | 5 | 5 | 5 | 5 |
| Vinegar 1 h Spot, 1 h recovery | 5 | 5 | 5 | 5 |
| Water 24 h Spot | 5 | 5 | 5 | 5 |
| Water 24 h Spot, 1 h recovery | 5 | 5 | 5 | 5 |
| MED Double Rubs | 83 | 97 | 117 | 120 |
| Direct Impact | >160 | >160 | >160 | >160 |
| Indirect Impact | >160 | >160 | >160 | >160 |

TABLE XX-5

Salt Spray Results for Primers Based on Polyester/Carbonate Polyols Versus Commercially Available Polyurethane Primer.

Salt Spray Test Duration = 514 Hours

| Polyurethane Coating | Substrate | Field Blistering | Field Corrosion | Scribe Creep Corrosion (mm) | Scribe Creep Rating | Blister Sizes Near Scribe** |
|---|---|---|---|---|---|---|
| Commercial PU Primer* | Cold Rolled Steel | Moderate | 9G-10 | 0.5-1 | 8 | 0 |
| rPET Polyol 3 | Cold Rolled Steel | None | 9G-10 | 0.5-1 | 8 | 16-25 mm |
| rPBAC Polyol 3.P | Cold Rolled Steel | None | 9Sp-10 | 1-1.5 | 7.5 | 3-7 mm |
| IMP1000-7.8B | Cold Rolled Steel | None | 9G-10 | 0.5-1.5 | 7.5 | 5-8 mm |
| Commercial PU Primer* | Phosphated Cold Rolled Steel | Moderate | 9SP-10 | 0.5 | 9 | 0-4 mm |
| rPET Polyol 3 | Phosphated Cold Rolled Steel | None | 9G-10 | 0.5-1 | 8 | 10-12 mm |
| rPBAC Polyol 3.P | Phosphated Cold Rolled Steel | None | 9G-10 | 0.5-1 | 8 | 7 mm |
| IMP1000-7.8B | Phosphated Cold Rolled Steel | None | 9G-10 | 0.5-1 | 8 | 10 mm |

*Contains 3% Zinc Phosphate Corrosion Inhibitor.
**Blisters disappear soon after removal from salt spray apparatus.

TABLE XX-6

303 Hour Salt Spray Results on Cold Rolled Steel for Clear Coats Based on Polyester/Carbonate Polyols.

Salt Spray Test Duration = 303 Hours

| Polyol | Substrate | Field Blistering | Field Corrosion | Scribe Scrape Coating Removed (mm) | Scribe Creep-Corrosion* (mm) |
|---|---|---|---|---|---|
| rPET Polyol 3 | Cold Rolled Steel | None | 0.1% | 12-15 | 5** |
| rPBAC Polyol 3.P | Cold Rolled Steel | None | 0.1% | 5-7 | 1-5 |
| IMP1000P-7.8B | Cold Rolled Steel | None | 0.1% | 5-6 | 1-3 |

Results are average of two panels each.
*Includes black rust and grey/white discoloration observed at scribe.
**Includes 5 mm color change ring around scribe.

TABLE XX-7

Polyester Polyol Compositions

| Polyol | Composition (wt. %) | Comment |
|---|---|---|
| Stepanpol PC-105P-110 | aliphatic polyester polyol from 1,6-hexanediol and adipic acid; product of Stepan Company | |
| 23.2A | Stepanpol PC-105P-110 + 12 wt. % bisphenol A | |
| 23.3A | Stepanpol PC-105P-110 + 21.2 wt. % recycled poly(bisphenol A carbonate) | |
| 1.5D | rPET (36.7); NPG (15.5); PG (9.2); glycerol (1.6); IPA (8.2); adipic acid (28.7) | 0% PBAC; comparative example |
| 5.0A | rPET (32.3); NPG (13.6); PG (8.1); glycerol (1.5); PBAC (12.1); IPA (7.2); adipic acid (25.3) | |

TABLE XX-7-continued

Polyester Polyol Compositions

| Polyol | Composition (wt. %) | Comment |
|---|---|---|
| 7.8E | rPET (31.2); NPG (13.2); PG (7.8); glycerol (1.4); PBAC (19.5); IPA (7.0); succinic acid (19.8) | |
| 9.3A | rPET (31.2); NPG (13.2); PG (7.8); glycerol (1.4); PBAC (19.5); IPA (7.0); succinic acid (19.8) | Same as 7.8E except that the PBAC is reacted in after digestion of the other reactants. |
| 10.0B | 7.8E (80.5); Cardura E-10 (14.6) | Cardura E-10 reacted in as a phenolic scavenger | rPET = recycled polyethylene terephthalate; NPG = neopentyl glycol; PG = propylene glycol; IPA = isophthalic acid; PBAC = poly(bisphenol A carbonate)

TABLE XX-8

Salt Spray Results:
2K Polyurethane Clearcoats from Modified Aliphatic Polyester Polyols
161-Hour Results (average of two panels)

| Polyol | Field Blistering | Field Corrosion | Scribe creep (mm) | Scribe Rating | Scribe comments |
|---|---|---|---|---|---|
| Stepanpol PC-105P-110* | 10 | 5P orange rust; 5-7G, black rust | 1-4 | 6 | none |
| 23.2A | 10 | 3P orange rust; 5-6G black rust | 1 | 8 | 5-10 mm faint blister halo |
| 23.3A | 10 | 6P orange rust; 7G black rust | 0.5-1 | 8 | 15-mm blister halo & blushing |
| 1.5D* | 10 | 3P orange rust; 8G orange rust | 0.5-5 | 6.5 | bottom half of panel halo around scribe; full panel width rust spots |
| 5.0A | 10 | 6-7G | 1-4 | 6-8 | 5-mm blister halo |
| 7.8E | 10 | 6G with blisters around rust spots | 1 | 8 | 5-7 mm blister and pinpoint rust halo |
| 9.3A | 10 | 7-8G | 1-3 | 6.5-8 | 5-mm blister halo |
| 10.0B | 10 | 7G | 1 | 8 | none |

*Comparative example
23.2A = Stepanpol PC-105P-110 reacted with 12% bisphenol A
23.3A = Stepanpol PC-105P-110 reacted with 21.2% recycled poly(bisphenol A carbonate)
1.5D = polyester polyol without PBAC content
5.0A = Polyol of Example XIII made with adipic acid instead of succinic acid; 19.5% rPBAC
7.8E = Polyol of Example XIII (19.5% rPBAC)
9.3A = Polyol of Example XIII but made by reacting in the rPBAC after an initial digestion
10.0B = Polyol of Example XIII post reacted with Cardura™ E-10 (neodecanoic alcohol glycidyl ether, product of Hexion) as a phenolic scavenger.

TABLE XX-9

Salt Spray Results:
2K Polyurethane Clearcoats from Modified Aliphatic Polyester Polyols 326-Hour Results (average of 2 panels)

| Polyol | Field Blistering | Field Corrosion | Scribe creep (mm) | Scribe Rating | Scribe comments |
|---|---|---|---|---|---|
| Stepanpol PC-105P-110* | 10 | 3P orange rust; 4G, black rust | 2-10 | 4-5 | none |
| 23.2A | 10 | 3P orange rust; 5G black rust | 2-8 | 5-6 | 5-10 mm faint blister halo |
| 23.3A | 10 | 4-5P orange rust; 7G-65 black rust | 1-5 | 6-6.5 | 15-20 mm blister halo & blushing |
| 1.5D* | 10 | 3P orange rust; 2-3G black rust | 1-7 | 5 | none |
| 5.0A | 10 | 6-7G | 1-7 | 7-7.5 | 10-mm blister halo |
| 7.8E | 10 | 5G with blisters around rust spots | 1-3 | 6.5 | 10 mm blister and rust halo |
| 9.3A | 10 | 6-7G | 2-4 | 5.5-7 | 10-mm blister halo |
| 10.0B | 10 | 6-7G | 2 | 7 | none |

*Comparative example
23.2A = Stepanpol PC-105P-110 reacted with 12% bisphenol A
23.3A = Stepanpol PC-105P-110 reacted with 21.2% recycled poly(bisphenol A carbonate)
1.5D = polyester polyol without PBAC content
5.0A = Polyol of Example XIII made with adipic acid instead of succinic acid; 19.5% rPBAC
7.8E = Polyol of Example XIII (19.5% rPBAC)
9.3A = Polyol of Example XIII but made by reacting in the rPBAC after an initial digestion
10.0B = Polyol of Example XIII post reacted with Cardura™ E-10 (neodecanoic alcohol glycidyl ether, product of Hexion) as a phenolic scavenger.

TABLE XX-10

Salt Spray Results:
2K Polyurethane Clearcoats from Modified Aliphatic Polyester
Polyols 404-Hour Results (one panel)

| Polyol | Field Blistering | Field Corrosion | Scribe creep (mm) | Scribe Rating | Scribe comments |
|---|---|---|---|---|---|
| Stepanpol PC-105P-110* | 10 | 3P orange rust; 3S-5G black rust | 1-5, 10 | 4-6 | clearcoat removed easily upon scraping |
| 23.2A | 10 | 2-3P orange rust; 3G black rust | 0.5-5, 10 | 4-5 | clearcoat removed easily upon scraping |
| 23.3A | 10 | 3-4P orange rust; 6-7G black rust | 0.5-5 | 6-7.5 | clearcoat removed easily upon scraping |
| 1.5D* | 10 | 3P orange rust; 2-3G black rust | 1-10 | 4 | clearcoat removed easily upon scraping |
| 5.0A | 10 | 6G | 0.5-7 | 5.5 | clearcoat removed easily upon scraping |
| 9.3A | 10 | 7G | 0.5-4 | 6.5 | clearcoat removed easily upon scraping |

*Comparative example
23.2A = Stepanpol PC-105P-110 reacted with 12% bisphenol A
23.3A = Stepanpol PC-105P-110 reacted with 21.2% recycled poly(bisphenol A carbonate)
1.5D = polyester polyol without PBAC content
5.0A = Polyol of Example XIII made with adipic acid instead of succinic acid; 19.5% rPBAC
9.3A = Polyol of Example XIII but made by reacting in the rPBAC after an initial digestion

TABLE XX-11

Salt Spray Results:
2K Polyurethane Clearcoats from Carbonate Polyols and
Polyol Blends 97-Hour Results (average, of two panels)

| Polyol | Field Blistering | Field Corrosion | Scribe creep (mm) | Scribe Rating | Scribe comments |
|---|---|---|---|---|---|
| 7.8E | 10 | 8G | 0.5 | 9 | 15-mm light undercut halo |
| 6.5E* | 10 | 7-8G | 0.5-1 | 8-9 | 6G around scribe; 20-mm undercut halo |
| Blend of 6.5E + 20% 23.4C | 10 | 8G | 0.5 | 8.5-9 | 10-mm light undercut halo |
| Blend of 6.5E + 20% 23.5A | 10 | 9G | 0.5 | 8-9 | 25-30 mm undercut halo |
| 23.5A | 10 | 9G, 7-8S | 0.5-3 | 7-8 | 10-15 mm light blister halo |

*Comparative example
7.8E = Polyol of Example XIII (19.5% rPBAC)
6.5E = polyester polyol made from (wt. %) rPET (38.8), NPG (16.4), PG (9.7), glycerol (1.75), IPA (8.7), succinic acid (24.5), monobutyltin hydroxide oxide (0.145) and 0% PBAC.
23.4C = Carbonate polyol made from PBAC and PG, $M_n$ about 1000 g/mol.
23.5A = Carbonate polyol made from PBAC and PG, $M_n$ about 400 g/mol.

Incorporation by Reference

The entire disclosure of each of the patent documents, including certificates of correction, patent application documents, scientific articles, governmental reports, websites, and other references referred to herein is incorporated by reference herein in its entirety for all purposes. In case of a conflict in terminology, the present specification controls.

Equivalents

The invention can be embodied in other specific forms without departing from the spirit or essential characteristics thereof. The foregoing embodiments are to be considered in all respects illustrative rather than limiting on the invention described herein. In the various embodiments of the methods and systems of the present invention, where the term comprises is used with respect to the recited steps or components, it is also contemplated that the methods and systems consist essentially of, or consist of, the recited steps or components. Further, it should be understood that the order of steps or order for performing certain actions is immaterial so long as the invention remains operable. Moreover, two or more steps or actions can be conducted simultaneously.

In the specification, the singular forms also include the plural forms, unless the context clearly dictates otherwise. Unless defined otherwise, all technical and scientific terms used herein have the same meaning as commonly understood by one of ordinary skill in the art to which this invention belongs. In the case of conflict, the present specification will control.

Furthermore, it should be recognized that in certain instances a composition can be described as being composed of the components prior to mixing, because upon mixing certain components can further react or be transformed into additional materials.

All percentages and ratios used herein, unless otherwise indicated, are by weight.

What is claimed is:

1. A coating comprising the reaction product of:
   (a) a polyester polyol; and
   (b) a crosslinker selected from a melamine crosslinker, or an isocyanate crosslinker selected from a diisocyanate trimer, a diisocyanate, or a polyisocyanate, wherein the polyester polyol comprises recurring units derived from:
      (i) 31 to 34 wt % of a polyacid source selected from polyethylene terephthalate (PET), recycled polyethylene terephthalate (rPET) or combinations thereof;
      (ii) 7 to 8 wt % isophthalic acid;
      (iii) 20 to 25 wt % of an acid selected from succinic acid or adipic acid;
      (iv) 22 to 24 wt % of glycols comprising a mixture of neopentyl glycol, propylene glycol and glycerol; and
      (v) 12 to 20 wt % of a poly(bisphenol-A carbonate) (PBAC), wherein when the coating comprises a melamine crosslinker the coating is formulated to comprise 10 to 30 wt % of the melamine crosslinker and when the coating comprises an isocyanate crosslinker the coating is formulated at an isocyanate to hydroxyl ratio from 1.0 to 1.5, and the coating comprises 1 to 95 wt % of the polyester polyol.

2. The coating of claim 1 wherein the polyacid source is PET.

3. The coating of claim 1 wherein the polyacid source is rPET.

4. The coating of claim 1 wherein the polyester polyol has a hydroxyl number within the range of about 10 to about 500 mg KOH/g.

5. The coating of claim 1 wherein the polyester polyol has a viscosity at 125° C. less than about 5000 cP.

6. The coating of claim 1 wherein the crosslinker comprises a diisocyanate trimer.

7. The coating of claim 6 wherein the diisocyanate trimer is selected from hexamethylene diisocyanate trimer, 4,4'-methylene diphenyl diisocyanate trimer, isophorone diisocyanate trimer, and combinations thereof.

8. The coating of claim 6 wherein the coating is a polyurethane coating.

9. The coating of claim 1 wherein the crosslinker is a melamine crosslinker.

10. The coating of claim 1 wherein the polyester polyol is transparent.

11. The coating of claim 10 wherein the coating is a clear coating.

12. A metal topcoat comprising a coating according to claim 1.

13. The coating of claim 1 wherein the coating is a primer coating.

14. The coating of claim 13 further comprising titanium dioxide.

15. The coating of claim 1 wherein the coating is a corrosion inhibitor-free coating.

16. The coating of claim 1 further comprising a corrosion inhibitor.

17. The coating of claim 16 wherein the corrosion inhibitor is selected from zinc phosphate, zinc chromate, barium metaborate, calcium silica gel, amino carboxylate, barium phosphosilicate, aluminum triphosphate, and combinations thereof.

18. A coated substrate comprising the coating of claim 1.

19. The coated substrate according to claim 18 wherein the substrate is selected from aluminum, cold-rolled steel, phosphate cold-rolled steel, oxidizable metals, galvanized metals, and plated metals.

20. The coating of claim 1 wherein the polyester polyol has an acid value less than 5 mg KOH/g.

* * * * *